United States Patent [19]
Malec et al.

[11] Patent Number: 5,490,060
[45] Date of Patent: Feb. 6, 1996

[54] PASSIVE DATA COLLECTION SYSTEM FOR MARKET RESEARCH DATA

[75] Inventors: John Malec, Chicago; Joseph P. Moser, Glendale Heights; Scott J. Thomas, Palatine, all of Ill.; Eleanor Ting, Sudbury, Mass.

[73] Assignee: Information Resources, Inc., Chicago, Ill.

[21] Appl. No.: 616,816

[22] Filed: Nov. 13, 1990

Related U.S. Application Data

[63] Continuation of Ser. No. 464,619, Jan. 3, 1990, abandoned, which is a continuation of Ser. No. 162,398, Feb. 29, 1988, abandoned.

[51] Int. Cl.$^6$ .................................................. G06F 15/22
[52] U.S. Cl. .................................. 364/401; 455/2; 348/1
[58] Field of Search ........................... 455/2; 358/84; 348/1; 364/401, 404, 405

[56] References Cited

U.S. PATENT DOCUMENTS

| | | | |
|---|---|---|---|
| 4,331,973 | 5/1982 | Eskin et al. | 358/84 |
| 4,335,303 | 6/1982 | Call | 235/463 |
| 4,355,372 | 10/1982 | Johnson et al. | 358/88 X |
| 4,404,589 | 9/1983 | Wright, Jr. | 358/84 X |
| 4,425,619 | 1/1984 | Matsuda et al. | 364/405 |
| 4,502,120 | 2/1985 | Ohnishi et al. | 364/405 |
| 4,554,446 | 11/1985 | Murphy et al. | 235/487 |
| 4,649,481 | 3/1987 | Takahashi | 364/405 |
| 4,723,212 | 2/1988 | Mindrum et al. | 235/487 X |
| 4,747,049 | 5/1988 | Richardson et al. | 364/405 |
| 4,972,504 | 11/1990 | Daniel, Jr. et al. | 455/2 |

*Primary Examiner*—Andrew I. Faile
*Attorney, Agent, or Firm*—Fitch, Even, Tabin & Flannery

[57] ABSTRACT

A passive data monitor and collection apparatus, and associated method, for obtaining market research data from an automated checkout system of a retail establishment. The apparatus positively monitors all the communications on a communications network between a plurality of point-of-sale terminals in a store and the store controller controlling the terminals. The store communications are converted from a phase encoded protocol into a standard RS 232 protocol which is then assembled into SDLC frames by a processor. The SDLC frames are separated on the basis of a control field format before being parsed by terminal addresses to form separate transactions on a list. The transaction list is produced by a real time monitor routine which builds the list from the asynchronous frames received from each of the store loops. The transactions on the list are handled in the background of the processing by a parsing routine which assembles the transactions into data files relating to the purchases by panelists and data files relating to the purchases by all customers. In a preferred embodiment, a host processor polls monitoring apparatus at a multiplicity of stores and has transferred to it the market research data files stored for the retail respective establishments.

32 Claims, 32 Drawing Sheets

FRAME SEQUENCES

BEGINNING OF TRANSACTION:

FC 1E HDR           (NO RESPONSE)

NORMAL TRANSACTION SEQUENCE:

| | |
|---|---|
| FC 1B ITMLKUP | FC 44 ACK |
| FC 0C FASTPATH | FC 44 ACK |
| FC 0A TERMLKUP | (NO RESPONSE) |
| FC 0F UNIQFP | (NO RESPONSE) |

SPECIAL CASE:

FC 1B ITMLKUP (VOID FLAG SET)   FC 44 ACK

NEGATIVE LOOKUP TRANSACTIONS:

| | |
|---|---|
| FC 1B ITMLKUP | FC 46 NAK |
| FC 0C FASTPATH | FC 46 NAK |

TERMINAL ITEM REJECTION:

FC 1B ITMLKUP   FC 44 ACK   FC 15 ITMREJ   FC 46 NAK

END OF TRANSACTION:

FC 16 ENDXACT       (NO RESPONSE)

FIG. 7

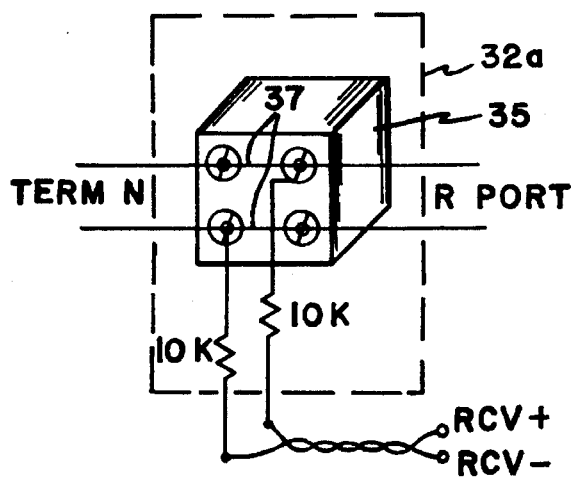

FIG. 8

A1 {
```
VERSION:
1.10
SLM PARMS:
COLLECT: 0
STORE NUMBER: 0934
DATA MODE: UNCOMPRESSED
SDLC WDW SIZE: 7
LINE SPEED: 4800
NRZI: FALSE
DUPLEX: HALF
LINE TYPE: DEDICATED
HANGUP: TRUE
TERM ADDR: 1
TERM ADDR: 2
TERM ADDR: 3
TERM ADDR: 4
TERM ADDR: 5
TERM ADDR: 6
TERM ADDR: 7
TERM ADDR: 8
TERM ADDR: 9
TERM ADDR: 10
TERM ADDR: 11
TERM ADDR: 12
TERM ADDR: 13
TERM ADDR: 14
TERM ADDR: 15
TERM ADDR: 16
TERM ADDR: 17
TERM ADDR: 18
TERM ADDR: 19
TERM ADDR: 20
```

A3 {
```
INITIALIZATION:
SLMINIT
```

A5 {
```
PERIODIC:
0000: ITEM UPDATE
SETUP: SET PROG
CLEANUP: CLEAN PROG
ERROR 1: COMMAND/c ECHO PROGRAM FAILED
0055: COMMAND/c ECHO RJE RUN > DO RJE
```

A7 {
```
DEFAULT:
DLOG
ERRORQUIT 3: COMMAND/c ECHO EXIT EXEC
```

FIG. 15

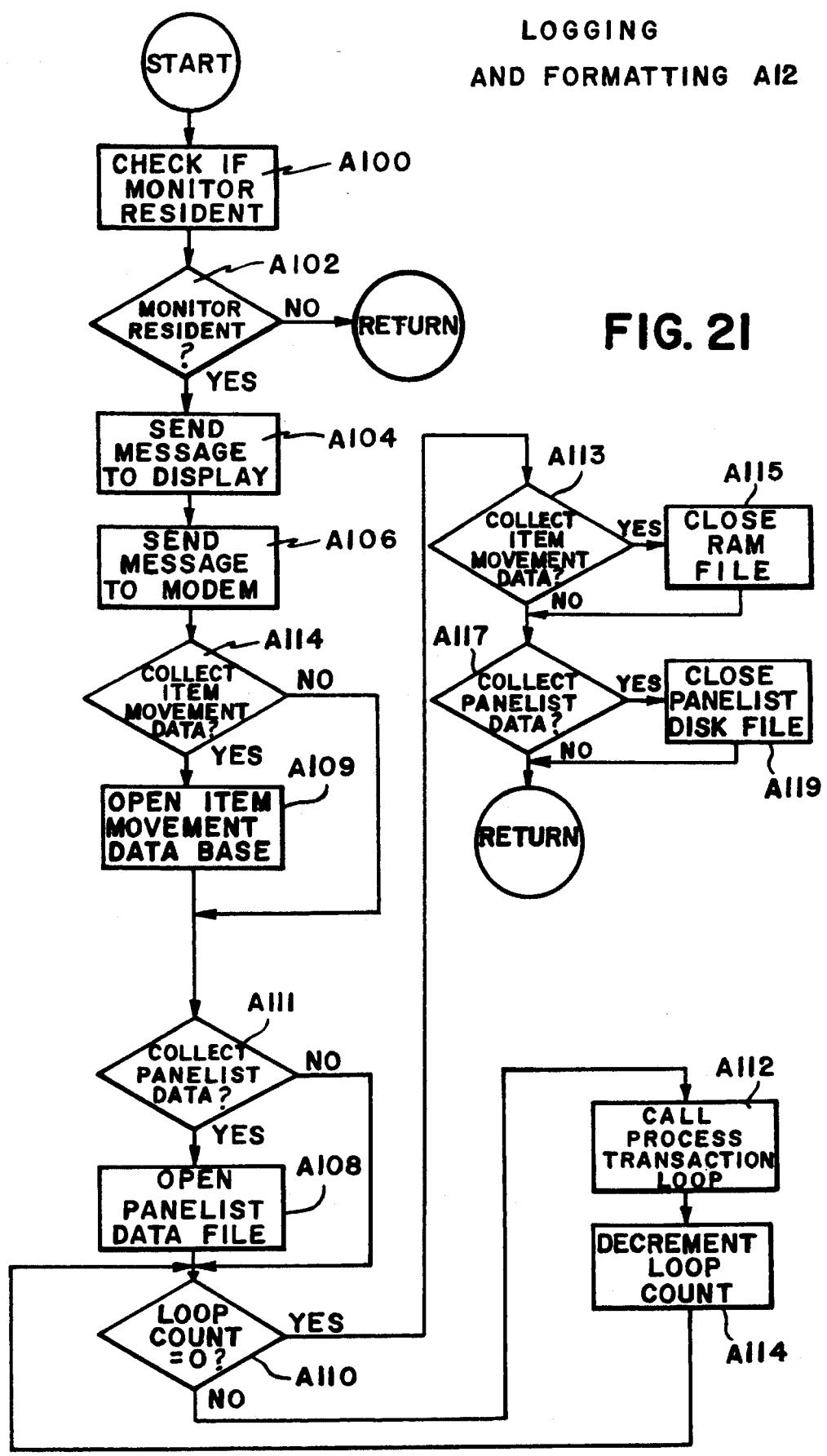
FIG. 21 LOGGING AND FORMATTING A12

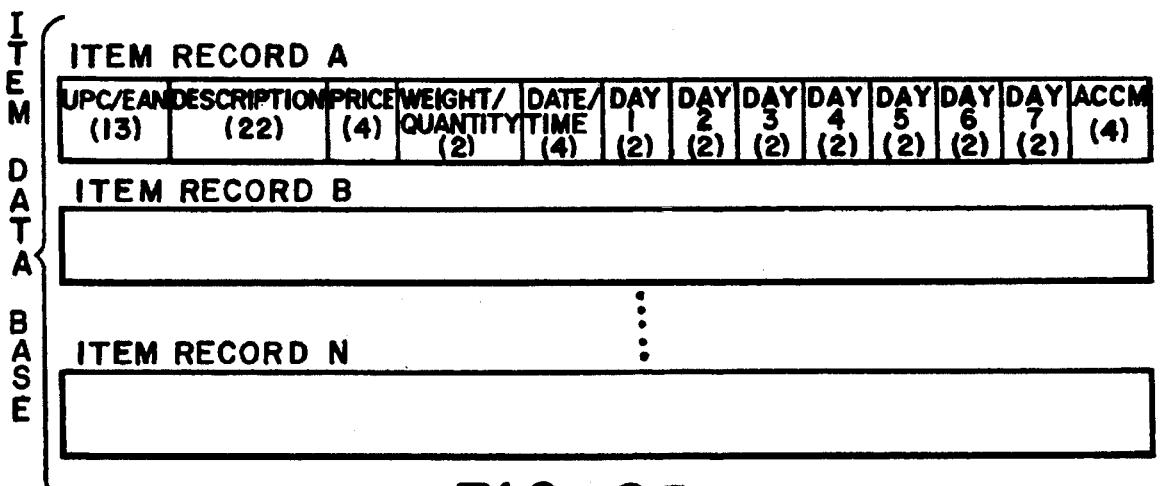
FIG. 28
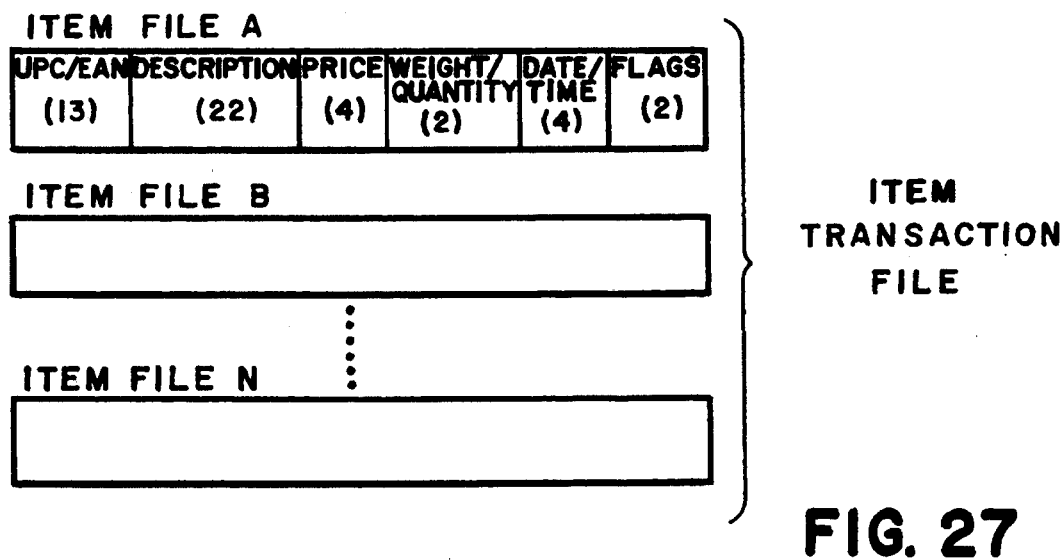
FIG. 27
| POINTER TABLE | |
|---|---|
| ITEM CODE | ADDRESS RA |
| ITEM CODE | ADDRESS RB |
| ITEM CODE | ADDRESS RC |
| ITEM CODE | ADDRESS RD |
| ITEM CODE | ADDRESS RN |
FIG. 29

PASSIVE DATA COLLECTION SYSTEM FOR MARKET RESEARCH DATA

This application is a continuation of application Ser. No. 464,619 filed Jan. 3, 1990, abandoned, which is in turn a continuation of application Ser. No. 162,398, filed Feb. 29, 1988 abandoned.

The invention pertains generally to the collection of market research data and is more particularly directed to the passive monitoring and collection of retail sales data transmitted over a communications network between a store controller and a plurality of point-of-sale terminals.

BACKGROUND OF THE INVENTION

Market research into the behavior of consumers, such as their response to particular advertisements, is useful for the marketing of products which are sold in retail markets. In one such type of market research, a plurality of consumers or perspective customers are selected as a panel forming a representative subgroup of a particular demography or population. The buying habits of the selected panelists are recorded and analyzed. The entire population under study is then exposed to media oriented information messages (advertisements) which it is believed will influence their buying habits. These panelists may shop in different stores of a chain or may shop in other establishments in a particular geographic area. A panel is limited in its geographic extent and limited in the establishments where the respective panelists can purchase items so that a market researcher may tabulate the purchases of respective panelists to determine which advertisements each particular panelist may have watched, what purchases he made in response thereto, and where.

In a more controlled environment, the panelists can be provided with targetable television which shows specific advertisements to households which are taking part in the study. The panelist then makes purchases from particular stores in the geographic area, and those purchase responses are recorded. The recordation of the purchase response can be automatic, such as by way of product code scanning in respective stores, or manual, such as by the panelists marking their purchases on paper. Preferably, such market research is made substantially transparent to the panelists such that the purchases are recorded automatically so as not to influence the behavior of the panelist or be influenced thereby as might be the case where the panelists have to record their own purchases. In one successful system the advertisements used for the market research are substituted for regular advertisements in an unobtrusive manner so that a panelist does not know which advertisements the market researcher is studying his response to.

One such advantageous system for collecting panelist data utilizing targetable television is illustrated in U.S. Pat. No. 4,331,973 issued to Eskin, et al., and U.S. Pat. No. 4,404,589, issued to W. Andrew Wright, Jr.

Another system for collecting market survey data is illustrated in U.S. Pat. No. 4,355,372, issued to Johnson, et al.

A system for coupon distribution which utilizes Universal Product Code (UPC) store scanners is illustrated in U.S. Pat. No. 4,723,212 issued to Mindrum, et al.

In some of these prior art systems, data collection means for market research data takes advantage of a store scanning system which includes a plurality of point-of-sale terminals, a communications network, and a central processor, sometimes referred to as a store controller. Each of the point-of-sale terminals has a cash register for entering transaction data and an optical scanner which reads the Universal Product Code (UPC) bar codes on each product. Messages from a point-of-sale terminal are transferred over the communications network to the store controller for inquiry. The store controller generally responds to such inquiry by a look up of the UPC or item code and provides the point-of-sale terminal with price, quantity or other data useful in making a transaction record on a register tape for the customer. The store controller may also record the transaction for accounting or inventory purposes.

In this regard, item movement data are also useful to a market researcher because they allow an evaluation of consumer purchase behavior, as, for example, behavior variation with price change. Item movement data comprise the recordation of the sales quantity of a particular item, at a particular price and for a particular time. The day by day recording of the quantity of a particular item, its total sales, and the correlation of these sales to price change permits another factor in the complex purchasing behavior of consumers to be evaluated. It is difficult to obtain item movement data which are market research oriented from a store controller because the item data the controller collects are inventory oriented. Those data are based on the amount of a particular item which is "on hand" such that it pertains not only to product on the shelf but also that stored in the inventory area. Sales are subtracted from this total amount and thus the difference between inventory numbers will be sales for a particular day. However, if an inventory is taken and the total reset or new product is added to inventory, the sales data for a particular day can be erased before a market researcher can acquire them. Further, such inventory data may be unavailable on a day-by-day basis and price changes may or may not be included.

The communications on the store communications networks include all the transaction data for the market researcher that are necessary to evaluate the impact of advertisements, to collect item movement data, or to conduct other market research. However, in many cases it is impossible to obtain this information because access to the store controller may not be available to the market researcher. Further, even if the market researcher has access to the store controller, it is very difficult to integrate market research collection software into the store controller system without disturbing the main purpose of the store controller, which is to control and communicate with the point-of-sale terminals. Moreover, the store controller may already have too many point-of-sale terminals or communications networks such that it is overloaded and additional data processing overhead for market research is not possible or practical.

What is needed in these situations is a passive data monitoring system which will collect market research data in a transparent manner without disturbing communications between the store processor and the point-of-sale terminals. The passive data monitor needs to operate unobtrusively to read all transaction data on the communications network and selectively process the desired market research data therefrom without disturbing the normal transactions on the communications network.

While there are a number of reasons why a passive data monitor would be advantageous for collecting market research data from the scanning networks of an automated checkout system, there are also some associated problems with accomplishing this task. Initially, there is the problem of determining where on the communications network that a passive connection can be made so as not to disturb the communications on the network, while still obtaining all the data which is transacted on the network. Another problem is that the data must be collected in real time asynchronously to the processor of the passive monitor. This is because it is unknown when a panelist transaction, or other desired transaction, will take place. This problem is made more difficult because many times the protocol and data format of the communications on the store network are different from the one most optimum for the processor of a passive monitor.

Moreover, the passive data monitor must sift through all the traffic on the store network to find the market research data that are desired. Much of the data traffic on the communications network is overhead and control protocol which is of no use to the market researcher. This overhead data must be discarded but not until after they are examined, and it is determined such cannot be used. Thereafter, the passive data monitor must quickly assemble the useful data into conveniently sized records and protect them by placing them in nonvolatile storage. This operation should take place in real time so that none of the useful data are lost. Finally, when it is convenient the passive data monitor should be able to transfer the recorded data to a central processing center without interfering with the real time monitoring of the store network.

All of the these tasks increase in difficulty when monitoring a store scanning system which has multiple scanning networks. The traffic which must be monitored and the data that must be checked increase dramatically with every network which is added. Additionally, in this situation, a passive data monitor for multiple loops has the disadvantage of being not only asynchronous to a single communications network while it is monitoring, but also to all of the multiple networks. Such monitoring of multiple communications networks must be coordinated carefully because a passive monitor cannot request a transaction to be repeated and, once a transaction is missed, the data will be lost in respect to the monitor.

SUMMARY OF THE INVENTION

In one embodiment, the invention provides a non-obtrusive data monitor and collection system for the sales transaction data of an automated checkout system of a retail establishment. Such automated checkout system comprises a central processor means connected by a communications network to a plurality of point-of-sale terminals which communicate to detail the sales transactions of the establishment. The data monitor and collection system reads all the communications on the network and records selective parts of such as monitored data. After the monitored data are collected, they are parsed into particular categories which are useful for market research. In the preferred embodiment, the collected transaction data are parsed by processing means into panelist files relating to the advertisement influenced buying reactions of selected persons among a demographic sample and into item movement files relating to the reactions of all consumers of a particular retail establishment, as to price modifications of a product. The panelist files and the item movement files are transferred periodically by the data monitor and collection system to a remote central processing system where they can be evaluated.

The data files gathered from a plurality of such monitoring and collection systems can be used to produce market research conclusions for a wide geographic area. A market research data collection system utilizing such passive data monitors at stores over a wide region includes means for storing the data files at each monitor and transferring them to a host processor. In a multi-store system when the market research data are panelist data, the panelists will shop at more than one store. Item movement data gathered from more than one store becomes more relevant because they are taken from a larger sample and small inconsistencies are filtered out.

An implementation of the passive data monitor and collection system in a preferred form includes means for passively connecting to the communications network of an automated checkout system of a retail establishment. An implementation of such passive connection for a store operating a SDLC (synchronous data link control) loop checkout system is provided by a high impedance parallel connection at the receive port of each store loop. All transactions on each store loop are received by the store processor at its receive port, and thus, any data necessary for selection in the market research are available in the communications system at that point on the network. In this manner, the passive data monitor will not interrupt or slow the automated checkout system of the store, and will appear completely transparent to other communications on the network.

The passive data monitor further includes a processing means having means for assembling the transaction data from character strings collected from the communications network into frames which can then be parsed into market research data, in the preferred embodiment, panelist files and item movement files. The means for assembling includes conversion means for converting the transaction data from the protocol of the communications loop into a standard digital protocol that can be read and stored by a microcomputer system.

After the transaction data are assembled into frames, sorting means are used to select only those frames which contain information data. In this manner much of the standard traffic frames of the communications network are ignored, and the informational essence of the messages extracted for further parsing. The information containing frames are then selectively sorted into transaction blocks for each point-of-sale terminal. Such transaction blocks contain all the particular data pertaining to sales of each product by each terminal and are arranged by transactions. Transactions from each terminal are then appended to a transaction list before further processing.

The assembly of the transaction data into frames, information frames, transaction blocks, and a transaction list is accomplished on a real time basis by an interrupt driven monitor routine. The monitor routine is memory resident in the processor means and builds the transaction list as those data are monitored from each of the store loops. The monitoring routine operates in the foreground of an executive routine which also calls a data logging and formatting routine in background to read the transaction list and assemble the panelist files and item movement files therefrom.

The panelist files are written to a nonvolatile memory, preferably a hard disk, as they are assembled. The executive routine on a regular basis, for example, daily, calls a first communications routine to transfer the panelist files from the disk to a remote host central processing system for evaluation. The item movement files are used to update an item movement data base in the memory which is moved periodically to nonvolatile memory. The executive routine on a regular basis, for example, weekly, calls a second communications routine to move the item movement data base to the host central processor where it can be evaluated.

Separating the task of forming a transaction list from the assembling of the panelist files, item movement files and host communications produces an advantageous monitoring and collection system where the sifting of large amounts of data is accomplished rapidly. The formation of a transaction list permits the exclusion of unwanted communications in the first instance thereby substantially reducing the amount of information which the logging and formatting routine must handle. Further, the information is placed in a logical format, by separate transactions with a customer, which solves the problem of dealing with multiple asynchronous networks where several transactions may be happening simultaneously. The transaction list is formed by a minimum number of sorts which are processed in such a way that none of the communications on any of the store networks are missed. The transaction list is then further processed in background when the system can conveniently provide such service.

Other objects, features, aspects, and advantages of the present invention, together with the organization and manner of operation thereof, will become apparent and more fully described in the following detailed description, particularly when taken in conjunction with the accompanying drawings wherein like reference numerals designate similar elements throughout the several views, and wherein:

BRIEF DESCRIPTION OF THE DRAWINGS

FIG. 7 is a pictorial representation of selected frame sequences for SDLC communications on the network illustrated in FIG. 4;

FIG. 8 is a combined pictorial and schematic illustration of a passive data connection of the data monitor to the communications network as illustrated in FIG. 2;

FIG. 15 is a representative illustration of the configuration file for the passive data monitor illustrated in FIG. 2;

FIG. 21 is a detailed flow chart of the logging and formatting routine illustrated in FIG. 12;

FIG. 27 is an expanded pictorial view of an item transaction file;

FIG. 28 is a detailed pictorial representation of the item movement data base;

FIG. 29 is a pictorial representation of a pointer table used in searching the item movement data base;

DETAILED DESCRIPTION OF THE PREFERRED EMBODIMENT

Figure 1:
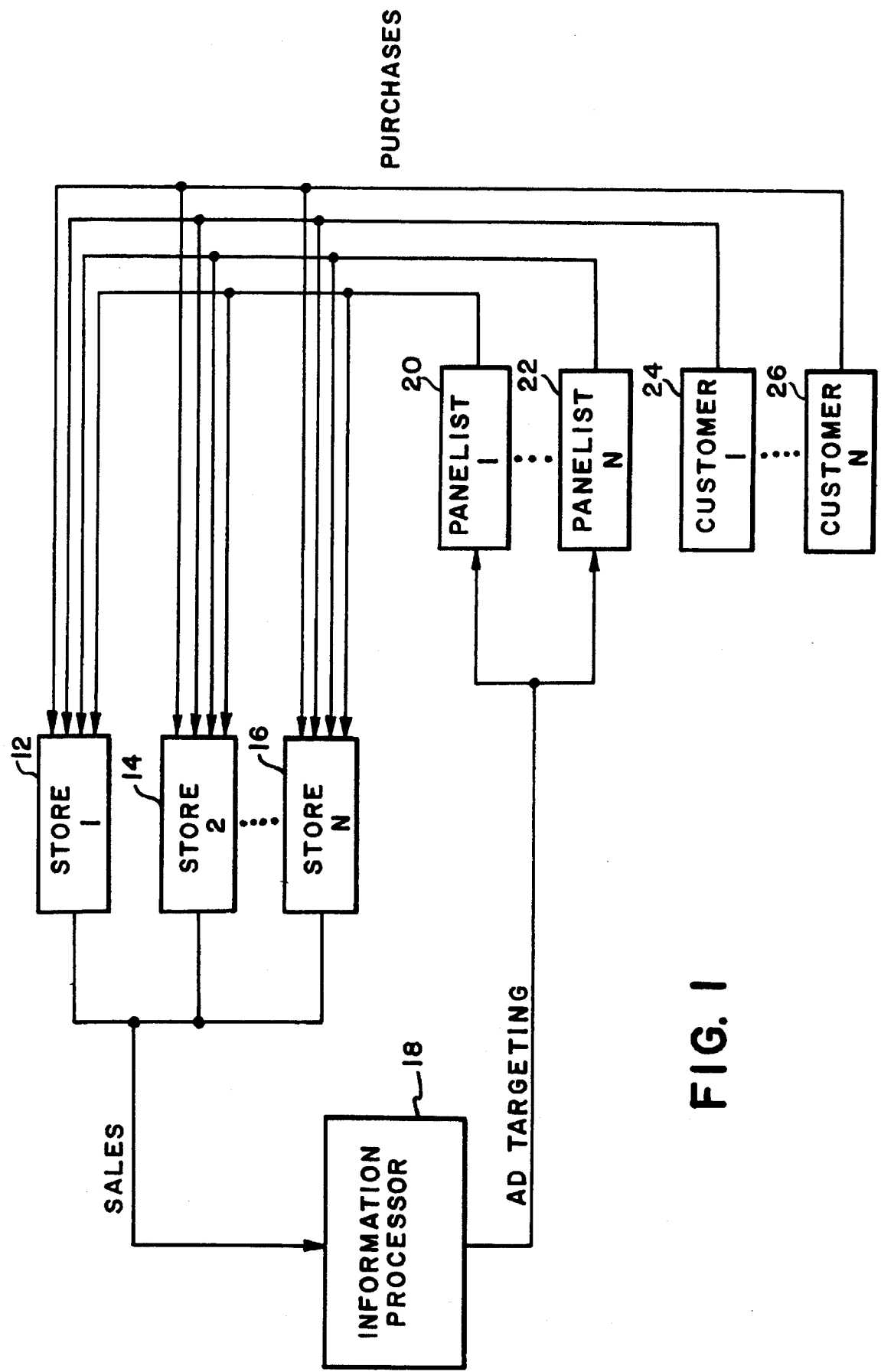
FIG. 1 is a system block diagram of a market research data collection system.

A market research information collection system which collects data indicative of the purchasing behavior of customers is shown in FIG. 1. Such market research system utilizes the present invention to record passively portions of such purchase information for further combination and evaluation at a remote host processor 18, as will be more fully described hereinafter. The market research system comprises a plurality of stores 12, 14 and 16. Each store 12, 14 and 16 is equipped with a typical automated checkout system including Universal Product Code (UPC) point-of-sale scanners and its own store controller, which controls the respective scanners.

In an advantageous example, the invention will be described in the context of a retail food store which has a multiplicity of different items at different prices. However, it will be evident that the term store can mean any establishment where sale transactions are made including discount stores, catalog merchandise stores, hardware stores, etc. All such establishments and others of this general type are meant to be included in the term.

For a preferred embodiment of the invention, a group of panelists 20, 22 are selected from the general sub-population of customers 20, 22, 24 and 26 who shop at these stores. The transactions of the panelists are studied closely because they have been chosen as typical customers and/or their behavior has been influenced by particular advertisements to which the market researcher desires a response. The geographical demarcation of an area for a group of stores in the market research system allows a closer study of the demographic data for a particular group of the panelists. However, this grouping is merely for illustration and not for limitation of the invention.

In general, the market research system is controlled from a host or central information processor 18 which from time to time, by polling or otherwise, receives sales information from each of the stores 12, 14 and 16. The host processor receives the sales information from the stores and combines such to permit market research conclusions and evaluations of the customers under study. The sales information from the stores preferably desired in the present system is of two types, data on the transactions of the selected panelists 20, 22 and item movement data based on the behavior of all the customers 20, 22, 24 and 26 at the stores 12, 14, and 16. It will be understood that other market research information is available from the stores and such is not to be excluded from the scope of the invention because of the specific useful examples shown.

In the panelist data case, a market researcher provides the information processor 18 with suitable demographic information concerning the panelists 20, 22 and what the the market research is to accomplish. When market research tests are to be performed on a particular product, suitable advertising messages (ad targeting) are prepared and furnished to the media in the geographic area where the panelists live. Such media can be coupons, local newspapers, radio, television or cable television, including targetable television. The market researcher determines when these particular messages are to appear and the particular media used for transferring the information to the customers 20, 22, 24 and 26. This, of course, will be arranged with the sponsors who have acquired the advertising space in the media in which the messages are to be generated. The panelists 20, 22 may be given different messages than the general public.

The panelists 20 and 22 are volunteers who have agreed to supply information concerning themselves and to present identification cards when purchasing items or shopping. The panelists will then shop normally at stores 12, 14 and 16 where they make purchases which are recorded with their identification numbers by the UPC scanning system of each store. Each of the panelists has his own panelist identification card corresponding to his assigned identifier at the information processor 18. In making purchases at the stores 12, 14, and 16 in the area, he presents his card with the identification number at an automated checkout counter. Each checkout counter has a scanner unit for optically scanning the Universal Product Codes on the various products and respective identification cards are preferably similarly marked with a UPC bar code in order that they may be easily read by the optical scanning units along with the UPC codes of the purchased products. As an alternative, the identification numbers of the respective panelists may be keyed in during checkout.

For item movement data, the panelists 20, 22, and all other customers 24, and 26 who shop at the stores 12, 14, and 16 buy different UPC coded items at different prices on different days. Item movement data are tallies of the quantity of respective items sold at particular times at respective particular prices. From such data the total dollars sales of a product for any time period can be evaluated by the market researcher. Changes in the tastes or buying habits based on brand loyalty, different sizes, price change, and other factors can be measured on a daily basis and for a convenient market research unit, a shopping cart which generally corresponds to a single consumer transaction. While UPC bar codes are exemplary of a preferable scanning code, others such as EAN (European Standard), or other bar codes, would work equally as well. In fact, the invention will be applicable to most, if not all, optical scanning codes.

Figure 2:
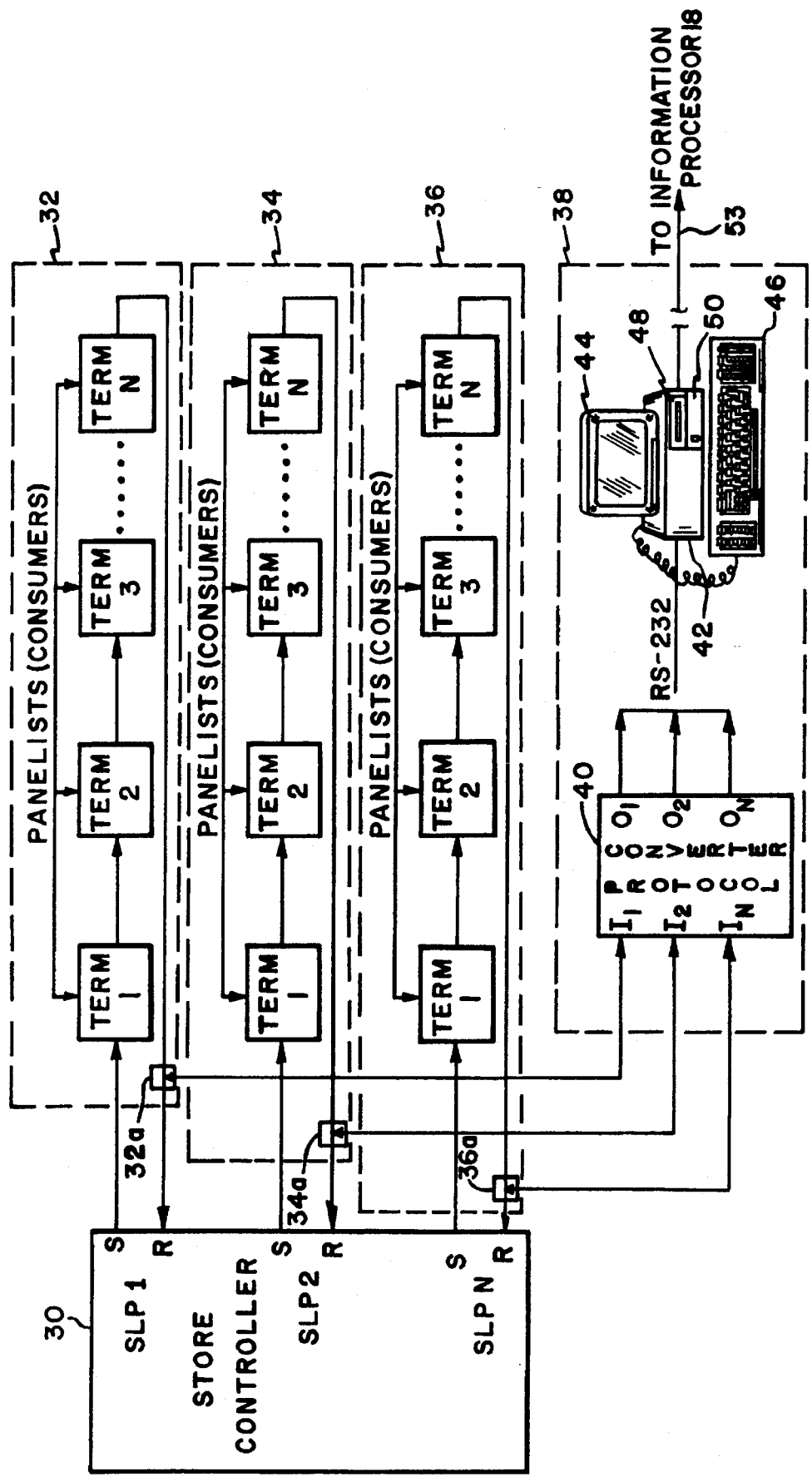
FIG. 2 is a detailed block diagram of an automated checkout system configured in an SDLC loop format and including a store controller communicating over a communications network to a plurality of point-of-sale terminals, wherein each of the store loops is monitored by a passive data monitor and collection system constructed in accordance with the invention.

Turning now to one preferred embodiment of the invention which is more fully illustrated in FIG. 2. The illustration shows an automated checkout system with a Universal Product Code scanning system for one of the stores, for example, store 12 illustrated in FIG. 1. Such automated checkout system includes a store controller 30 associated with a number of scanning loops 32, 34 and 36. A data monitor and collection system 38 is used to gather market research information relating to the purchases at the store from the automated checkout system.

Each scanning loop, for example loop 32, comprises a plurality of point-of-sale terminals 1, 2, 3, . . . N which are chained together serially in a communications network loop. Each of the communications loops is connected to the store controller 30 at a store loop port, for example, SLP1 for loop 32, SLP2 for loop 34 and SLPN for loop 36. The communications network loops have a predetermined protocol by which communications messages are transmitted from a send port S, passed to the first terminal 1, and then transferred down the terminal chain to where they are finally received by a receive port R. Messages from the terminals 1, 2, 3 . . . N are transmitted along with the messages and communications protocol, and commands of the store controller 30 and all are available at each receive port R of the store controller.

The type of store scanning system shown, including store controller 30 and loops 32, 34 and 36, is well known and can comprise a programmable store system using an IBM 3651 store controller having multiple scanning loops per store controller. The point-of-sale terminals can be a number of particular types, for example, IBM 3683s, 3653s, or 3663s. The preferred implementation of the invention will be described for use in conjunction with this type of scanning system, although it should not be limited thereto. The invention will be described generally in terms of such scanning systems, but it is evident that its use can be easily adapted to those of other systems than that specifically described.

Figure 3:
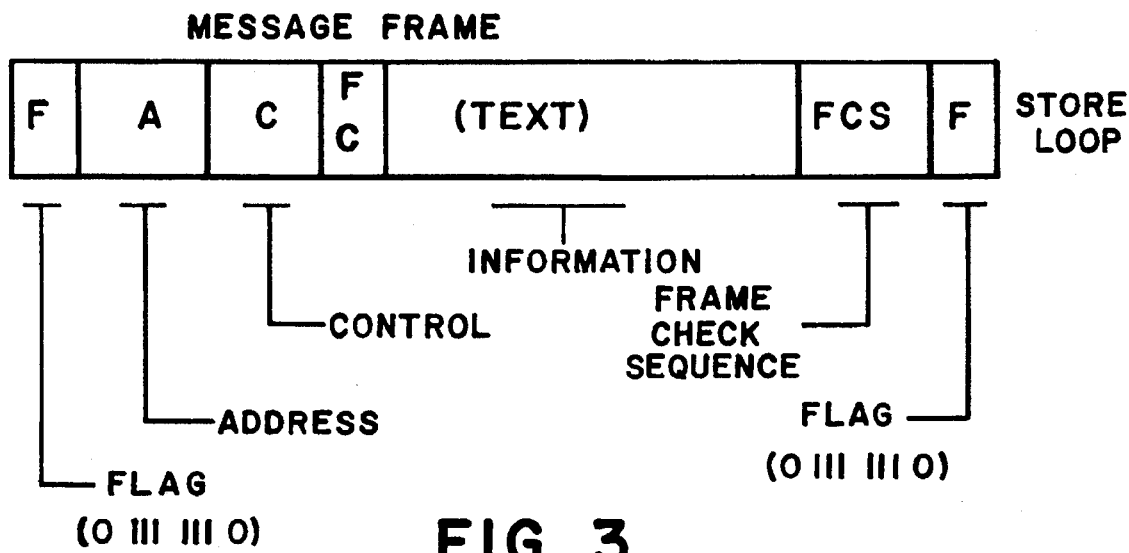
FIG. 3 is a pictorial representation of a typical message frame for the automated checkout system illustrated in FIG. 2.

Messages on the illustrated automated checkout system are transmitted and received by synchronous data link control. Synchronous data link control (SDLC) is a communications discipline or format for serial bit information transfer over a data communications channel. In SDLC format the message unit is a frame, which is shown in a pictorial representation in FIG. 3. The beginning of a message frame consists of a flag field of one byte (01111110) which is followed by an address field of one byte. The address byte, which indicates a specific point-of-sale terminal on the loop, is followed by a one byte control field. Control messages are primarily associated with the store controller 30 and the management of message traffic. After the control byte, several bytes of information are appended in an information field. The first information byte is a function code FC indicating the type of sales transaction. This is the area in which transaction or sales data are stored and is the area of main interest for the data monitor and collection system 38. These information bytes are followed by a frame check sequence consisting of two, eight bit CRC characters. Terminating the message frame is another flag field which is identical to the beginning flag.

The flag character acts as a message delimiter. The address character ensures that the message is received by the intended unit. The control character provides a means of defining the action required by the control message, such as the start of a poll cycle by the store controller. The terminals 1 . . . N and the store controller 30 each have a frame check sequence using the two CRC characters at the end of each frame to check the validity of the transmission. The loop communications circuitry in both the store controller 30 and point-of-sale terminals 1 . . . N ensures that the flag bit configuration occurs only at the beginning and the end of the serial bit stream that makes up a frame.

The control field of a SDLC frame can be in one of three formats: an unnumbered format, a supervisory format, or an information transfer format. The unnumbered format frames are used for such functions as initializing point-of-sale terminals, controlling the response mode of point-of-sale terminals, and reporting procedural errors, and for transferring data when these data are not to be checked as to location in a sequence of the frames. Frames with a control field of the supervisory format are used to assist in the transfer of information where they are used to confirm preceding frames carrying information. The frames of the supervisory format do not carry information themselves. Therefore, such frames are used to confirm received frames, convey ready or busy conditions, and to report frame numbering errors. Frames with a control field of the information transfer format are the vehicle by which information is transferred in SDLC. The control field, besides indicating the format, contains send and receive counts Ns and Nr, which are used to ensure that the frames are received in their proper order (Ns) and to confirm accepted information frames (Nr). The Ns count indicates the number of the information frame within the sequence of information frames transmitted, and the Nr count transmitted in a frame is the number of the information frame that the station receiving expects to receive next.

Messages transmitted by the point-of-sale terminals always flow from the terminal to the store controller 30. In terminal-to-store controller messages, the address character identifies which terminal the message came from. Messages originating at the store controller 30 are directed to a particular terminal by placing the address of that terminal in the message following the flag character. There are two types of addresses which are additionally placed in a message only by the store controller. An "all parties" address is used to direct a message to all of the point-of-sale terminals, regardless of the terminal type that is connected to a loop. A "group" address is used to direct a message to all terminals of a particular type (for example all 3683s, all 3653s, or all 3663s) on the loop but not necessarily all terminals on the loop.

When a point-of-sale terminal 1 . . . N is operational, it can recognize its own address, the all parties address, and its group address. The store controller 30 manages message flow on the store loop by sending a control message (polling) that allows the terminals to transmit. A terminal cannot begin to transmit unless and until it is polled by the store controller 30. The store controller 30 starts message traffic on a loop by polling all terminals simultaneously with the all parties address. Any terminal on the loop that needs to send a message can then send it after the poll has been issued. The serial loop connection of the loop interface allows an orderly transmission of terminal messages in a sequence based on the physical position of the terminal on the loop. If a terminal does not transmit at the time a poll is issued, it must wait for the next poll to be issued by the store controller.

Figure 4:
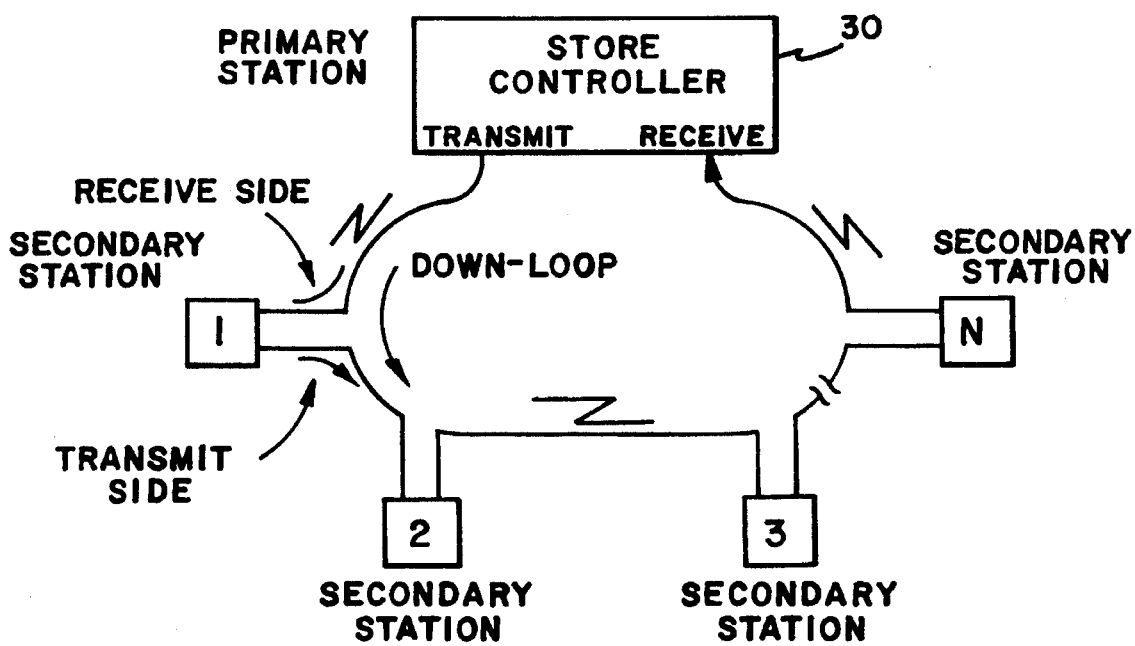
FIG. 4 is a schematic illustration of the half duplex loop configuration for the communications network illustrated in FIG. 2.

The communications network setup for each store loop is a one-way communication channel which originates at a transmitting port T of the station controller 30, connects with one or more point-of-sale terminals 1 . . . N (secondary stations) in a serial fashion, and then passes back to the receive port R of the station controller. This configuration is illustrated schematically in FIG. 4 and implements the communications loops 32, 34, 36 shown in FIG. 2. The loop configuration is logically a half duplex network where all the transmissions travel in the same direction on the communications channel. In the loop configuration, only one terminal or store controller transmits at any one time. Each of the secondary stations or point-of-sale terminals transmits sequentially as required by their location on the communications channel.

Figure 5:
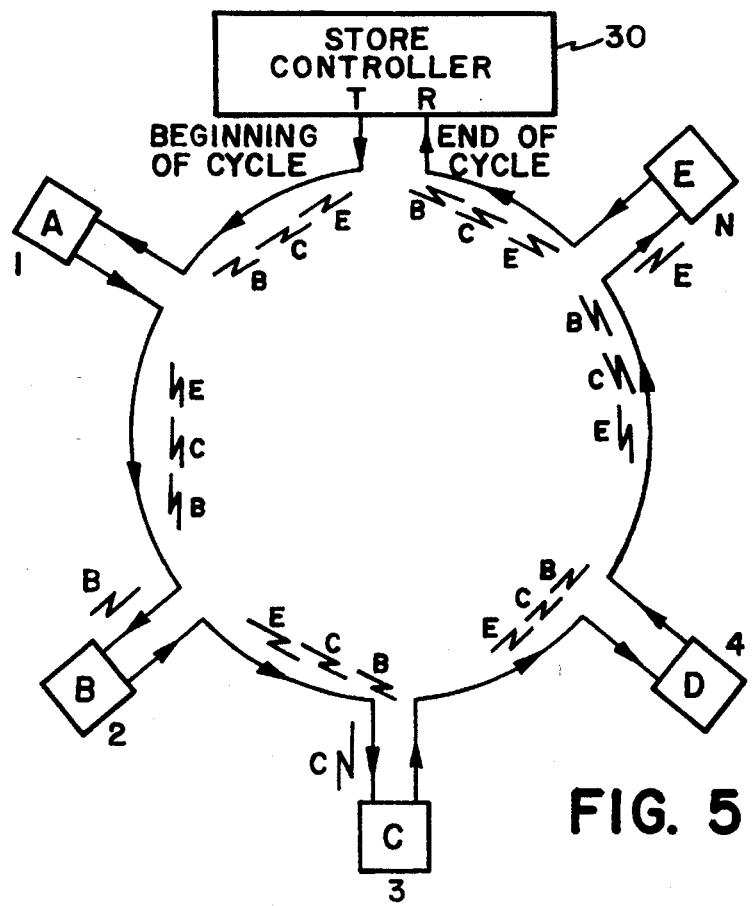
FIG. 5 is a schematic illustration of a store controller transmit sequence for the communications network illustrated in FIG. 4.

FIG. 5 illustrates the store controller transmissions on a communications network loop. The store controller 30 sends command frames that are addressed to any or all of the point-of-sale terminals 1 . . . N on the loop. Each frame transmitted by the store controller carries the address of the secondary station or stations to which the frame is directed. After a point-of-sale terminal on the loop decodes the address field of each frame transmitted by the store controller, it serves as a repeater for all the store controller transmissions to those point-of-sales terminals downstream from it. When a point-of-sale terminal detects a frame with its own address, it accepts this frame from the loop for further processing. However, the frame is also passed on to point-of-sale terminals downstream of the terminal. In the particular protocol used, when the store controller is finished transmitting frames, it follows the last flag field with a minimum of eight consecutive zeros, termed a turnaround sequence (TA). The store controller then transmits continuous 1s which create a go-ahead sequence (GA). In this way the store controller totally controls all the loop communications as to direction and timing. As the store controller transmits the go ahead sequence, it changes its mode from transmit to receive.

Figure 6:
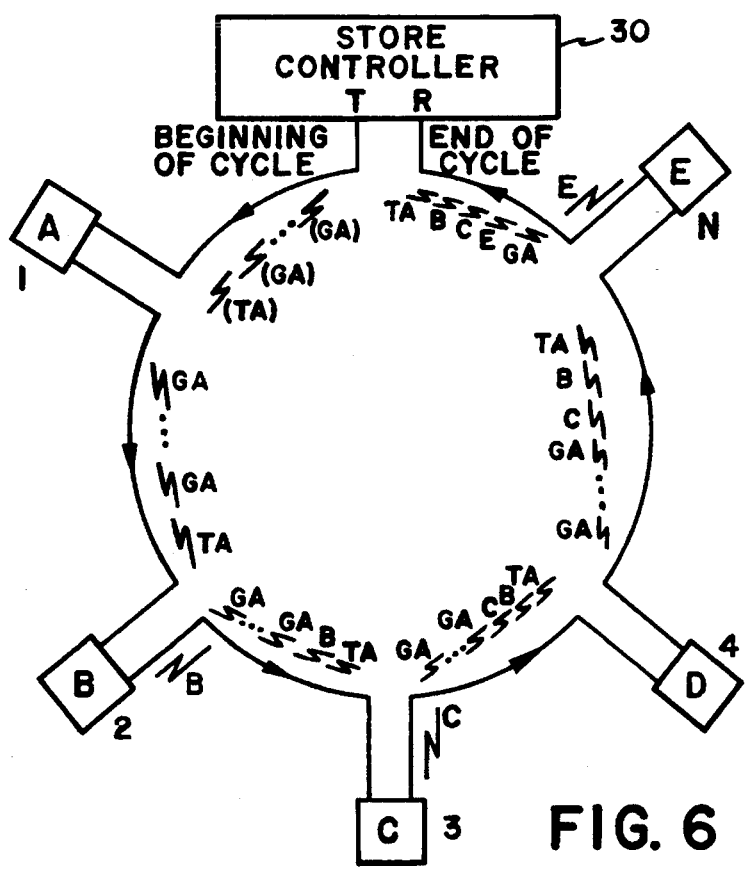
FIG. 6 is a schematic illustration of the point-of-sale terminals transmit sequence for the communications network illustrated in FIG. 4.

FIG. 6 illustrates a representation where the point-of-sale terminals 1 . . . N transmit back to the store controller. In the particular illustration, the store controller 30 has completed a transmission poll, has placed itself in a receive mode and has transmitted the turn around sequence followed by continuous 1s (go-ahead sequence). The first point-of-sale terminal 1 detects the go-ahead sequence, and, if it has a response to send, the seventh 1 bit is changed to a 0 bit thereby creating a flag. The point-of-sale terminal 1 follows the flag with its own message in the form of a response frame or frames that include its individual address. Following the last frame, it again becomes a repeater forwarding the continuous 1 bits it receives from the store controller. The next point-of-sale terminal 2 down the loop from that initial terminal 1 operates similarly when it detects the go ahead sequence which results from the continuous 1 bits. The procedure continues as each sequential point-of-sale terminal 2,3,4 . . . N adds its respective message B, C, E to the transmission until the last point-of-sale terminal N completes its transmission. The store controller detects the end of the transmission by recognizing that no further message frames (separated by flags) are present and the go-ahead sequence is present at the receive port R.

The store controller 30 operates each of the loops 32, 34 and 36 similarly, and decodes the message frames from the point-of-sale terminals and responds with messages and control information. In general, the data to be extracted from the totality of communications on the loops 32, 34, and 36 concern the purchase of items. Only frames which relate to the actual purchase and its relevant price and description data need be monitored. Such data can be filtered out from the totality of communications on the loops by recognizing the sequences and functions of frames which occur for a purchase transaction. Particular to the SDLC format for a food store are the following sequences which relate to the invention.

FIG. 7 illustrates the set of frames from the entire SDLC format which is used by the data monitor 38 to record purchase transactions. These frames are identified by their function code (FC) which is the first byte of the information field of an information format frame. When a point-of-sale terminal 1 . . . N first begins a transaction, it notifies the store controller 30 with a frame having a FC 1E indicating a transaction header. Such message is sent according to the protocol noted above in respect to FIG. 6. The transaction header frame requires no response from the store controller. Thereafter, the particular items bought by a customer are rung up on the point-of-sale terminal by scanning the UPC codes on the packages presented. Depending upon how the item is entered into the terminal, the purchase can be recorded by a number of different frames.

A terminal lookup frame, FC 0A, is used when a point-of-sale terminal contains an application program and supplies the price and description of an item. The terminal looks up the item internally without the help of the store controller 30. Because the terminal already has all the data it needs, the terminal item lookup frame is only sent to the store controller 30 and no response frame is required. Additionally, the cashier at the point-of-sale terminal may key in an item, in which case the frame will contain only the department number of the item. This frame, termed a unique fast path frame FC 0F, is sent to the store controller and does not require a response.

The two frame types which do require a response frame from the store controller are a fast path item lookup, FC 0C, and a regular item lookup, FC 1B. Most of the item sales for a transaction will be standard item lookups whereby the terminal requests from the store controller 30 the description and price of an item scanned at the terminal. When a response is necessary, the store controller 30, which contains an item lookup file with UPC item codes and associated prices and descriptions, compares the item code sent by the point-of-sale terminal in the lookup inquiry frame and responds in one of two ways. If the store finds the item in its file, the data concerning the item is sent to the point-of-sale terminal in a positive acknowledgment frame, FC 44. If the store controller does not find the item code of the purchase in the item lookup file, it responds to the item lookup inquiry with a negative acknowledgment frame, FC 46.

When all items have been entered and totaled by the point-of-sale terminal, it assembles data concerning the transaction into a final frame and sends that frame to the store controller. This frame, an end of transaction frame, FC 16, informs the store controller 30 that an entire checkout transaction has been completed and payment tendered.

The system is additionally concerned with two special transaction sequences that relate to item lookups. In one special sequence, even if the item lookup frame, FC 1B, from a point-of-sale terminal is positively acknowledged, FC 44, if the item is to be voided (it was previously recorded) a flag bit is set in the item lookup frame transmitted to the store controller 30. The second special sequence also begins with an item lookup frame, FC 1B, followed by a positive acknowledgment frame, FC 44. However, for some reason the item is rejected by the point-of-sale terminal. In this case the terminal will transmit an item reject frame, FC 15, to which the store controller must reply by a negative acknowledgment frame, FC 46.

The information contained in the information field of such frames is more specifically illustrated in an Appendix A at pages 68–76 of the application. Such information is given as exemplary of the preferred embodiment and not as limiting to the invention. For further information on the standard store loop configuration and communications format, please see publication GA 27-3093-2, *IBM Synchronous Data Link Control, General Information* and *How the* 3683 *Works* available from the IBM Corporation of Armonk, N.Y.

The invention includes the passive data monitor and collection system 38 for the store communications loops 32, 34, and 36. An unobtrusive or passive data tap 32a which monitors the receive port R of the communications loop 32 of the store controller 30. Similarly, the other communications loops, for example, loops 34 and 36, have passive data taps 34a and 36a, respectively. Such data taps monitor the transaction data on the communications loops 32, 34, and 36 without affecting the loop protocol or requiring additional store loop equipment, or any modification thereto. No status or any control data are exchanged with the communications loops and thus, the translation and deciphering of the messages on each loop must be accomplished independently by the data monitor 38.

An implementation for the passive data tap 32a connection of each store loop is shown in FIG. 8. The data tap is made by the parallel connection of a two-wire cable 33 to a standard junction box 35 (usually used in connecting the point-of-sale terminals in the loop). Instead of a serial connection whereby the transmit and receive sides of the junction box 35 are separated by a point-of-sale terminal, the sides are jumped together by jumpers 37, and the cable 33 is connected across the transmission line in parallel. The connection is made between the last terminal N on the loop and the receive port R, thereby allowing monitoring of all message traffic on the half duplex network.

The data monitor 38 further includes a protocol converter 40 for converting the phase encoded information on the communications loops 32, 34 and 36 into a standard digital format. The standard digital format chosen for the preferred embodiment is RS 232, which is used for serial data communications. The protocol converter 40 is linked by the RS 232 protocol to a processor system which collects and stores the transaction data monitored on each of the communications loops 32, 34 and 36. The processor system comprises a standard microcomputer configuration including a central processing unit (CPU) 42, a CRT display 44 and a keyboard 46. Additionally, the CPU 42 can be accompanied by nonvolatile memory including a floppy disk 48 and hard disk 50. The data monitor and collection system 38 further includes means to transmit the collected transaction data to the host information processor 18 over a communications link, such as a telephone line 53.

Figure 9:
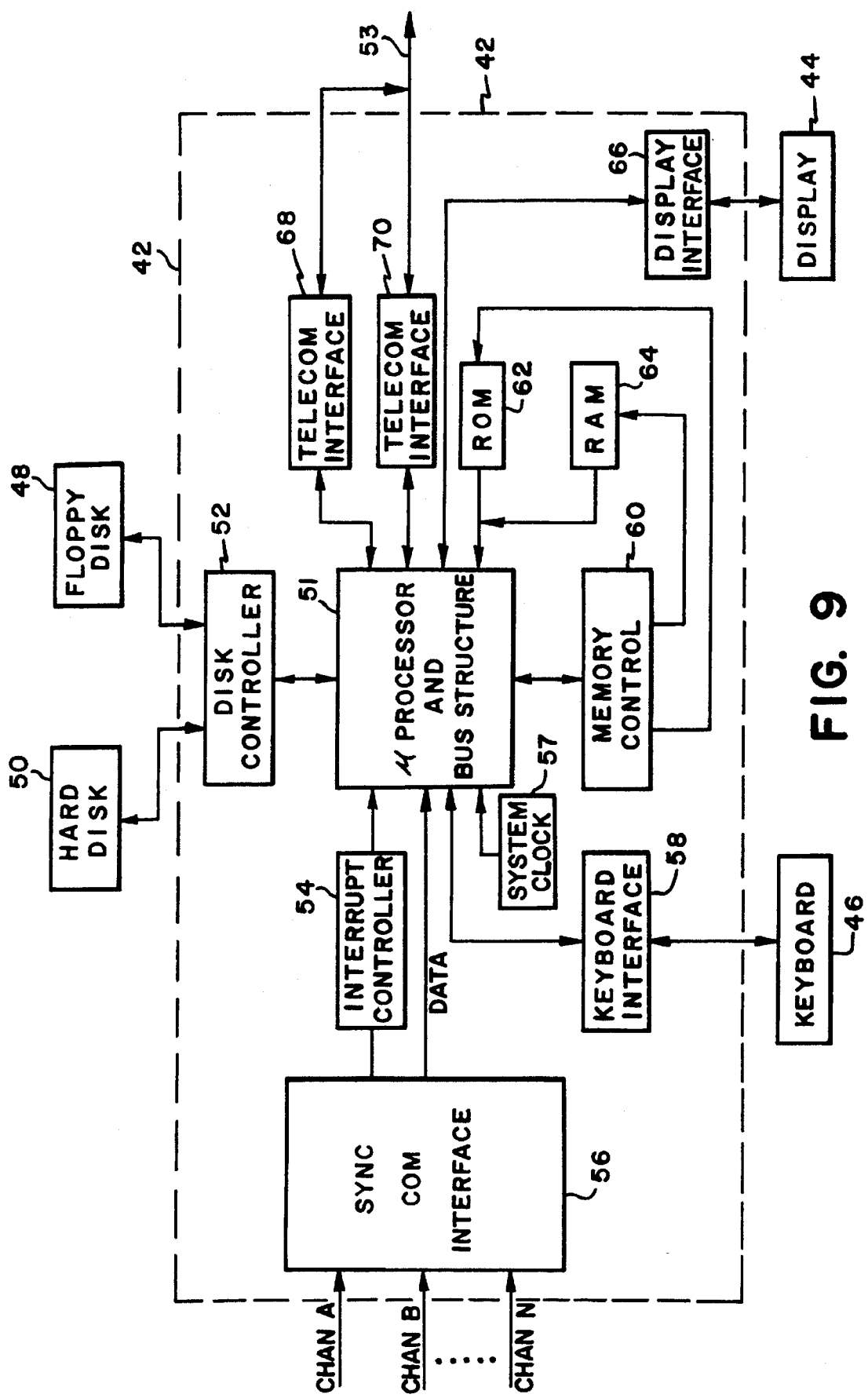
FIG. 9 is a detailed hardware block diagram of the passive data monitor illustrated in FIG. 2.

FIG. 9 is a more detailed system block diagram of the hardware configuration of the CPU or processor means 42. The processor means 42 is controlled by a microprocessor 51 which, by means of its peripheral devices is able to communicate to and receive information from the protocol converter 40 and the telecommunications link 53. The microprocessor 51 receives the transaction information from the protocol converter 40 via a synchronous communications interface 56. The synchronous communications interface 56 assembles the transaction data bit by bit into characters (bytes) from the RS 232 communications protocol and provides these characters as data on a bus to the microprocessor 51 for storage into its memory.

The microprocessor 51 controls an external memory including a read only memory 62 and a random access memory 64 via a memory control 60. Further, mass storage memory including the hard disk 50 and the floppy disk 48 are controlled through a standard disk controller 52. External information is exchanged with the keyboard 46 through a keyboard interface 58 and communications with the display 44 is via a display interface 66. The microprocessor 51 further includes the ability to control and communicate with two telecommunications interface boards 68 and 70. The microprocessor 51 receives information through the telecommunications interface 68 for maintenance purposes and transmits the sales data to the host information processor 18 from telecommunications interface 70 via the link 53.

In this configuration the CPU 42 of the data monitor and collection system 38 can be embodied by an IBM personal computer (PC) or a compatible personal computer which is expandable. Such personal computers include expansion slots into which printed circuit boards can be inserted for the addition and control of peripheral devices. The invention makes use of this capability of the open PC structure to utilize a separate board for the synchronous communications interface 56. Such board can comprise a universal communications adapter board, Model No. PS-UC1A/UC2A made by ABM Computer Systems of Irving, Calif. 92714. Such communication boards are dual channel for receiving RS 232 information and connect directly to the internal data and control bus structure of the personal computer 51 and to the interrupt controller 54.

The display interface 66 can be a single display interface card termed an Overboard made by IDE Associates, and can include a system clock 57. The disk controller 52 can be a standard card, for example, a WDX 1002-WX1 made by Western Digital. The keyboard interface 58, interrupt controller 54, and memory control 60 are an integral parts of the motherboard of the IBM PC microcomputer. The host communications interface 70 preferably is a Bell 201 compatible modem that provides a 3780 IBM binary synchronous protocol interface to transmit the panelist and item movement files to the host processor 18. It can, for example, comprise a Sync-Up BSC modem/software package produced by Universal Data Systems. A standard Bell 212 compatible 1200 baud modem is used for interface 68, such as a VAR 1200 modem made by U.S. Robotics.

Figure 11:
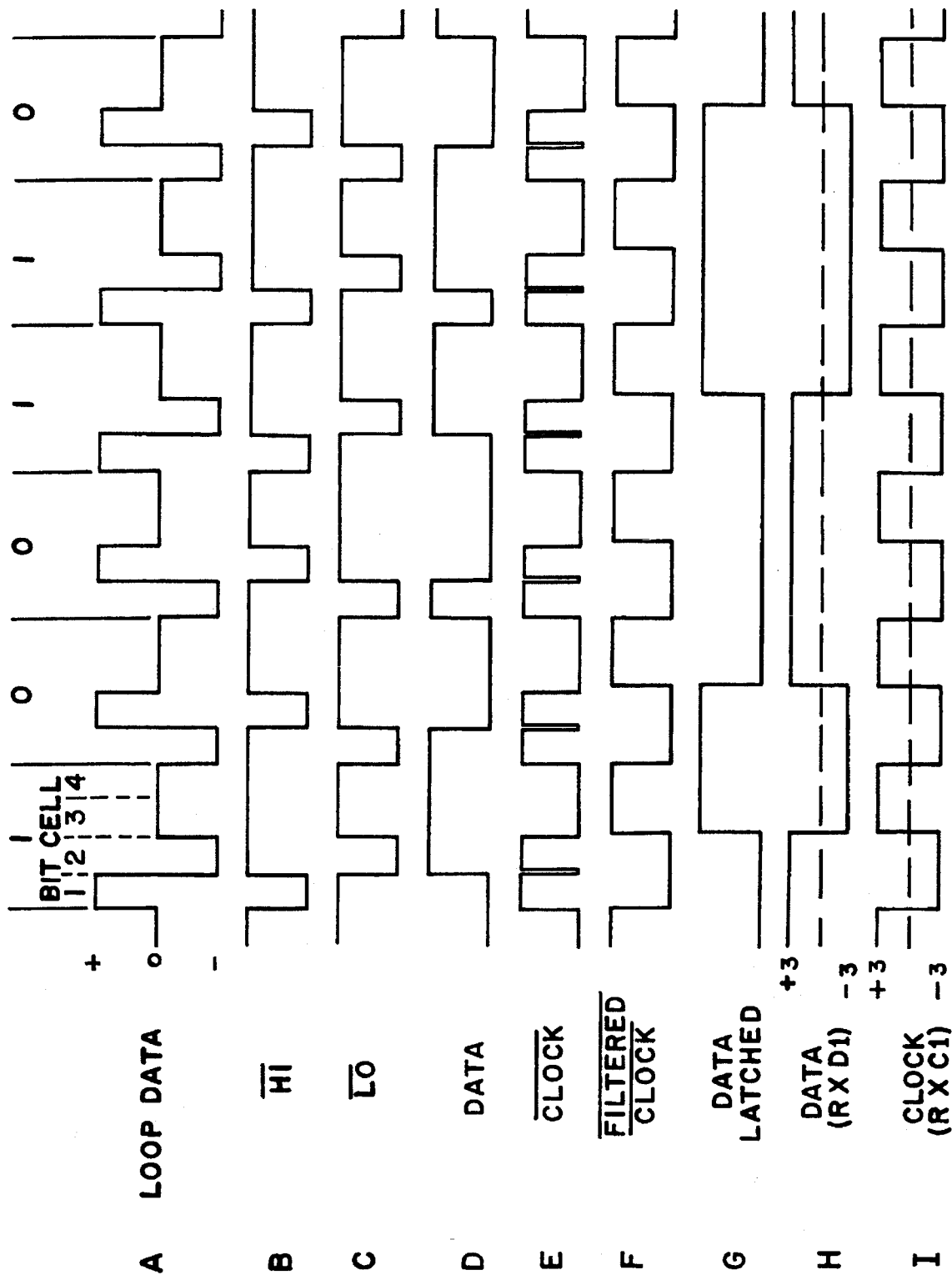
FIG. 11 is a group of pictorial representations of waveform diagrams of the protocol converter at various points of the schematic illustrated in FIG. 10.

The data transmitted on each store loop is converted from normal logic levels at the point-of-sale terminals and store controller to a phase encoded protocol by loop interface circuitry before being sent on the communications network. As shown in FIG. 11a, each bit cell length is divided into four equal parts. The first two parts are a phase encoding of a bit value, either a 1 or 0, and the second two parts are a clock signal. A transition from a high level to a low level between the first part and the second part of a bit cell is a phase encoded 1, and a transition from a low level to a high level between the first and second part, is a phase encoded 0. This phase encoded protocol is difficult to work with for the processor 42 of the data monitor and collection system 38. The function of the data protocol converter 40 is to convert this phase encoded loop data into a standard digital format such as RS 232 synchronous protocol data. The SCI 56 then easily handles two channels of the synchronous data in SDLC format by programming the board accordingly. The SCI 56 can also be a readily available product that accepts a multiplicity of synchronous RS 232 protocol data channels.

Figure 10:
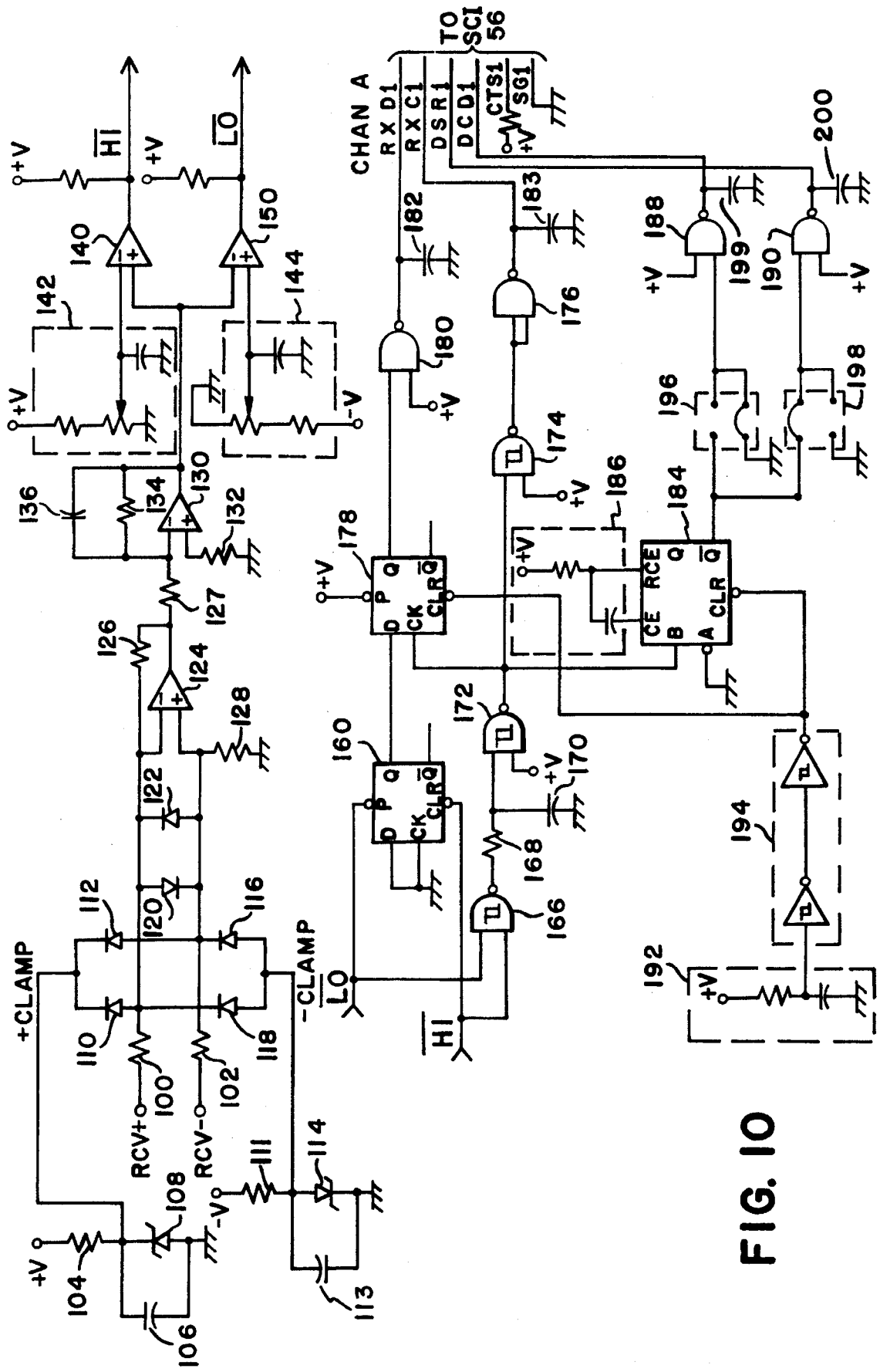
FIG. 10 is a detailed electrical schematic diagram of the protocol converter illustrated in FIG. 2.

The protocol converter 40 is a multiple channel interface which includes a plurality of identical circuits, each for converting the phase encoded data from one store loop into one channel of RS 232 data. The detailed circuitry for one of these conversion circuit means is more fully illustrated in FIG. 10. Each loop input cable 33 (FIG. 8) to the protocol converter 40 is a shielded twisted pair with a 10K resistor in series with each of the two input leads from the data tap 32a. This is done so that the apparent input impedance of the connecting cable to the loop is on the order of 20K ohms. The other end of the input cable connects to the protocol converter 40 connector having terminals RCV+ and RCV−. From these input terminals, the signals from the loop are applied through resistors 100 and 102, which are used to limit fault current and to further reduce impedance mismatches, to the protocol converter 40.

Across the input terminals RCV+, RCV− are connected respective clamping circuits, a voltage difference circuit, and a differential amplifier circuit. A first clamping circuit comprising a resistor 104, a capacitor 106, and a Zener diode 108 supplies a voltage +CLAMP to the cathodes of diodes 110 and 112. A second clamping circuit comprising a resistor 110, a capacitor 112, and a Zener diode 114 supplies a voltage −CLAMP to the anodes of diodes 116 and 118. Voltage difference diodes 120 and 122 are further connected across the receive terminals RCV+, RCV− in opposite polarity. The diodes 110, 112, 116, 118, 120, 122 in the clamping circuits provide input protection for an operational amplifier 124. Diodes 110, 112, 116 and 118 are used for common mode protection, and diodes 120 and 122 are used for differential mode protection. If a voltage of magnitude greater than +CLAMP or −CLAMP is applied on either input terminal, the overload current passing through the input resistors 100, 102 will be shunted to ground by either Zener diode 108 or Zener diode 114, depending on the polarity.

The received signals are then applied to the input of the operational amplifier 124, which is provided for isolation purposes and to provide a high impedance input. The operational amplifier 124 is configured as a linear amplifier having an approximate gain of one with a resistor 126 connected between its inverting terminal and its output terminal and a resistor 126 connected between its non-inverting terminal and ground.

The loop data are then coupled through a resistor 127 into an active filter comprising an operational amplifier 130 and its associated circuitry, resistors 132 and 134 and capacitor 136. The filter is used primarily as a low pass filter. The low pass 3 db point is set to 36 kHz, or roughly twice the highest frequency component of the phase encoded data. The operational amplifier 130 forming the filter provides some nominal gain because it was found that a better noise margin could be obtained by adding signal strength at this stage.

The filtered analog signal levels are applied to two differential comparators 140 and 150. The first comparator 140, formed from an operational amplifier and its associated circuitry, produces a digital signal *HI, which is the inversion of those time periods where the phase encoded data is at a voltage greater than a positive threshold level. The circuit operates by applying a threshold voltage derived from a circuit 142 to the inverting input of the operational amplifier 140. The phase encoded signals are applied to the non-inverting terminal. As a phase encoded signal makes a transition from a low level or zero level to a high level, it passes through the threshold and the operational amplifier makes a transition from a logical 1 level to a logical 0 level. When the phase encoded data then makes a transition from a high level to a low level or zero level, it passes through the threshold voltage causing the operational amplifier output to return to a logical 1 level.

Reversing the polarities, by applying a negative threshold voltage from a circuit 144 to the non-inverting input of the operational amplifier 150 and by applying the phase encoded signals to the inverting input, provides for the sensing of the opposite phase of the input waveform. The output of the operational amplifier 150 is the signal *LO, which is the inversion of the time periods when the data signal is less than the negative reference value. In operation, when the phase encoded data make a transition from a high level or from zero level to a low level, the output of the operational amplifier 150 will make a transition to a logical 1 level. Similarly, when the phase encoded data make a transition from a low level to a zero level or a high level, the voltage will exceed the negative threshold, and the operational amplifier 150 will return its output to a logical 1 level. The circuit to this point has converted the three level phase encoded data pictured in FIG. 11A to the digital (bilevel) signals *HI, *LO pictured in FIGS. 11B and 11C.

The logical value of the bit cells may be interpreted by the sequence of the states of the signals *HI and *LO. The data bit value for the phase encoded data is recovered by using the *HI and *LO signals to toggle a bistable 160. The signal *LO is connected to the preset input P of bistable 160 while the signal *HI is connected to the clear input CLR of the device. A phase encoded 1 (encoded as a high to low transition) will first clear, then set, the bistable 160 such that its data output Q will equal a logical 1. A logical 0 is latched into the Q output of the bistable 160 upon a phase encoded low to high transition by first setting, and then clearing, the device (See FIG. 11D.)

A clock signal as shown in FIG. 11E is decoded by sensing a coincident absence of both the *HI and *LO signals by means of a NAND gate 166. This decoding strips the signal of its phase encoded data leaving only the clock. However, because of the transitions by the differential comparators 140, 150 a false clock may appear between the two signals. Thus, a filter comprising a resistor 168 and a capacitor 170 is used to eliminate the possible small spike between the two signals (See FIG. 11F.)

The filtered clock signal as shown in FIG. 11F is applied to three paths of the circuit from this point. The first path is through a set of NAND gates 172, 174, and inverter 176 for shaping the edges of the signal to become the receive clock signal RXC1 (FIG. 11I) for the RS 232 format. The second path is to the clock input CK of a D-type bistable 178 which has the decoded data of FIG. 11D applied to its D-input. The bistable 178 resynchronizes the data to the clock and then transmits the latched data as shown in FIG. 11G to one input of a NAND gate 180. The output of NAND gate 180 becomes the receive data signal RXD1 (FIG. 11H) in RS 232 format, after shaping by a capacitor 182.

The third path is to a monostable 184. A timing circuit 186 sets the duration of the pulse triggered by the high to low transition of the clock signal from the NAND gate 172 at its input B. The pulse, which is synchronous with the clock transition, can be jumped to a NAND gate 188 or a NAND gate 190 by circuits 196 and 198, respectively. These pulses are used to generate either the data set ready signal DSR1 or the carrier detect signal DCD1 for the RS 232 format, as necessary, depending upon the device to which the protocol converter 40 is connected. Capacitors 199 and 200 provide shaping. A power on reset is provided to the bistable 178 and the monostable 184 through inverters 194 and a timing circuit 192. Because the protocol converter 40 is a receive only device, the clear to send signal CTS1 is always held at a high logic level, and a signal ground SG1 is generated to complete the set of RS 232 format signals.

Figure 12:
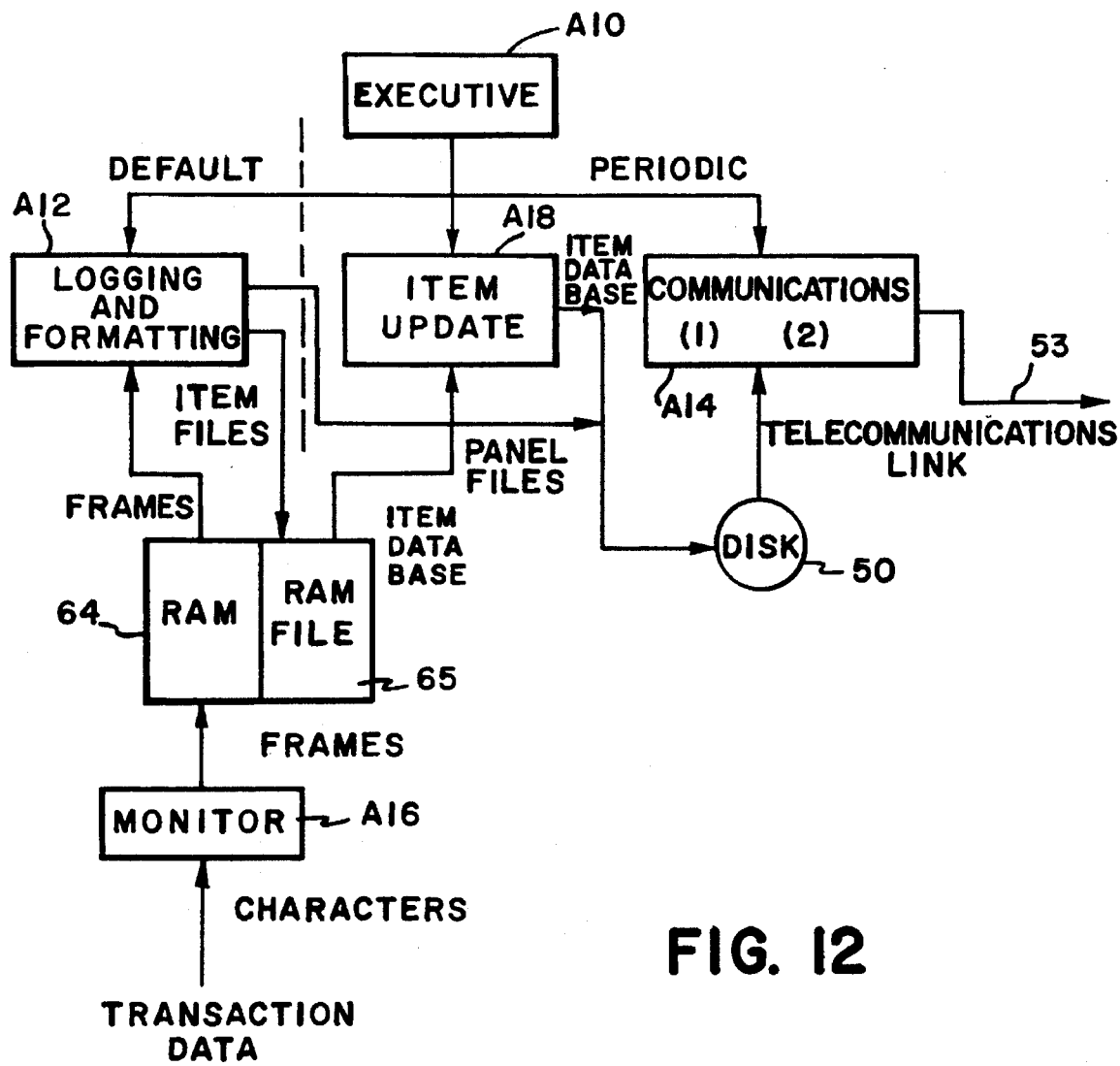
FIG. 12 is a system flow chart illustrating the functional operation of the passive data monitor illustrated in FIG. 2.

The system program which is loaded into the memory of the CPU 42 and controls the passive data monitor and collection system 38 is more fully detailed in FIG. 12. The system program comprises an executive routine A10 which controls operation and timing of the system by calling the operating routines. In general, the executive routine A10 calls a logging and formatting routine A12 to obtain transaction data from the RAM storage 64. This information is formatted and parsed into market research records or files by routine A12. The files preferably are of two kinds, panelist files and item files, where panelist files are directly written to the hard disk 50 and where item files are used to update an item movement data base in a section of the RAM 64 termed the RAM file 65. An item update routine A18 periodically moves the latest item movement data base to the hard disk 50.

The market research data files which are stored on the hard disk 50 are transferred via the telecommunications link 53 to the host processor 18 by a communications routine A14. The communications routine A14 is called at a particular time (periodically) by the executive routine A10. Preferably, the communications routine A14 is formed in two parts where panelist files are transferred daily by a first part and item movement data base files are transferred weekly by a second part.

The transaction data in the RAM 64 which are processed by the logging and formatting routine A12 are frame data which were placed there by a monitoring routine A16. The monitoring routine A16 is a memory resident and interrupt driven routine which assembles the characters from the protocol converter 40 and SCI 56 into frames and parses them into a transaction list. The monitoring routine A16 directly interfaces with the synchronous communication interface 56 to format incoming character data on an interrupt basis into frames which can be stored in the RAM 64 in the transaction list which is then handled by the logging and formatting routine A12 in background processing.

The system runs as a semi-multitasking system where the monitor routine A16 is interrupt driven and continuously monitors the transaction data being received from the multiple store loops. When not assembling frames and the transaction list in foreground, the data monitor and collection system 38 is attending to the logging and formatting of the frames into files, or the transfer of files on the telecommunications link 53 in background. The selection of which background routine to execute is made by segregating each into the categories of periodic or default. The system runs the periodic programs at particular time and runs the default programs when no periodic program is scheduled. In the present implementation, the first and second communications routine A14 and the item update routine A18 are called periodically. The logging and formatting routine A12 is called as a default when no periodic routine is scheduled.

Figure 13:
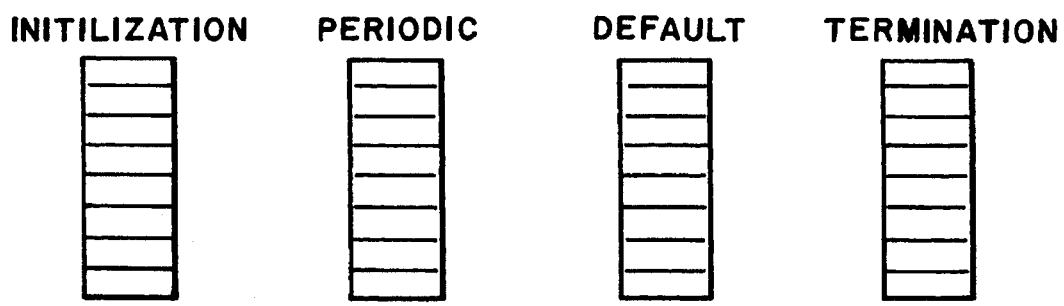
FIG. 13 is a representative illustration of the file structure of the executive routine for the passive data monitor illustrated in FIG. 2.
Figure 14:
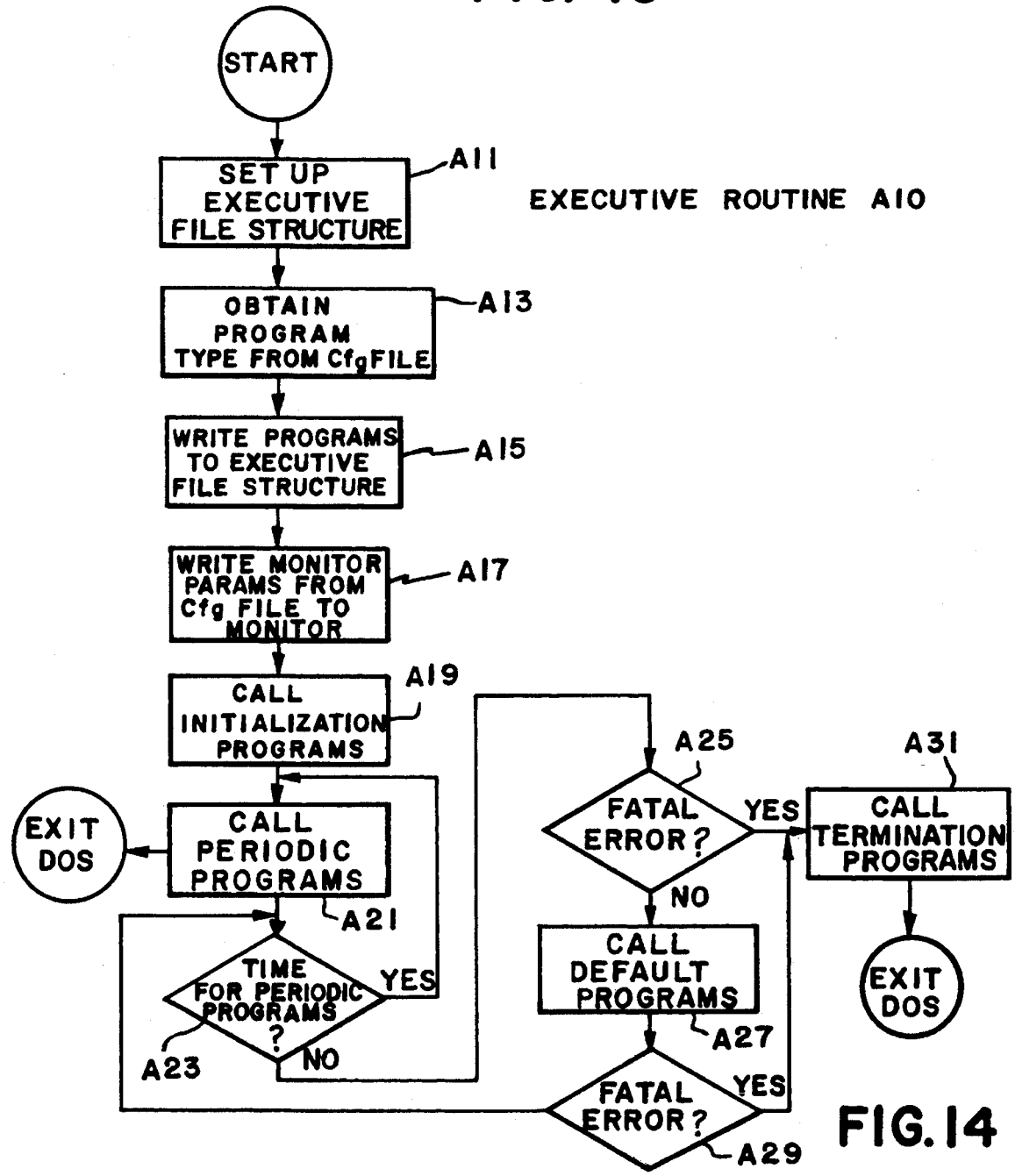
FIG. 14 is a detailed flow chart of the executive routine illustrated in FIG. 12.

The basic flow chart for the executive routine and its file structure are more fully disclosed in FIG. 14 and FIG. 13, respectively. The executive file structure contains four types of programs which are called from lists where the program routine name is associated with a pointer addressing the start of the program. The first type of file is an initialization file which contains those programs needed to start the system. The second type of file is a periodic program file which indicates a group of programs which should be run at a specific time. Therefore, associated with each program entry is a time, or time and date, at which the periodic program should be started and a window parameter that allows the program to be started anytime within that duration around its starting time. The third type of file structure for the executive routine is a default program list where, if the periodic programs are not running, the default programming list is entered and the programs on it are executed in order. The final file structure for the executive routine is a termination list which handles errors from the initialization, periodic, and default programs to terminate the system in a particular state if fatal errors occur.

The system flow chart for the executive routine A10 is more fully illustrated in FIG. 14. The executive routine A10 is called by the disk operating system as an application program. Initially, in Block A11 the executive routine sets up the executive file structure as described previously. It then reads a configuration file in Block A13 where it obtains information indicating which programs are to be loaded into the executive file structures. In Block A15, the executive routine writes the particular programs into the executive file structure thereby configuring the initialization, periodic, default, and termination programs for the system. In Block A17, routine then obtains a group of parameters from the configuration file and writes them to a configuration file for the monitor routine A16, determining such things as loop speed, data format, and collection mode.

Once the monitor parameters file is formed, the executive routine A10 starts the system by calling the initialization programs in Block A19. One of the initialization programs initializes the monitor routine A16 and makes it memory resident such that it can collect data independently from the execution of the background processing of executive routine A10. Once the initialization programs are completed, the executive routine A10 begins a background processing loop which is interrupted by the processor 42 to servicing interrupts for the monitor routine A16 and to fulfill other special circumstances.

Otherwise, the executive routine constantly executes the path through Blocks A21, A23, A25, A27 and A29 while the system is running. In Block A21, each of the periodic programs are called when the executive routine finds that their particular calling time has been established. Otherwise, in Block A27 the default programs are called. Only if there is a fatal error on a call of a periodic program or a default program, as determined by Blocks A25 and A29 respectively, does the executive routine A10 call the termination programs in Block A31. Which termination program that is called depends upon the error. Generally, a fatal error requiring a termination program shuts down the system and thereafter it exits to the disk operating system (DOS). The communications programs A14, as will be more fully explained hereinafter, have an exit to the disk operating system. Recovery of the executive routine A10 is by an autoexec batch file call to the program from the operating system.

FIG. 15 illustrates the configuration file which is typed into the system on the keyboard 46 before initialization of the system. This task can be accomplished by any type of word editor. The configuration file is of four parts A1, A3, A5 and A7. The first part A1 relates to the parameters which are used to form a parameters file for the monitor routine A16. The version of the software is set forth to allow the initialization routine to check whether the system loaded into the microcomputer 42 is that to which the configuration file corresponds. A monitor parameter section then indicates in a mode field whether panelist data, item movement data, or both, should be collected. The store number follows, which indicates an assigned code for the particular location in the market research collection system of the data monitor and collection system 38. A data mode field indicates whether the point-of-sale terminals transmit in compressed or uncompressed SDLC format. A window size parameter is set for the system configuration where the parameter indicates the number of frames to be collected before such are parsed into transaction blocks. The next entry is the line speed indicating the baud rate of the communications on the store loops 32, 34, and 36. The two entries following indicate whether the data is NRZ or NRZI type data and whether the transmission format is duplex or half duplex. Thereafter, an entry is inserted to indicate whether the communications line is switched or dedicated, and whether the system must hang up upon termination of the monitoring. The subsequent entries in part A1 are terminal addresses, corresponding to each of the point-of-sale terminals in the store. While each point-of-sale terminal may belong to the same or a different loop, they can be differentiated by having a unique terminal address such that their loop position is inconsequential.

Part A3 is a list of initialization programs which must be loaded into the executive routine file structure. In the particular embodiment, the program SLMINIT is used to initialize the monitor routine and is the only program in that file structure.

Part A5 indicates the periodic programs and commands which are loaded into the periodic list of the executive file structure to be run at a particular time. The item update routine A18 is the first periodic program to be run and is set for execution at time 0000. The structure also provides set up and clean up programs that can be run prior and following the main periodic program, respectively. Error 1 indicates a DOS command that is executed if the periodic program fails. Another DOS command executed at time 0055 causes the batch file DORJE to be run and causes the executive routine to exit to the disk operating system. This is the call for the first and second communications routine A14 which transfer the panelist records and item movement records to the host processor 18 over the telecommunications link 53.

The last part A7 of the configuration file is the list of default routines. In the present system, the only default routine that is called is the logging and formatting routine A12. The error quit 3 line is a disk operating system command which is executed upon finding an error in the running of the default program.

Figure 16:
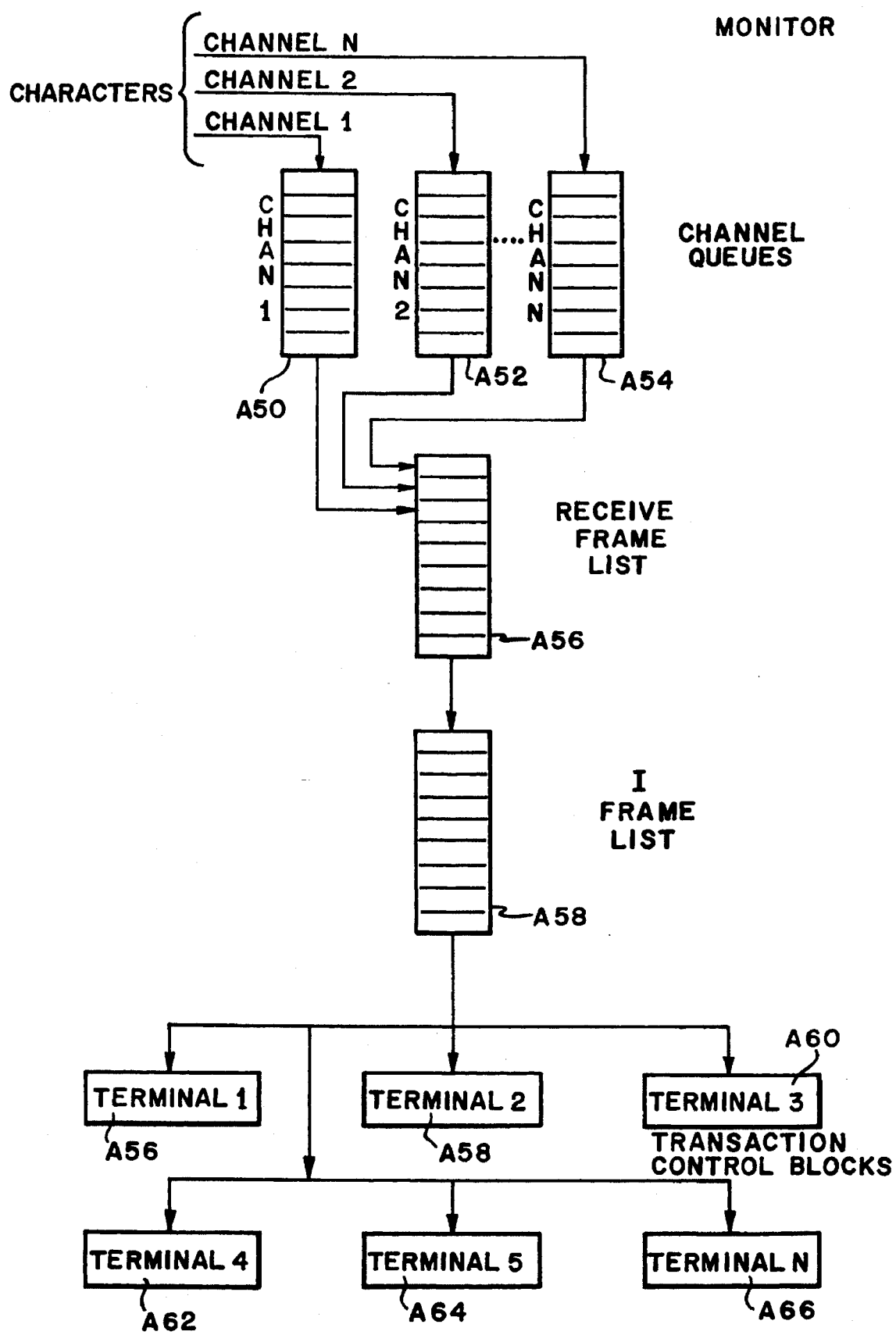
FIG. 16 is a pictorial representation of the data flow through the monitoring routine illustrated in FIG. 12.
Figure 17:
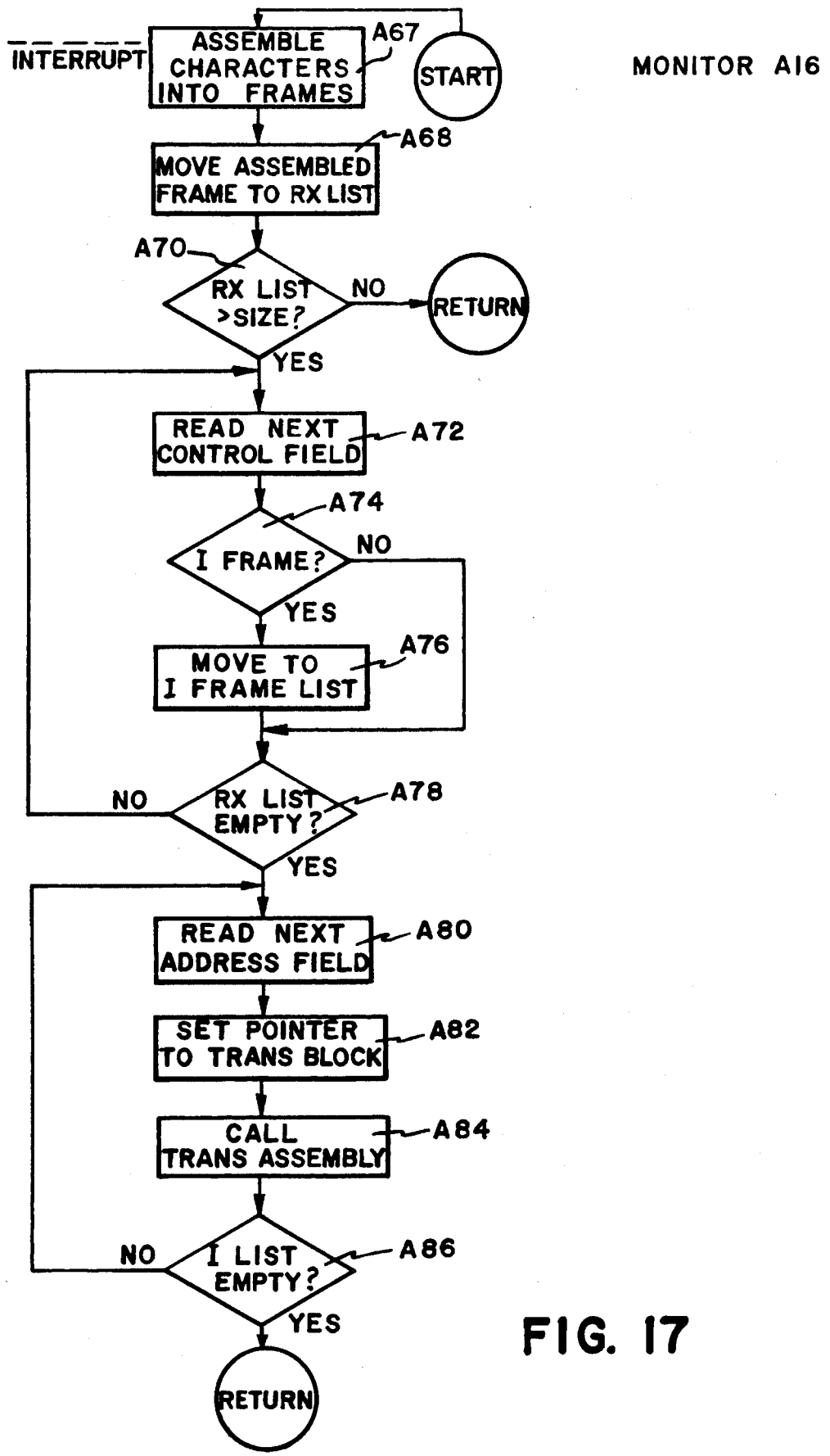
FIG. 17 is a detailed flow chart of the monitor routine illustrated in FIG. 12.

FIG. 16 shows the monitor routine data structure which will be generally described in relationship to the software flowchart for the monitor routine A16 illustrated in FIG. 17. As the characters from the synchronous communication interface 56 are received and assembled, they interrupt the microprocessor 51. Depending upon which channel 1 . . . N is interrupting, the microprocessor 51 calls an interrupt handler routine to take the characters from the synchronous interface 56 and place them into their respective channel queues A50, A52 and A54. The interrupt handler routine recognizes interrupts not only as individual characters from SCI 56 but also those interrupts indicating the beginning of a frame and the end of a frame. The interrupt handler routine assembles the characters from different channels into frames in each queue as indicated in Block B67.

Once a frame, or several frames have been assembled as the particular queue, the monitor calls a program illustrated as Block A68 in FIG. 17 to move the assembled frame to a receive frame list A56. The receive frame list contains all the frames in the chronological order in which they are received by the channel queues A50, A52, and A54. Once a frame has been moved to the receive frame list A56, the monitor routine A16 checks to determine if the receive list A56 is greater than a particular size in Block A70. If not, then the program returns immediately to other background and interrupt processing. This process continues until the test in Block A70 is affirmatively passed.

When the receive frame list A56 has collected enough frames, the monitor routine A16 in Block A72 reads the control field for the starting frame in the receive list A56. A test is accomplished in Block A74 to determine whether that frame format is an information frame (I type). If it is an information frame, the frame is moved to an information frame list A58, otherwise, it is discarded. In Block A78 it is determined whether the receive frame list A56 is empty. If it is not, then the monitor routine A16 loops back to Block A72 where the control field for the next frame in the receive frame list is read. This part of the routine essentially discards or ignores frames which are not information type frames in the receive frame list. If, however, in Block A74 the routine A16 finds that the frame is an information type, it transfers that frame to the I frame list A58 by a program called in Block A76. This operation continues until all the frames on the receive frame list A56 are either discarded or transferred to the I frame list A58.

The I frame list A58 is then sorted by reading the address field of the frame in Block A80 to determine which point-of-sale terminal the frame corresponds to. In Block A82, based on a plurality of address fields, the routine sets a pointer to one of the transaction control blocks A56–A66, each of which is associated with a particular terminal. Thereafter, a routine transaction assembly is called in Block A84 to assemble the I frames into a transaction list with the aid of the respective transaction control block for a particular terminal. After the transaction assembly routine returns, the I frame list A58 is tested in Block A86 to determine whether or not it is empty. If the information frame list A58 is empty, then the routine returns until the receive frame list A56 again exceeds the size parameter set for it. Otherwise, the routine will loop back to Block A80 until the I frame list A58 is completely assembled into the transaction Blocks A56–A66.

Figure 18:
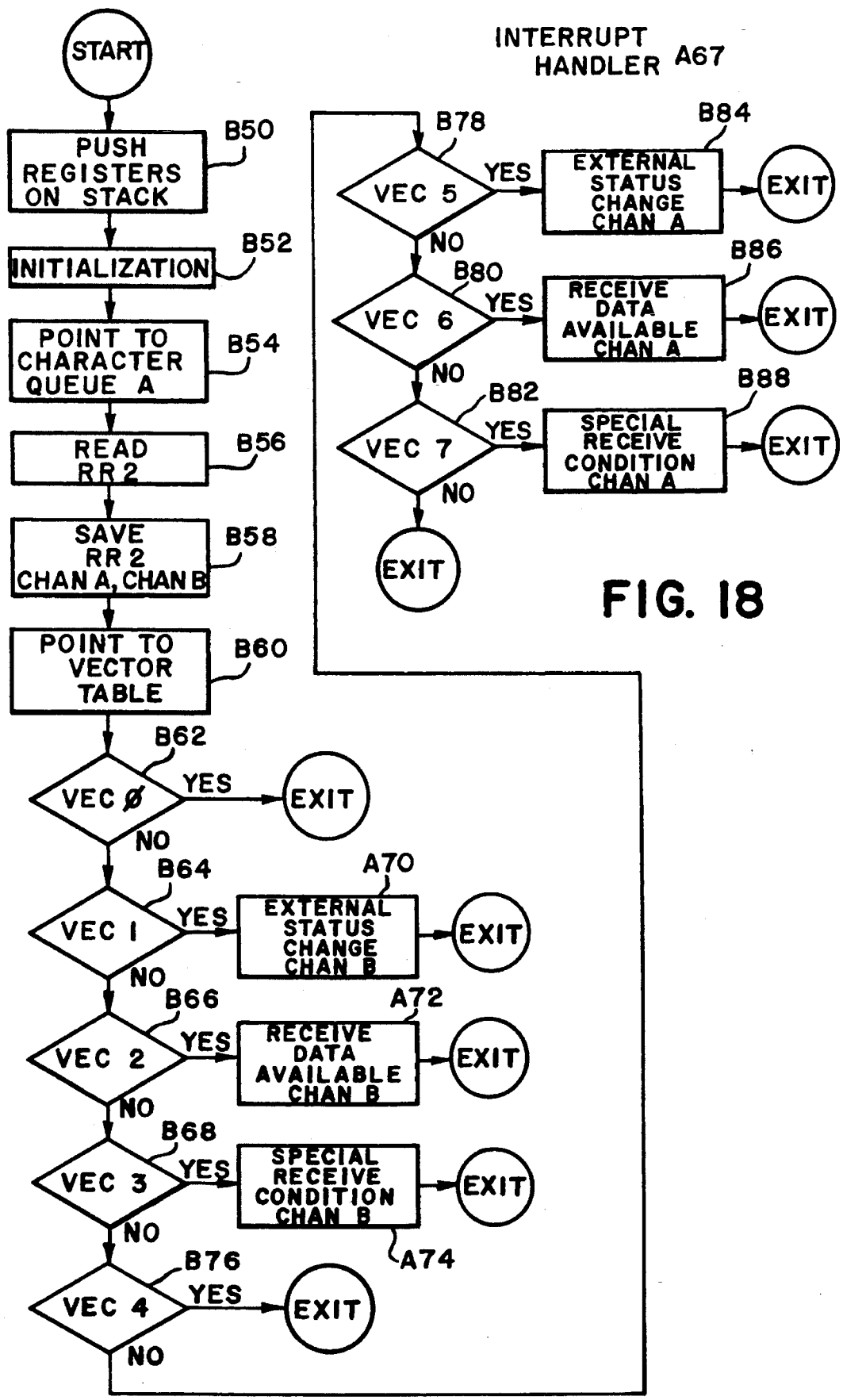
FIGS. 18 and 18A are a detailed flow chart of the interrupt portion of the monitor routine illustrated in FIG. 17.

The interrupt handler routine implementing block A67 of FIG. 17 is shown in more detail in FIG. 18. The interrupt handler routine handles messages from the SCI board 56 where it receives characters from the different channels and assembles them into frames. The interrupt handler routine acts as the software interface between the synchronous communications interface 56 and the monitor frame handling routines. The interrupt handler routine begins in Block A50 by pushing the registers on the stack of the microprocessor to save the state of the machine. Next, the communications with SCI 56 are initialized in Block A52, and in Block A54, the routine points to the character queue to initialize the space. The routine then reads the RR2 register of the SCI 56 in Block B56 to determine the cause of the interrupt by the board. The contents of this register are read into memory and saved in locations for Channel A and Channel B in Block B58. The vector returned from the SCI board 56 indicates that status of the communications between the microcomputer and the board so that individual vector handlers based on its value can be used to produce the operation needed. This is performed with a vector table addressed with the returned value in Block B60.

Vector 0, as sensed at Block B62, indicates that the transmit buffer for Channel B is empty. Likewise, the presence of Vector 4, as tested for in Block B76, indicates that the transmit buffer for Channel A is empty. These results are essentially NOPS for the system since the transmission capability of the SCI 56 is not used. Therefore, an affirmative result for these tests will cause the routine to exit. Vectors 1, 5 indicate at Blocks B64 and 78, respectively, external status changes in Channel B and Channel A, respectively, i.e., RS 232 control signal changes. Such status changes are processed by the vector handlers called in Blocks B70 and B84, respectively. When data are available for Channel B, Vector 2 as determined in Block B66, will be present. When data is available for Channel A, Vector 6 will be present, as tested for in Block A80. The data are processed by vector handlers B72 and B86, respectively. Special receive conditions for Channel B are handled in Block B74 and special received conditions for Channel A are handled in Block B88. These conditions are tested by the presence of the Vector 3 and Vector 7, respectively, at respective Blocks B68 and B82. After the handling of a particular status Vector, the routine will return from the particular vector handler that was called.

Figure 18A:
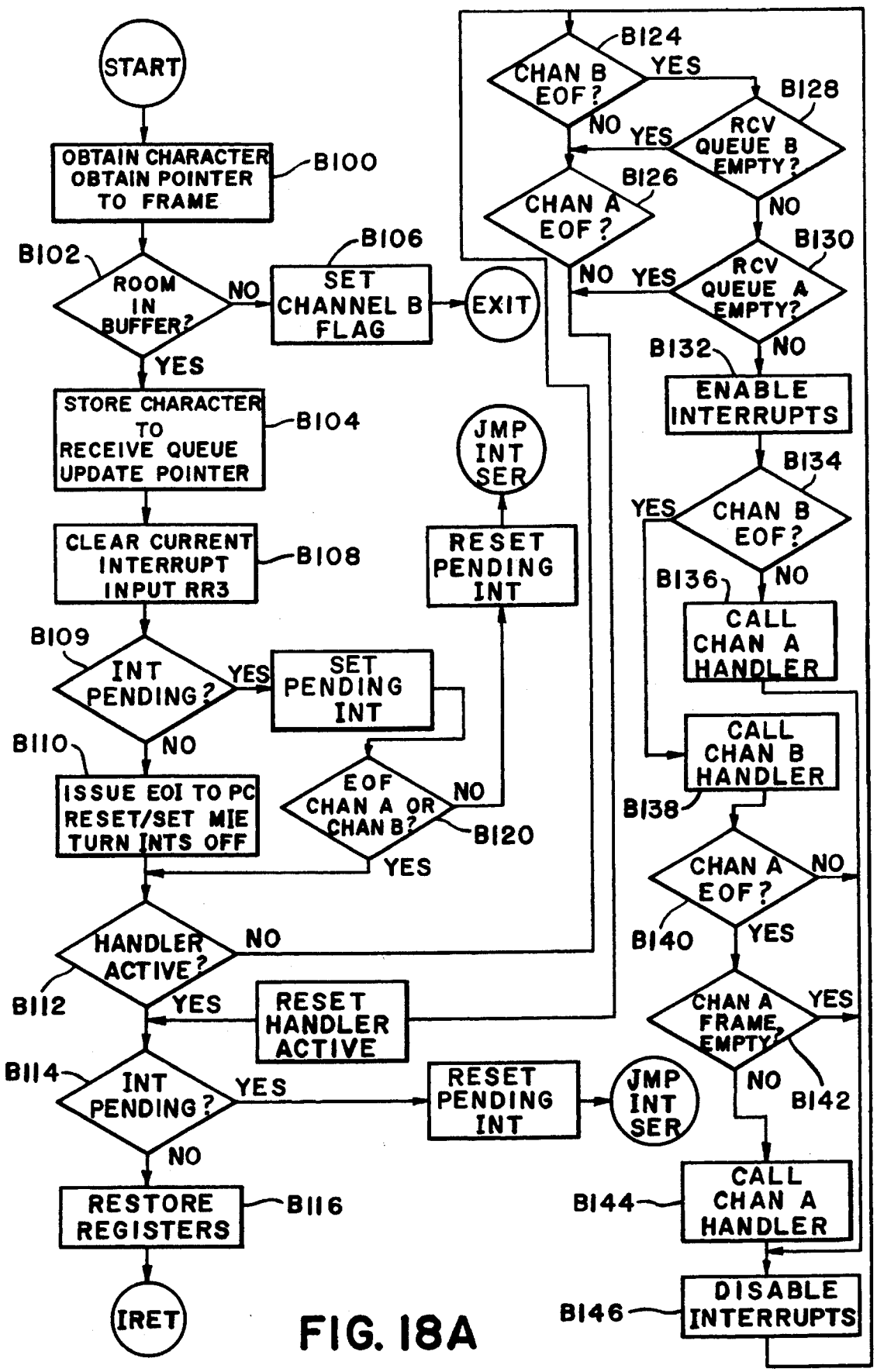

When the interrupt vector is either Vector 2 or Vector 6 receive data is available from the SCI 56 for channel B or channel A, respectively. The programs which handle the vectors are identical for the separate channels and therefore, only the channel B or vector 2 routine will now be set forth in detail. With reference to FIG. 18A, the routine begins in Block B100 by obtaining the available data character from the data buffer of the SCI 56. The routine then checks in Block B102 to determine if there is room in the channel B receive queue for the character. If there is space, the character is put into the next character cell of the frame being filled in Block B104. The pointer is updated at that time to the next cell of the frame in the queue, and the channel B flag set. If there is not space in the queue, the routine sets the channel B flag but exits from Block B106 to a queue overflow routine.

The highest priority interrupt pending on SCI 56 is then cleared in Block B108 and the register RR3 of the SCI 56 is read to determine if additional interrupts are pending. If there are no further interrupts pending, then the routine issues and end of interrupt, EOI, to the processor means 42 so that the interrupt controller can process interrupts from other devices. Further, the master interrupt enable MEI of the SCI 56 is toggled to allow the device to service further interrupts, and the interrupts are turned off in Block B110. Next, the channel B frame handler is tested to determine if it is active in Block B112. If the frame handler is busy, then it cannot be called and another test in Block B114 is used to again determine whether any more interrupts are pending. If there are no interrupts and the frame handler is active, the routine will exit by restoring the registers and enabling the hardware interrupts in Block B116. The return from the interrupt handler routine is first to one of the frame handlers A or B of the monitor routine A10 and then to the background processing of the executive routine, for example, the data logging and formatting routine A12.

If there are pending interrupts, either at Blocks B109 or B114, then the routine will exit to handle them. Initially, however, both exits set the pending interrupt flag false and then jump to the service interrupt location in FIG. 18.

However, if the routine determines in Block B120 that an end of frame flag has been set for either channel A or B and the frame handler routine B is not active in Block B112, then the routine will branch to Block B124 where a path for transferring the frames to the receive list is started.

Initially, the end of frame flags and the contents of each channel queue are tested in Blocks B124, B126, B128 and B130 to determine their status. If the routine determines that there are no end of frame flags set for channel A or channel B, or if the respective queues are empty, then the program will set the frame handler inactive and continue to the exit path through Blocks B114 and B116. However, if there is a non-empty receive queue and one of the end of frame flags is set, then the routine will begin a frame handler path at Block B132 by enabling the interrupts.

The channel B end of frame flag is tested in Block B134 and, if affirmative, the routine calls the channel B frame handler routine in Block B138. After the channel B frame handler returns from loading a frame to the receive list, the program continues by testing for the presence of the channel A end of frame flag in B140 and whether the channel A current frame is empty in Block B142. If the channel A handler has been interrupted and needs to continue, then in Block B144 it is called to complete execution of its previous task. Thereafter, in Block B146 the interrupts are disabled and the beginning of the path at Block B124 is entered. If in Block B134 the end of frame flag was for channel A, then a negative branch from that block will cause the channel A handler to be called in Block B136. After the channel A handler has transferred a frame to the receive list, its return is similar through Blocks B146 to Block B124.

The vector 3 and vector 7 processors handle certain special conditions. When a frame has a bad CRC or a data receive error, the frame is discarded. Similarly, if a point-of-sale terminal sends an abort during the transmission of a frame, that frame is discarded. Other special communications frames which do not contain information and are readily identified are discarded by these processors also. The ready receive and poll frames can be eliminated at this point without consuming further processing time. The main operations of these special condition processors, however, is to determine that a good frame has been received and set the end of frame flags for the channels. Flags are used at this point because the EOF interrupt and character available interrupt are handled by different vector handling routines. The end of frame flags are used to ensure that characters are being assembled into a new frame before the old one is passed to an upper level frame processing routine. Thus, the end of frame flag is used to test the availability of the data character in a separate vector routine. It is tested at this point because the communications frame handlers should not be called before another frame is set up to put incoming characters into. The data is continuous and must be handled as received. The frames are then passed up and parsed by various frame handling routines with interrupts enabled allowing another frame to be assembled while this processing takes place. This ability is finite because if another EOF occurs while the parsing routines are active, the handlers cannot be called "again". Therefore, the handler must return before the receive buffer overflows.

The routine TRANSACTION ASSEMBLY will now be more fully described by reference to FIGS. 19 and 20. The routine takes a frame from the I frame list and, depending upon the terminal address, assembles an associate transaction in a temporary transaction buffer. After the transaction is complete and separated from the other frames by its terminal number, the completed transaction is appended to a transaction list. This allows the I frame list to be easily and completely parsed into individual transactions which can be further processed by the system.

Figure 19:
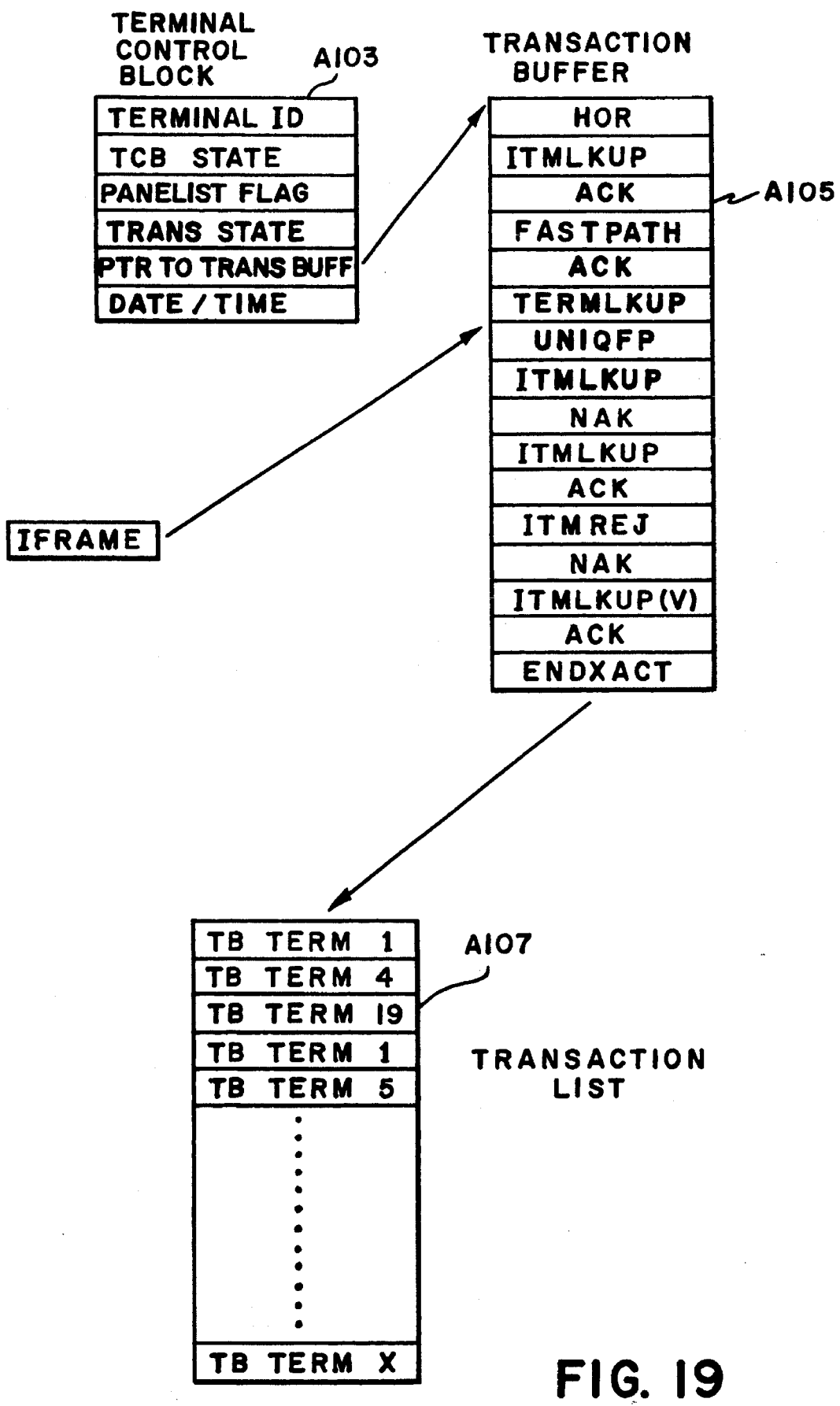
FIG. 19 is a pictorial representation of the data structures for the transaction assembly portion of the monitor routine illustrated in FIG. 17.

FIG. 19 illustrates the data structure that is used by the transaction assembly routine. At the time of initialization, a terminal control Block A103 is allocated for each terminal address in the configuration file. Each terminal control Block A103 contains a terminal identification number, the state of the terminal control block, which can be either available or in use. A panelist flag is also used to indicate whether or not a transaction is a panelist transaction. The control Block A103 includes a transaction state field which can be either in transaction while the program is assembling a transaction, between transactions while the program is waiting for a new header frame, or a transaction error which indicates that a major frame sequence error has been detected. Concluding the terminal control Block A103 is a pointer to a particular transaction buffer associated with a terminal where the transaction is being assembled frame by frame, and a date/time field where the time of allocation of the terminal control Block A103 was made. Frames from the I frame list are parsed into each transaction buffer by determining the terminal address. Once a good transaction has been assembled in a transaction buffer it is moved to the transaction list A107 which contains a list of transactions from all terminals.

Figure 20:
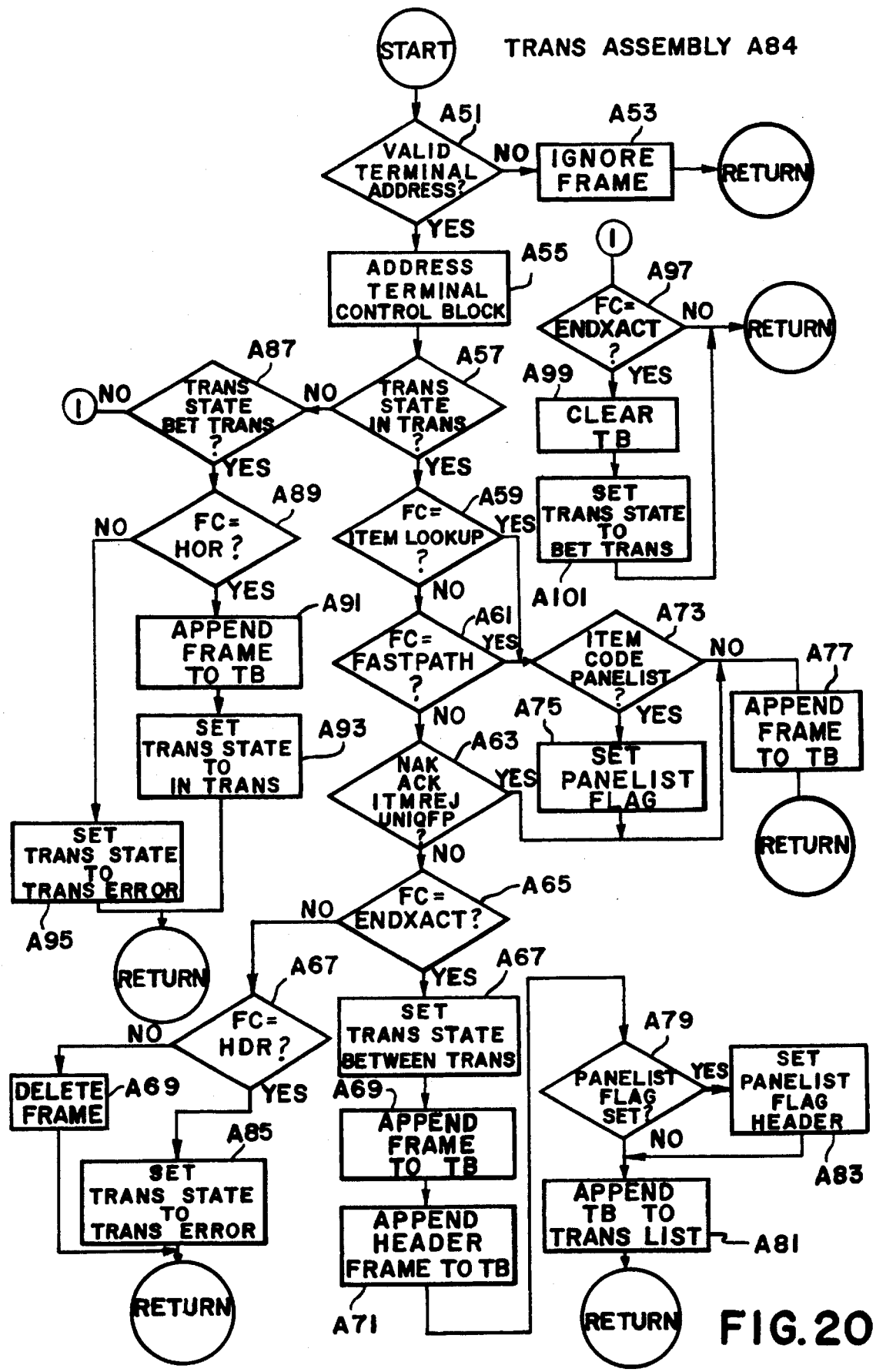
FIG. 20 is a detailed flow chart of transaction assembly portion of the monitoring routine illustrated in FIG. 12.

Referring to FIG. 20, the manner in which the transaction assembly routine accomplishes this task is by first determining the address of a frame in Block A51. If the frame address is not a valid terminal address, then the frame is ignored in Block A53 and the program immediately returns. However, if the address is valid, the program then obtains the address of the associated terminal control Block A103 in Block A55. Next, the transaction state of the terminal control Block A103 is tested in Block A57 and the routine branches to different parts of the programs depending upon that state.

If the transaction state is in transaction, then the program is building a transaction from the individual frames and the function codes of the frames are checked in Blocks A59–A65. Essentially, if the function code is either item lookup (A59), fast path (A61), negative acknowledge, positive acknowledge, item reject, unique fast path or terminal lookup (A63), then in Block A77 that frame is appended to the transaction buffer. The program will then return to obtain the next frame from the I list. Before the frame is appended to the transaction buffer, if it is a item lookup frame or a fast path frame, the item code is checked in Block A73 to determine whether a panelist number is contained therein. If such be the case, then the panelist flag in the terminal control Block A103 is set in Block A75 before the frame is appended to the transaction buffer.

If the function code is in transaction (A65), then the state is reset in Block A67 to between transactions to provide for the next assembling of frames in the transaction buffer. The end transaction frame is appended to the transaction buffer in Block A69, and an artificial header frame is appended to complete the transaction assembly in Block A71. Because it is the end of a transaction and the assembly took place as desired, the program will append the particular transaction buffer to the transaction list in Block A81. Before this is accomplished the program checks in Block A79 to determine if the panelist flag in the terminal control Block 103 is set. If it is, then in Block A83 a corresponding bit in the artificial flag header is set.

If the program is in the in transaction state in Block A57 and the routine does not recognize any of the allowable function codes by the time Block A65 is executed, then the particular function code of the current frame may be out of sequence. Thus, the program checks to determine if the function code is indicating a header frame in Block A67. If it is, then the transaction state is set to transaction error in Block A85. Otherwise, only the frame is deleted in Block A69 before returning.

If the routine has not yet started to build a transaction in the transaction buffer in Block A57, the transaction state of the system will be between transactions. This state is recognized at Block A87 and control of the program is transformed to Block A89 where the current frame is tested to determine whether its function code is a header. If it is, this is a beginning of a new transaction and the header frame is appended to the transaction buffer in Block A91 and the transaction state is set to in transaction in Block A93 before returning. If, however, the function code is not header in Block A89, then the negative branch of that test continues the path at Block A95. In Block A95 the transaction state is set to transaction error before the program returns.

When the program enters the path of Block A57 or Block A87, if the transaction state is transaction error, then the path will continue from the negative branch of Block A87 to Block A97. In Block A97 a test is performed to determine whether the function code of the present frame is the end transaction code. If not, the program immediately returns and waits for the end of transaction frame. Even though the transaction is out of sequence, this allows a full transaction to be collected before clearing the error. Thereafter, when the end of transaction frame is found in Block A97, the routine will clear the transaction buffer in Block A99 and reset the transaction state to between transactions in Block A101 before returning.

The transaction assembly routine assembles transactions from each of the terminals onto a transaction list A107. The transaction assembly is done in real time and asynchronously to either a single loop or multiple loops of the automated checkout system of the store. The transaction list can be built to a considerable length before the system loses any data and conceptually could be used to store enough transactions such that the data logging routine need only be called relatively infrequently. Because the routine works from the monitor routine, it must be fast acting and provide a parsing process which quickly identifies that relevant material while ignoring superfluous data. The sorting of the frames by control code for information frame format and then by address for building transactions allows a facile manipulation of the data which is needed to collect the market research information without wasting considerable processing time. Thereafter, only actual transactions which are already in a logical order need be processed in the background routine called by the executive routine.

Figure 23:
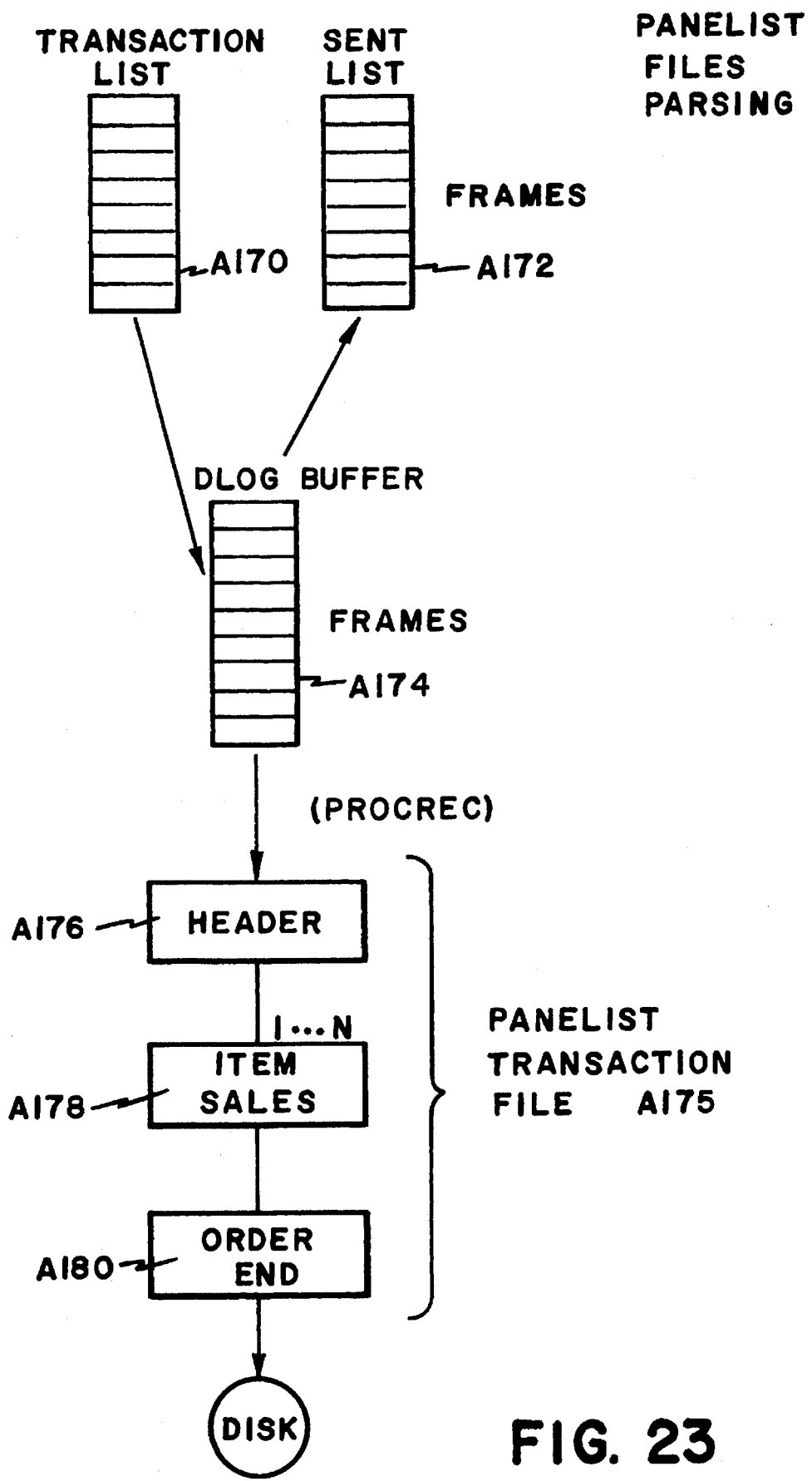
FIG. 23 is a pictorial representation of the data flow through the logging and formatting routine illustrated in FIG. 21 for the panelist files.
Figure 24:
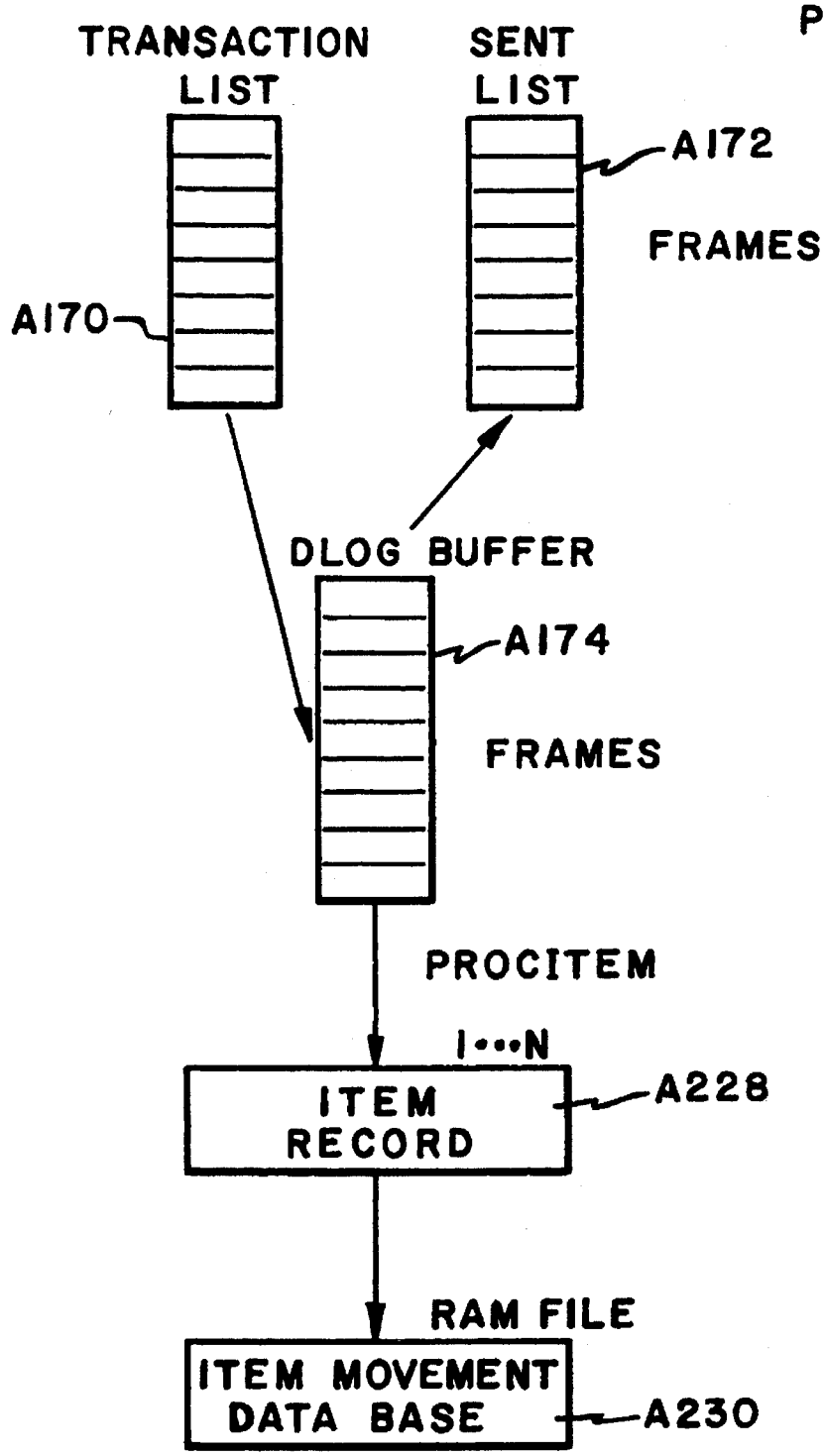
FIG. 24 is a pictorial representation of the data flow through the logging and formatting routine illustrated in FIG. 21 for the item movement files.

The logging and formatting routine A12 will now be more fully explained by reference to FIG. 21. A generalized flow chart for the logging and formatting routine is illustrated in that figure where the routine is called as a default routine of the executive routine A10 and runs when none of the periodic programs are running. The logging and formatting routine A12 transfers the frames of the transaction list A170 previously created by the monitor routine to its own buffer (DLOG) A174 as seen in FIGS. 23 and 24. From the DLOG buffer A174, the routine builds panelist transactions files A175 or item record files A228 depending upon the setting of the collection mode, with the routines PROCREC or PROCITEM, respectively. The panelist transaction files A175 are logged to the hard disk 50 by the routine, while the item records A228 are used to update are item movement data base A230.

Initially, the routine determines in Block A100 whether the monitor routine A16 is memory resident. If this test is passed in Block A102, the program continues in its normal sequence. Otherwise, there is no reason to attempt to move any data from the transaction list and the program returns immediately. At the start of the normal sequence in Block A104, a message is sent to the display 44 and in Block A106 the same message is sent to the external communications interface 68. These periodic messages, which can include a copyright marking, indicate that the system is running and is continuing to log data. The message sent to the interface 68 in Block A106 can be remotely monitored over the telecommunications link 53 in order to determine the operating status of the data monitor and collection system 38.

After these initial tasks are finished, the routine in Block A114 determines whether item movement data are to be collected by checking the collection mode setting in the configuration file. If they are, then the item movement data base is opened in the RAM file in Block A109. Otherwise, Block A109 is bypassed and the routine continues at Block A111. In that Block, the program determines whether or not the collection mode is set to accumulate panelist data. If panelist data are to be collected, the routine in Block A108 will open a panelist data file on the hard disk in order to log those data.

An assembly loop is then initiated in Block A110 by testing whether or not a loop count is equal to zero. If not, then a routine, process transaction loop is called in Block A112 to move the data from the transaction list to the DLOG buffer A174 and to form panel records and/or item movement records of the frames in the buffer. Depending upon the collection mode setting, the frames on the transaction list are parsed individually into data structures for the respective records. The record formats are made to be compatible with the host processor evaluation programs and identical among the multiplicity of data monitor and collection system 38 which form the overall market research collection system.

After one iteration of the assembly loop, the program decrements the loop count in Block A116 and proceeds through path A110, A112, and A116 once again if the loop count is not zero. The loop continues until the assembly routine has been called for the selected number of times. This allows the assembly routine to ensure that all the data stored by the monitor routine A10 on the transaction list have been processed because the transaction list is emptied in fixed size buffers. No partial transactions are left on the list by this type of processing.

When the logging and formatting routine A112 exits the assembly loop, the collection mode is again tested in Blocks A113 and A117 to determine which kind of data was collected. If item movement data were collected, then the RAM file is closed in Block A115, while if panelist data was collected the panelist disk file is closed in Block A119. The program returns to be called by the executive routine A10 during default periods.

Figure 22A:
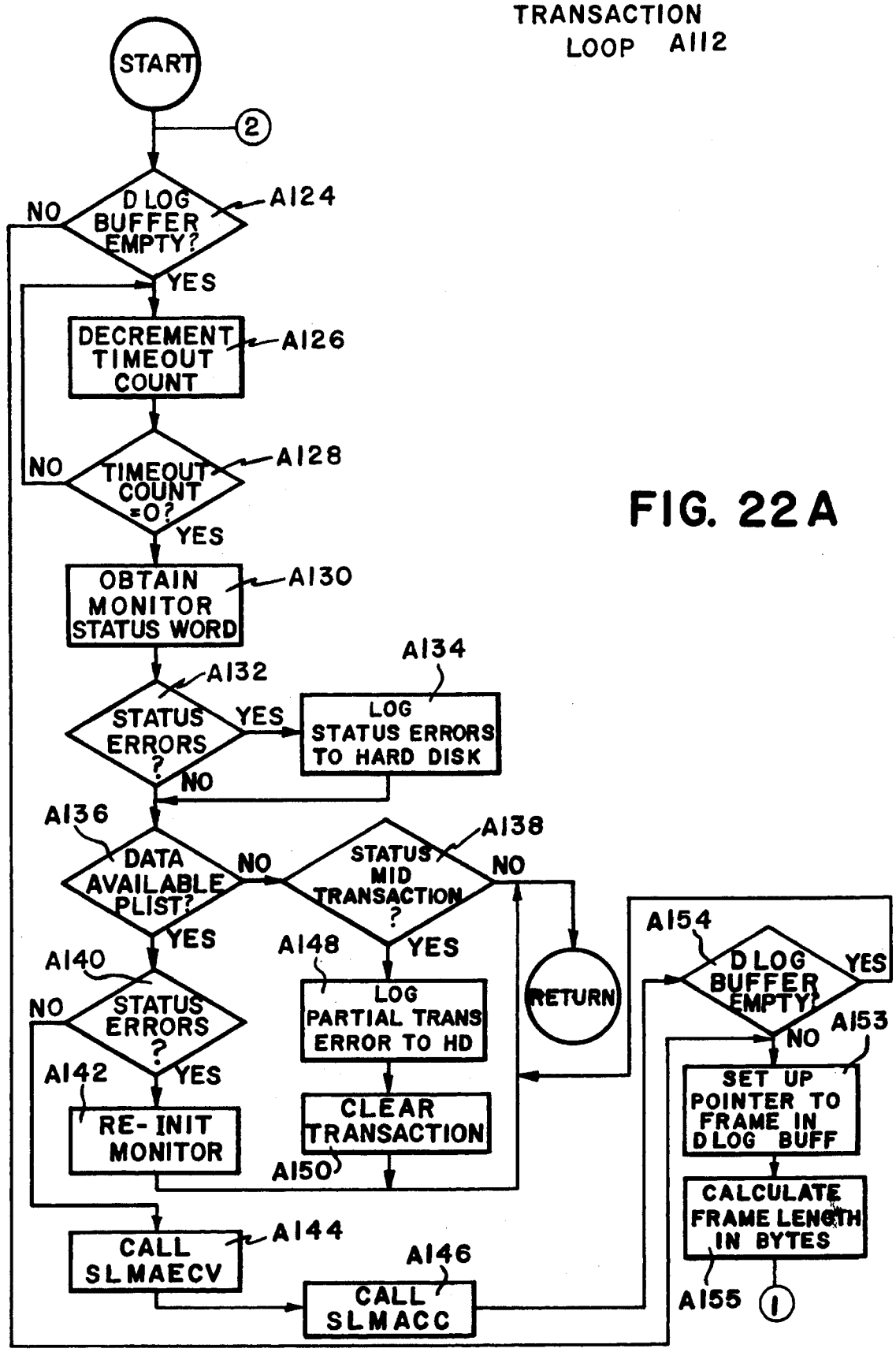
FIGS. 22A and 22B are a detailed flow chart of the process transaction loop routine illustrated in FIG. 21.
Figure 22B:
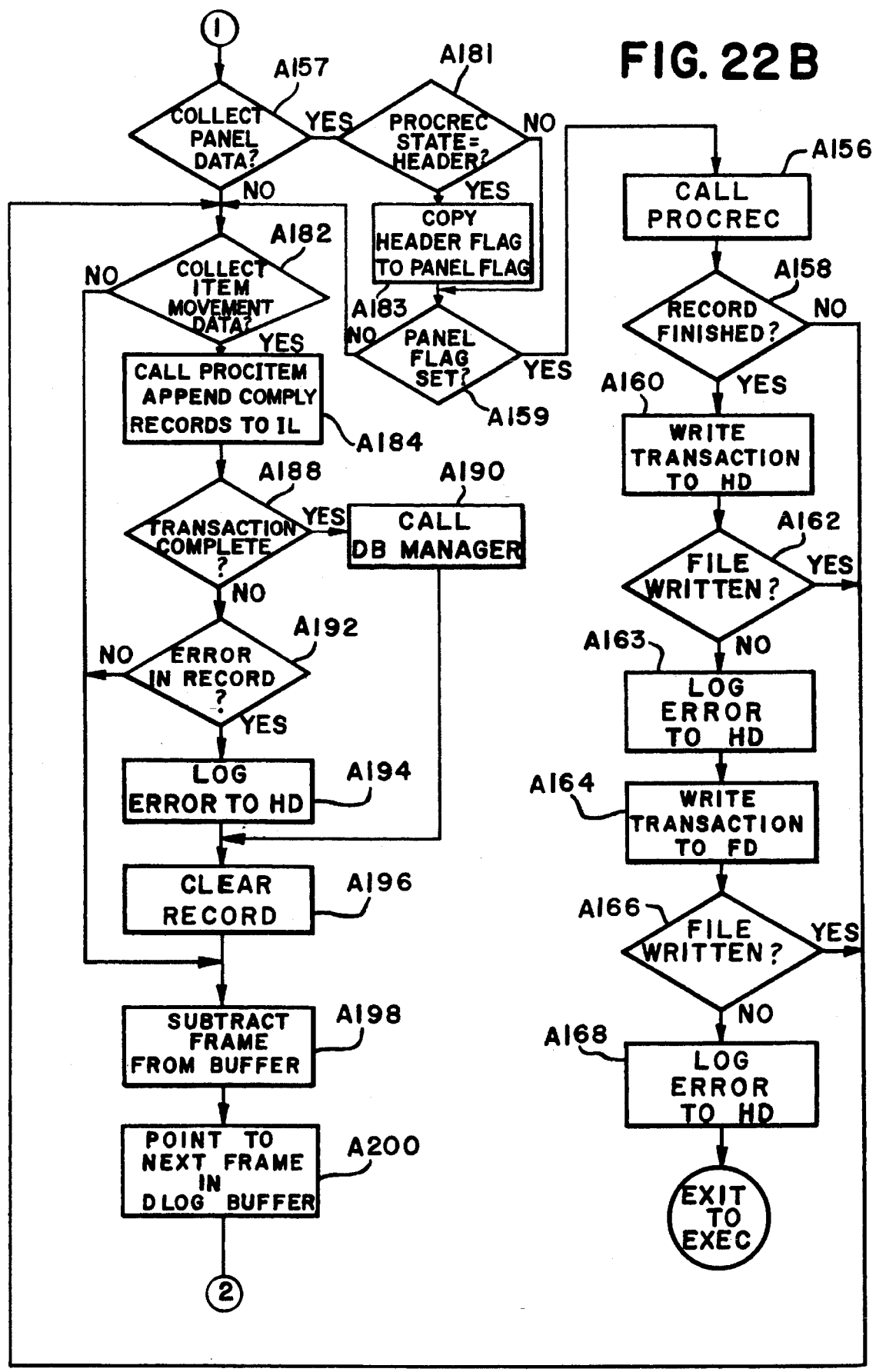

The routine process transaction loop A112, which processes the transaction list A107 and logs the data to the RAM file and/or hard disk will now be more fully explained with reference to FIGS. 22A and 22B. The processing of the transaction list begins in Block A124 by testing whether the DLOG buffer is empty. If the buffer be not empty, the routine addresses the frame in Block A153 and calculates its length in Block A155. Next, in Block A157, the state of the collection mode is tested to determine if panelist data are to be collected. In Block A182, the state of the collection mode is tested to determine if item movement data are to be collected. If only panelist data are to be collected, the routine takes the path through Blocks A156–A168 and then through Block A182 to Block A198. If only item movement data are to be collected, the routine takes the path through Blocks A157, A182 and then through Block A184–A196 to Block A198. If both are collected, paths A156, and A184–A196 are used in succession. To determine if a transaction on the transaction list is a panelist file, the routine tests for the PROCREC state of header in Block A181. This state indicates that the header frame containing the panelist bit is present. The state is copied to the panelist flag bit in Block A183. This flag is tested for every frame to bypass PROCREC for transactions which are not panelist transactions.

If panelist data are to be collected, the routine continues at Block A156 where the program PROCREC is called to process the current frame for a panelist record. PROCREC is used to assemble a panelist transaction file from the frames of the DLOG buffer on a frame by frame basis. Therefore, after PROCREC finishes processing a single frame, the program tests in Block A158 whether or not an entire transaction has been completed. If a panelist transaction record has been completed, then the routine attempts to write the finished file onto the hard disk 50 in Block A160. A test in Block A162 is accomplished to determine if there were any errors, i.e., whether the file was written correctly. If the file were correctly and completely written, then the affirmative branch of Block A162 continues the routine to transfer frames from the DLOG buffer through the path of Blocks A182, A198, and A200. If the file were unable to be written to the hard disk, the program logs an error message to the hard disk in Block A163 before continuing to Block A164 where there is an attempt to write the transaction file to the floppy disk. Again, a check is accomplished in Block A166 to determine if the file were correctly written on the floppy disk. A correctly written file causes the program to loop back to the DLOG buffer processing in Block A182, while an error causes the program to continue to Block A168. An error in writing to the floppy disk 52 causes an error message to be logged to the hard disk 50 in Block A168. The program then returns to the executive routine A10 with a fatal error code which will shut down the system.

When the item movement data are to be collected, the program continues at Block A184 where the routine PROCITEM is called. The routine of PROCITEM parses each of the current frames into item movement records which are used to update the item movement data base. After every frame, the end of transaction frame is checked for by Block A188 and, if found, causes the program to call the data base manager in Block A190. If neither the record or transaction is complete, then in Block A192 the routine determines the error condition of the record. Assuming the record to be correct, the program returns to Block A124 through Block A198 and A200 to process another frame. If an error be found in Block A192, it is logged to the hard disk 50 in Block A194 and the record is cleared in Block A196.

When the program finishes processing a group of frames from the DLOG buffer, the buffer will be empty and an affirmative branch from Block A124 will move the program to Block A126. In Blocks A126 and A128, a timer loop is set up to allow the monitor routine A16 a short duration to fill the transaction list if the processing loop has emptied the lists too quickly. In this manner, no data are lost, and no outside loops of the logging and formatting routine are needed. After the time out count equals zero, as tested for in Block A128, the routine obtains the monitor routine status word in Block A130. The routine then determines in Block A132 if there be any bits set in the monitor status word which indicate particular errors. Those errors are logged to the hard disk in Block A134 before the program returns to the normal path.

The program then determines whether the transaction list has data available in Block A136. If the transaction list has data available, then status errors are checked once more in Block A140 to determine whether the list should be used or cleared. If there be data but the error status be positive, then the data are unreliable and should be excluded from the logging process. Thus, the program will reinstalls the monitor routine in Block A142 and then exit to the outside loop to initiate another attempt at processing new data from the transaction list.

If there be no data available in the transaction list in Block A136, then the program checks in Block A138 to determine whether the transaction status of the transaction being assembled is in mid-transaction If not, then a simple return is accomplished to the outside loop. However, if the status is in mid-transaction and there be no longer data available, this indicates an error because there are no data to complete the record. This error is logged as a partial transaction error in Block A148. Further, to prevent such partial transaction from being logged to the hard disk the transaction is cleared from the transaction file A175 in Block A150. The program will then be able to return to the outside loop where it again attempts to process data from the transaction list.

On the other hand, if all the status error tests are passed and the DLOG buffer is merely empty because the program has processed all the present data, then a negative branch from Block A140 will continue the program to Block A144 where a routine SLMRECV is called. The routine SLMRECV is used to transfer a block of frames from the panel transaction list to the DLOG buffer. Once the routine has transferred the frames, it calls the routine SLMACC in Block A146 to acknowledge the receipt of the frames and to delete them from the transaction list. This permits the transaction list to be built by the monitor routine A16 and reduced by the logging and formatting routine A12.

Figure 25:
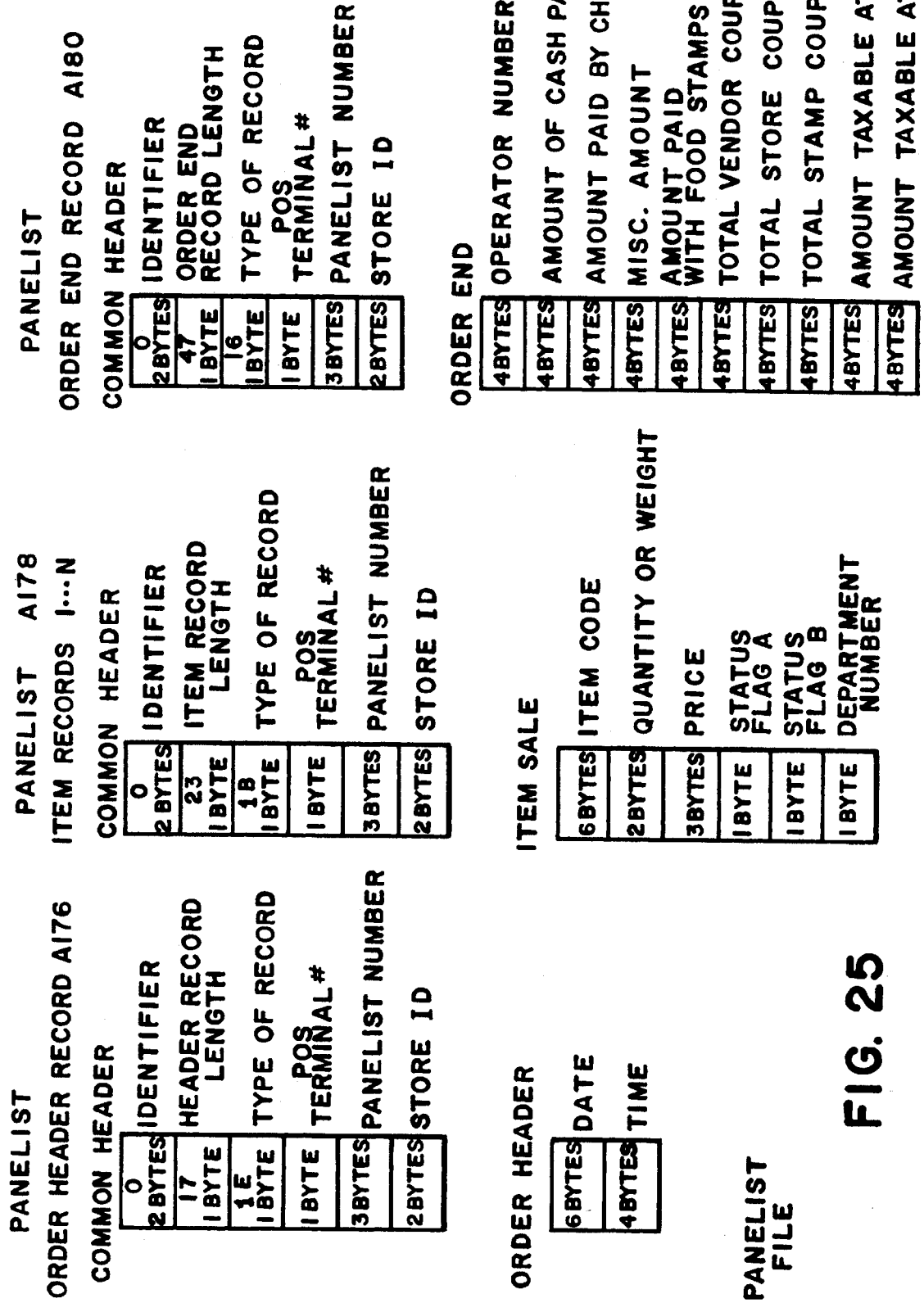
FIG. 25 is an expanded pictorial representation of a panelist transaction file.

Next, in Block A154 the program checks to determine, even with a data available indication, that no information has been sent. If the DLOG buffer is still empty after trying to fill it, the program will exit to the outside loop. Otherwise, the program will continue at Block A157 where it will start processing the new full DLOG buffer. The process record routine, PROCREC, builds the panelist transaction files A175 for each transaction, frame by frame. A detailed illustration of the structure of a single transaction file A175 is illustrated in FIG. 25 while a detailed flow chart of the routine PROCREC is illustrated in FIGS. 26A–26D.

A transaction file contains three parts, a panelist header record A176, a plurality of panelist item records A178, and a panelist order end record A180. Each of these parts is initiated by a common header containing two bytes of an identifier (used by the host processor 18) which are zero, the length of the particular record in one byte, the type of the record in another byte, the point-of-sale terminal number from which the record was taken, three bytes identifying the panelist, and two bytes for the store identifier. The panelist header record 176 contains a "17" in the header record length byte which indicates there are 17 bytes after the type of record identifier which in this particular case is "1E". The panelist header record closes with an order header which is ten bytes in length-divided into six bytes for the date and four bytes for the time indicating when the transaction file was first assembled. In the present case the transaction file would first begin assembly when a beginning of transaction frame was identified by the PROCREC routine.

Each panelist item record 178 indicates that the item record length is 23 bytes after the type of record identifier "1B" in its common header Block. The panelist item record concludes with an item sale block of 15 bytes where the first 6 bytes are the item code, the next 2 bytes are the quantity or weight of the item sold, and the price of the item is contained in 3 bytes thereafter. Following are 2 bytes of status flags set in the particular frame identifying particular conditions about the item sold and, lastly, 3 bytes which indicate the department number from which the item was sold. The item sales blocks are connected in a linked list which contains information concerning all valid sales for a particular customer transaction.

The panelist order end record A180 indicates in its common header that it contains 47 bytes following its type of record identifier "16". The order end data block following the common header of the panelist order end record A180 contains 10 categories of data, each of 4 bytes. In order, they are: the operator number of the point-of-sale terminal, the amount of cash paid for a particular transaction, the amount paid by check, any miscellaneous amount which was recorded, the amount paid by food stamps, the total in dollars of vendor coupons, the total in dollars of store coupons, the total in dollars of stamp coupons, that amount of the total taxable at a first rate A, and that amount taxable at a second rate B.

The PROCREC routine will now be more fully explained with reference to FIGS. 26A–26D. The routine PROCREC which processes the frames of a transaction file into a panelist transaction record is a state machine which checks the frame sequence for correct transaction execution and which moves the relevant data from a particular frame into a data structure allocated for a panelist transaction file.

Initially, the program in Block A300 determines whether the routine state is Header. This is the state that the program resets to upon finishing a transaction from the transaction list and starting a new one. Thereafter, the program will continue down path A302–A314 to perform the initial tasks of setting up the transaction file data structure. In Block A302, the state of the routine is changed to the initial state INIT. This will allow the next processing loop to begin looking for frames containing data to place in the transaction file structure. In Block A304, the common header structure for all three areas of the transaction file is allocated. The common data and constants including the block lengths, the types, ident bytes, and store ID bytes are stored in the common header files in Block A306. Next, the particular frame which caused the call to the PROCREC routine is tested in Block A308 to determine if it contains the date and time. The frame may not have such information, and, if the response is negative, the program will obtain the date and time from the disk operating system in Block A310. These two values are then stored in the order header in their respective places in Block A312. The terminal number from the frame is then stored to the common header areas in Block A314. Before the routine exits from this path, the frame length is checked in Block A316 to determine if it is zero. Null frames are ignored and the program returns immediately. Otherwise, the path continues to Block A318.

The program now begins a section where the function codes of the frame are tested and particular operations done, dependent upon the type of function code. In Block A318, the program tests the function code byte in the information field to determine if it is the header transaction frame. If it is, then the program next determines whether the state is in the transaction state INIT. If it is, then the present frame is in correct sequence and the store operator number from the frame is transferred to the respective bytes in the transaction file in Block A326. The program will then transfer the sale state to the beginning of a sale state BEGSALE in Block A328, whence the path continues at A462. If the function code of the present frame is the header function code and the state is not in the initial state, then a negative response from Block A320 produces the logging of an error from Block A324. The error message logged in Block A324 is that the transaction start is out of sequence.

Figure 26A:
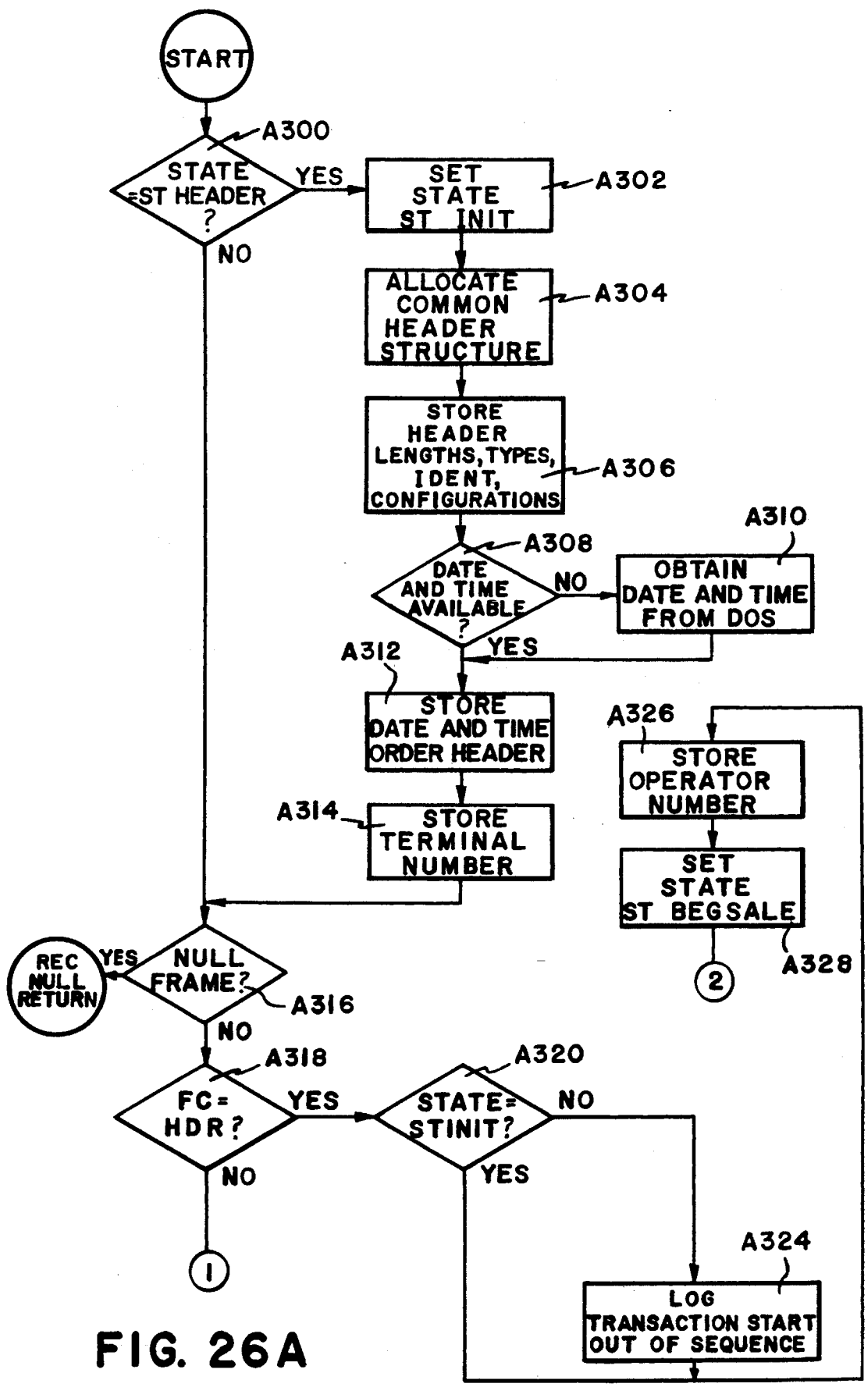
FIGS. 26A–D are a detailed flowchart of the process record routine, PROCREC, illustrated in FIG. 21.
Figure 26B:
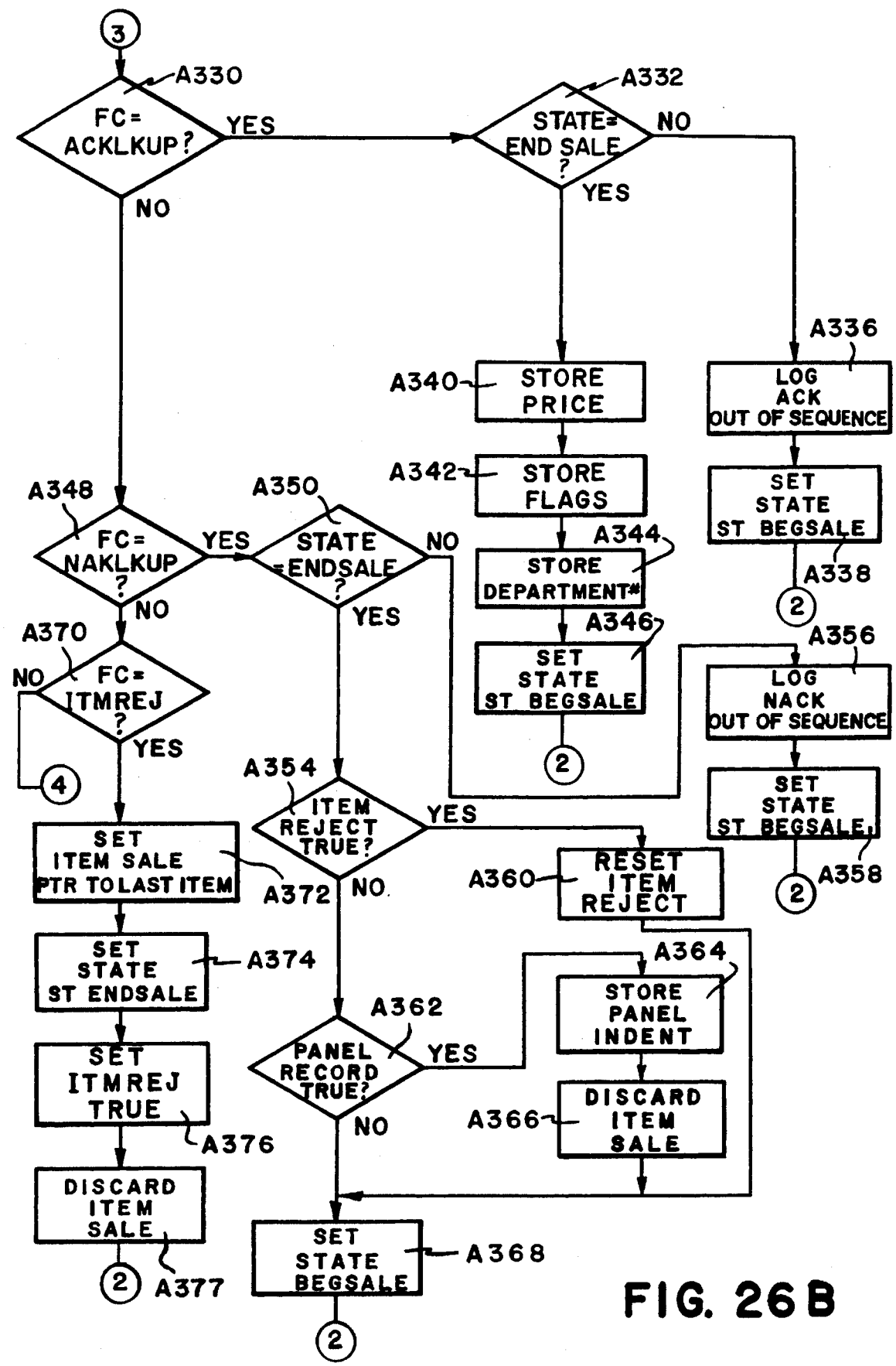

The next function codes which are tested for in the frame are a unique fast path, UNIQFP, a terminal lookup, TRMLUP, a fast path, FASTPATH, or an item lookup, ITMLKUP, in Blocks A406–A412 (FIG. 26D), respectively. If the function code is not any of these, then the program continues to Block A330 (FIG. 26B). Otherwise, the program will begin the operations beginning at Block A414 where the sales state is checked to determine if it is the beginning of sale state, BEGSALE. Because the presence of any of these function codes in a frame indicates that a particular item has been sold, an item sale structure is allocated in Block A420. However, the state is first checked, and if incorrect, the negative branch of the Block A414 transfers the program to Block A418 where an error is logged that the item sale is out of sequence.

Thereafter, depending upon whether a response is required from the store controller, relevant data from a frame are transferred to a transaction file structure. For example, in Block A422, the current frame is checked to determine if the function code is a terminal lookup. If the answer is affirmative, then no response is needed and the data needed for the item sale is in the particular frame. Therefore, the routine proceeds through a path, from Blocks A424–A432, which stores the price, flags, department number, quantity or weight, and item code, respectively, into the transaction file structure. The sales state is then reset in Block A434 to the begin sale state, BEGSALE, for the next item. This path then exits to the final path at Block A462.

Returning now to Block A422, if the frame is not a terminal lookup frame, the routine next tests to determine if the frame is a unique fast path frame in Block A436. If it is, then no response is necessary from the store controller and the frame contains data which can be transferred directly to the panelist transaction file structure. Therefore, in Blocks A438–A442, the program stores the price, flags, and the department number, respectively, in the respective fields of the transaction file. In Block A444, the sale state is reset to the beginning of sale state, BEGSALE before exiting to the final path at Block A462.

All the other function codes handled by the routine either need a response, or are a response, from the store controller 30 and such need to be found before all the data for a specific sale transaction can be recorded. However, these present frames do contain other data which must be recorded before the program can exit this part of the routine. Thus, in Block A446, the item code is checked to determine if it is 0X09. If a frame has a "9" in the item code at this position, this means that the frame contains one of the identification codes of a panelist, the panelist I.D. numbers having been assigned to include 9's and being thus distinguishable from Universal Product Codes which have no 9's. Therefore, in Block A448 the panelist I.D. number is stored in the correct field of the transaction file structure. Further, the panelist record state is set true for additional logical operation in the routine. Thereafter, the sale state is set to end sale state, ENDSALE, so that the program can obtain subsequent data from the store controller acknowledgment frames.

If the item code is not a panelist item code, then the program transfers control to Block A454 where the normal item code is stored in the transaction file data structure. The program then checks in Block A456 to determine if the function code is an item lookup. If it is, then the quantity or weight from the frame are stored in the transaction file structure. Thereafter, the state is set to the end of sale state, ENDSALE, so further processing will determine the data that the store controller returned to the terminal to finish the sale.

This finishes the terminal transactions and the routine will now process those frames which contain function codes which are responses by the store controller. In Block A330, the program determines if the function code of the frame is an acknowledgment of a lookup, and if so transfers the routine to Block A332 where the state is checked to determine if it is an end of sale. If it is not an end of sale, then an error of an acknowledgment out of sequence is logged in Block A336 and the state reset to the beginning of sale state, BEGSALE, in Block A338. If the acknowledgment occurred in the correct sequence, such that the state is an end of sale, then the data in that frame is good and should be stored in the transaction file structure. Therefore, in Blocks A340–A346, the data are transferred by storing the price, flags and department number in the respective fields of the file structure. In Block A346, the state is reset to the beginning of sale state BEGSALE.

For the function code of a negative acknowledgment, as tested for in Block A348, the program executes the path consisting of Blocks A350–A368. Initially, the program determines if the sale state is equivalent to an end of sale state. If it is not an end of sale state, then the program will log the error of a negative acknowledgment out of sequence in Block A356 and reset the state to the beginning of sale state, BEGSALE, in Block A358. If the transaction frame sequence is in order and the state is correct (end of sale state), then in Block A354 the program determines whether the item reject state is true. If it is, then the item reject state is reset in Block 364, and the item sale is discarded in Block A366. The pointer to the item sale deleted was set to the correct record from the previous item reject frame. The program then sets the state to the beginning of sale state, BEGSALE, in Block A368. Continuing from Block A354, if that test is negative, the panelist record state is tested to determine whether it is true. If a panelist record I.D. has been found, then the panelist identification is stored in Block A364 before discarding this item sale in Block A366, whence the path returns to Block A368.

If the function code is an item rejection, as determined by Block A370, then the path through Blocks A372–A376 are executed. Initially, at Block A372 the item sale pointer is reset to the last item sale before the present one to begin the process of clearing the transaction from the item data record structure. The process will be completed when the negative acknowledgment frame is found. Then in Block A374, the state of the routine is set to the end of sale state. Further, in Block A376 the state of ITEMREJ is set to true.

Figure 26C:
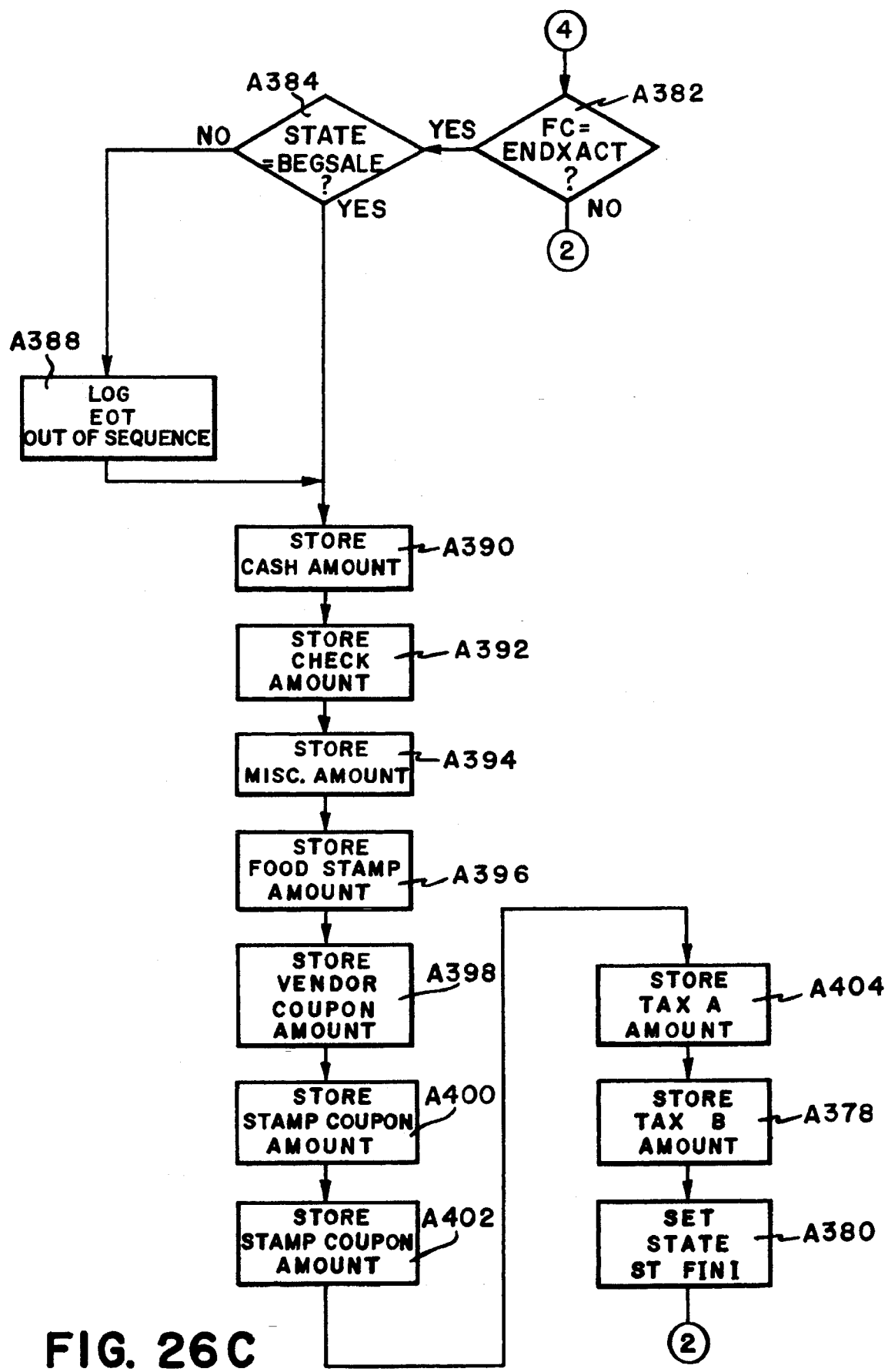
Figure 26D:
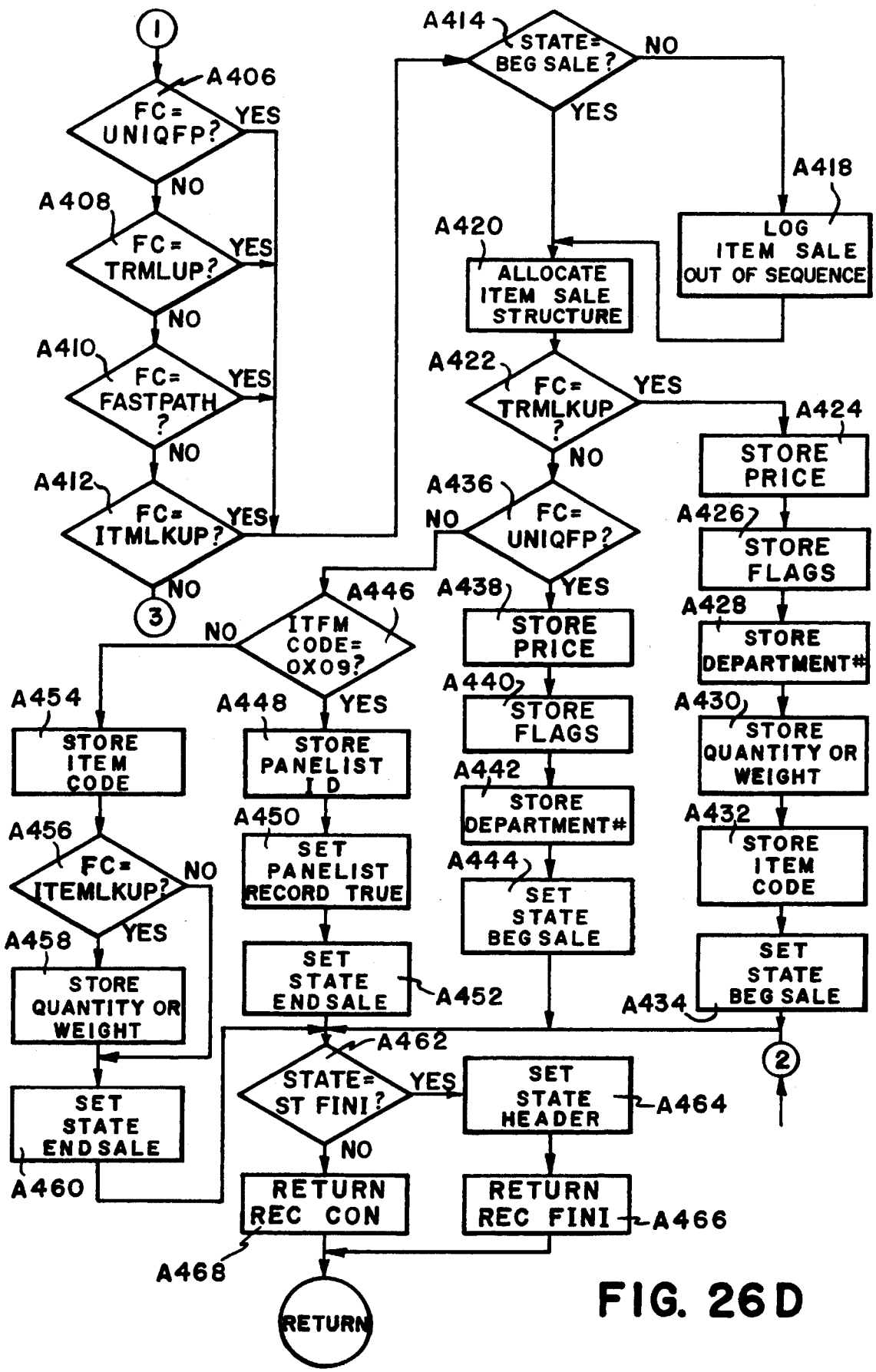

With reference to FIG. 26C, if the function code is an end of transaction function code, then in Block A382 the program transfers control to Block A384 and the path following. If the function code at this point is not an end of transaction, then it is an unknown function code to the routine and the program defaults at Block A462. The end of transaction function code path tests the sale state in Block A384, to determine if the state of the routine is the beginning of a sale. If it is not, then an error is logged that the end of transaction is out of sequence in Block A388 before continuing. If the state is correct, then the end of transaction data from the current frame are transferred directly to the order end record of the transaction file data structure. In Blocks A390–A404, the cash amount, check amount, miscellaneous amount, food stamp amount, vendor coupon amount, store coupon amount, stamp coupon amount, tax A amount, and tax B amount are transferred to the respective fields in transaction file data structure. Thereafter, in Block A380, the state of the routine is set to the finish state, FINI.

At this point, all frame processing has been accomplished and the program is ready to execute a final path. Thus, in Block A462, the state is tested to determine if it is the finish state, FINI. If it is, then in Block 464 the state is reset to the header state so that the next transaction can be recorded. The return variable for the routine is set in Block A466 to the record finish, RECFINI, and the routine returns. If the state is not the finish state in Block A462, then the return variable is set in Block A468 to record continue, RECCON. The program then returns to obtain the next frame from the DLOG buffer.

The routine which processes the frames for the item file PROCITEM will now be more fully explained with reference to FIGS. 30 A–C. The routine PROCITEM is a state machine that generally processes each frame from the transaction file into item file (FIG. 27), which are then used to update the item movement data base (FIG. 28) which is in the RAM file. The routine processes the transaction file on a frame by frame basis to determine the correct transaction sequence and to move specific data from a frame into an item record.

Figure 30A:
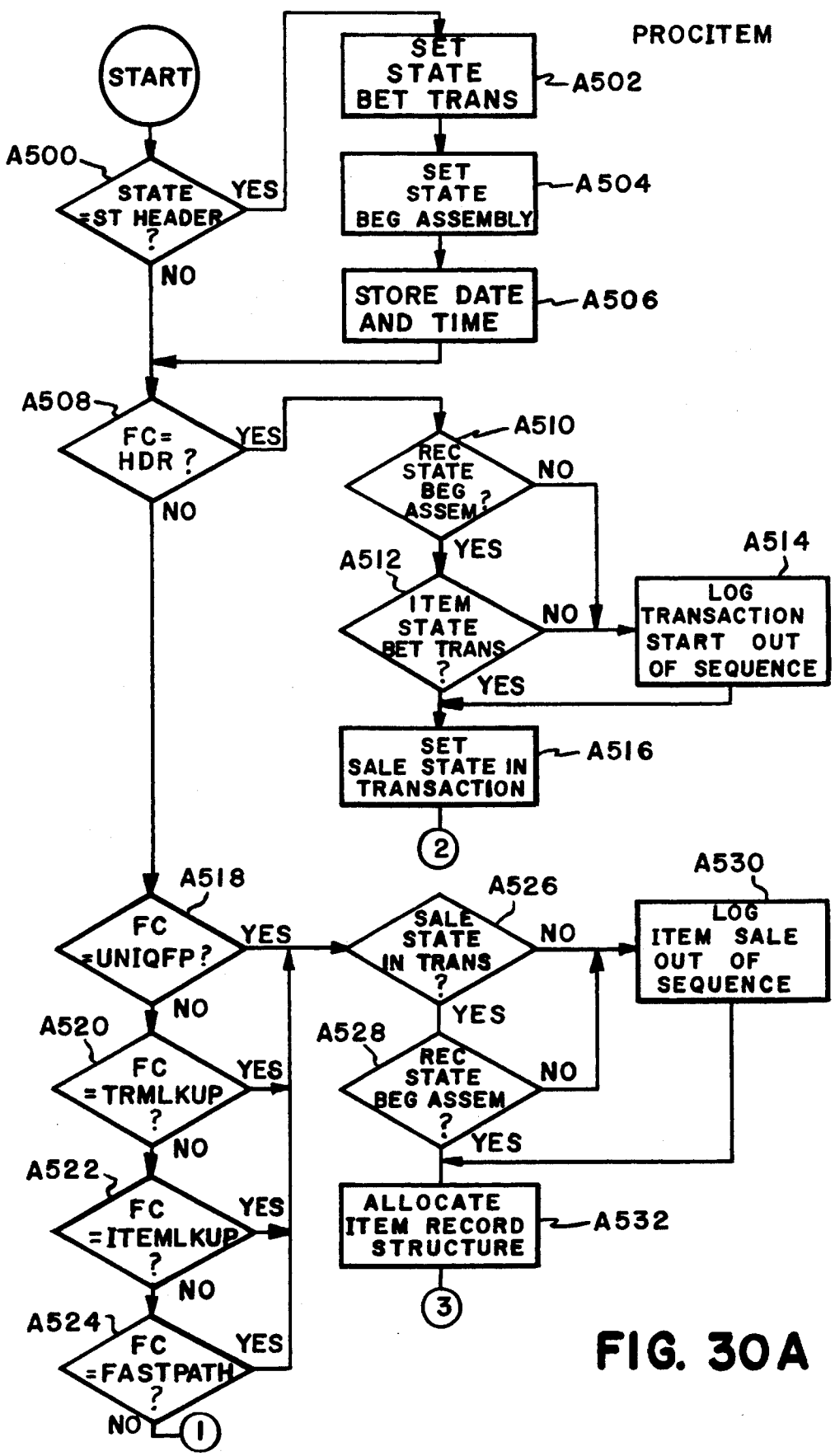
FIGS. 30A–C are a detailed flowchart of the process item record routine, PROCITEM, illustrated in FIG. 21.
Figure 30B:
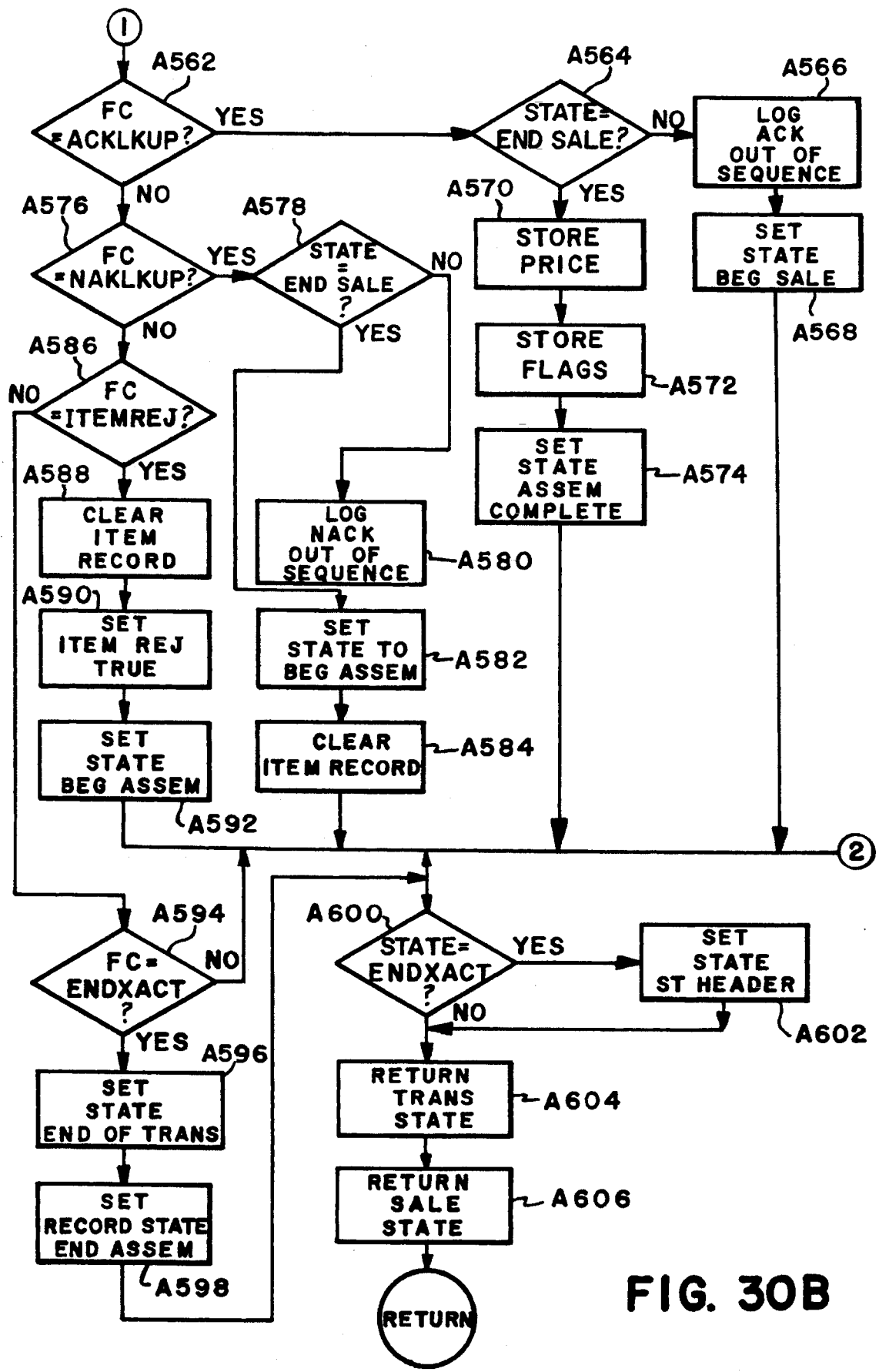

The routine begins at Block A500 in FIG. 30A where it is determined whether or not the transaction state is header. This transaction state indicates that the routine has been called but that a new transaction has not been located and that, therefore, an initialization should take place. The routine, when it finds this state loops through blocks A502–A506 to first (A502) set the transaction state of the program to a between transactions state, BETTRANS, and next (A504) set the assembly state for a item record to begin assembly, BEGASSEM. Next, at A506 the date and time of the transaction, from either the header frame or from the real time clock of the disk operating system, are stored, in the respective field of the item record file.

The routine proceeds by determining the function code of the particular frame which it is handling. The frames which the routine will recognize are the header frame, HDR, the terminal lookup frame, TRMLKUP, the fast path frame, FASTPATH, the unique fast past frame, UNIQFP, the item lookup frame ITMLKUP, the acknowledge lookup frame ACKLKUP, the negative acknowledge lookup frame NAKLKUP, the item rejection frame ITMREJ, and the end transaction frame ENDXACT. Depending upon the function code, the program will call a particular handler where the relevant information is extracted from the frame, the data assembled into the item record, and the routine states changed as needed. In block A508, the routine checks whether the function code is a header code. If it is, then a frame sequence test in blocks A510 and A512 determine whether the record state is begin assembly, BEGASSEM and whether the item state is between transactions, BETTRANS. If the results of either one of these tests is negative, then the header frame is out of sequence and such information is logged as an error in block A514. The routine is then transferred to the state of in transaction, INTRANS in block A516. The program then transfers control to an ending portion of the routine at A600 where it exits to the process item loop routine to obtain another frame.

If the function code of the frame is a unique fast path, terminal lookup, item lookup, or fast path as determined by blocks A518–A524, respectively, then the program transfers control to the sequence of operations beginning at block A526. In that block and block A528 the states of the program are determined. If the sales state is in transaction and the record state is in begin assembly, then the routine proceeds to block A532 where an item record structure is allocated. The item record structure is that illustrated in FIG. 27 and includes the fields necessary to store data for the particular frame handled. However, if the state sequence is not proper then in block A530 an error is logged that the item sale is out of sequence, returning then to Block A532.

Figure 30C:
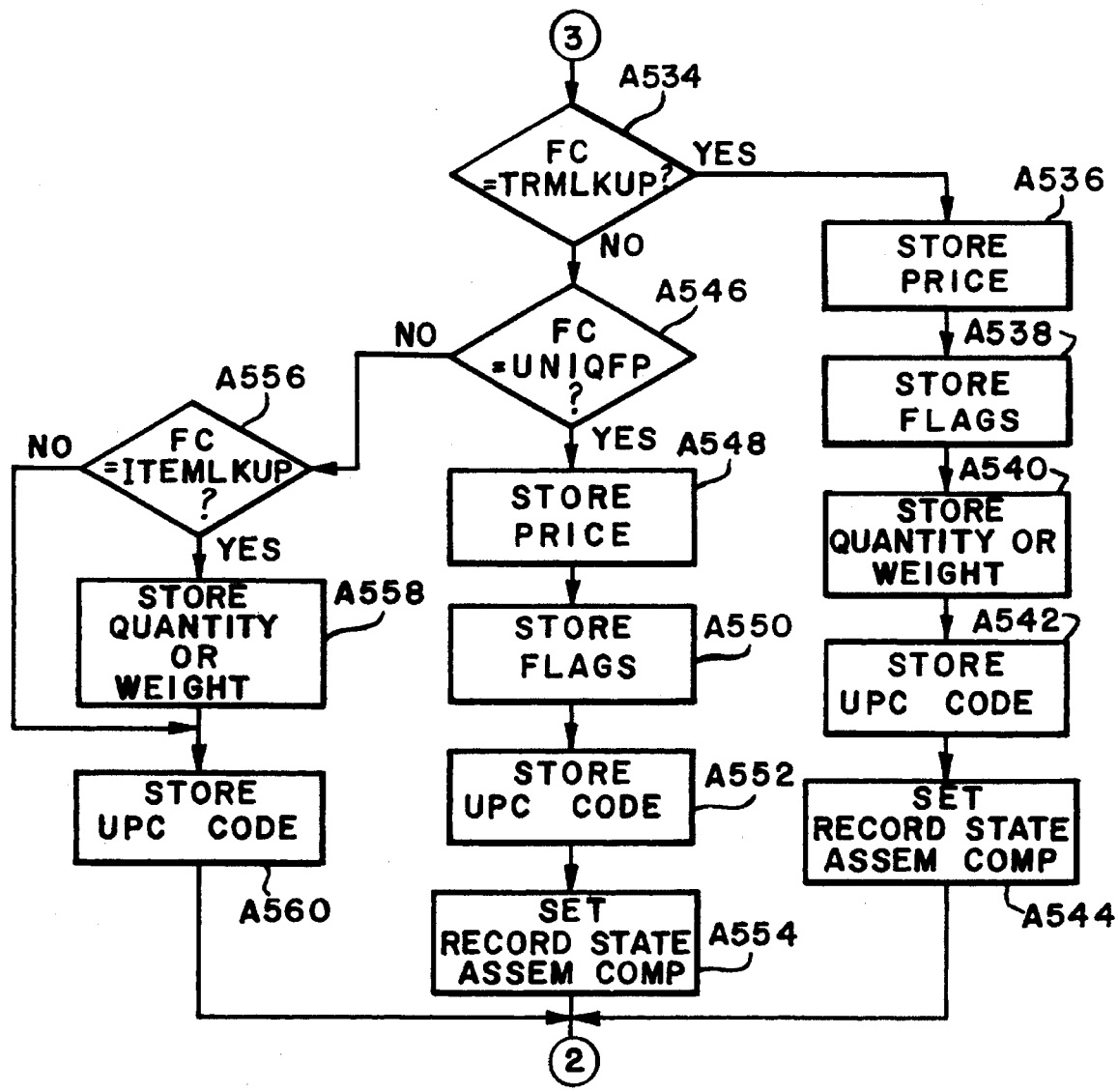

Once the program continues to Block A532 it allocates the item record structure needed to store the relevant item movement data (FIG. 30C). Next, the routine determines whether the function code for the present frame is a terminal lookup in Block A534. If this test is affirmative, then the path through Blocks A536–A544 are taken to store the data from that frame into the item record data structure. Accordingly, the price is stored in Block A536, the flags are stored in Block A538, the quantity or weight is stored in Block A540, and the UPC code is stored in Block A542. Because there is no need for a response frame, the program sets the record state to assembly complete in Block A544 and then exits to the final part of the routine in Block A600.

If the function code is a unique fast path code, as determined in the Block A546, then the sequence through the operational in steps Blocks A548–A554 is used. The price is stored in Block A548, the flags are stored in Block A550, and the UPC code is stored in Block A552. Because the unique fast path frame is another operation which needs no response, the record state is set to assembly complete in Block A554 before exiting to the final part of the routine in Block A600. If the function code is an item lookup code as determined by Block A556, then the quantity or weight from that frame is stored in Block A558. Otherwise the frame is a fast path frame and the routine continues directly at Block A560. In both cases, the UPC code is stored in that Block A560 before an exit is taken to the final part of the routine in Block A600.

For those transaction frames which need a response, the routine continues at Block A562. This operation determines the function code of the frame is an acknowledge lookup and transfers the routine to Blocks A564–A574 to handle the response frame. In Block A564 the sequence of the transaction is checked to determine whether the sale state is end sale before storing the data from the acknowledge lookup frame. If the sequence is correct, then the price of the item is stored in Block A570 and the flags from the frame are stored in Block A572. The assembly state is then changed to assembly complete in Block A574. If the state sequence is not correct, then an error is logged in Block A566 to indicate that the acknowledge frame was out of sequence. Before exiting the routine will reset the state to beginning of sale in Block A568. Both paths then converge to the final part of the routine in Block A600.

If the function code in the current frame is a negative acknowledge, as tested for in Block A576, then the path for the routine is through Blocks A578–A584. In Block A578, the sequence of the transaction is checked by determining whether the sale state is end of sale. If it is not, then there is an error and the negative acknowledge is logged as out of sequence in Block A580. Otherwise, if the sequence is correct, the program will directly set the assembly state to beginning of assembly and clear the item record in Block A582 and Block A584, respectively. This task is accomplished so that the item record which is rejected or voided will not be used to update the data base. The path then goes to Block A600.

Similarly, if the function code is an item reject as determined in Block A586, then the item record is cleared in Block A588 and the item reject variable is set to true in Block A590. The program then resets the assembly state to begin assembly in Block A592 before exiting to the final part of the routine in Block A600. Otherwise, if the function code indicates an end of transaction in Block A594, the transaction state is set to end of transaction in Block A596 and the assembly state is set to end assembly in Block A598. The path then goes to Block A600. The negative branch of Block A594 indicates all other function codes are ignored and transfers the program to the final part of the routine at Block A600.

The final part of the routine begins in Block A600 and extends through Block A606. Block A600 tests whether the transaction state is an end of transaction and, if that state is true, resets the state to header in Block A602. After the reset of the transaction state, to the header state, the routine returns the current transaction state and the current sales state in Blocks A604 and A606, respectively, before exiting to the process item loop routine.

Figure 31:
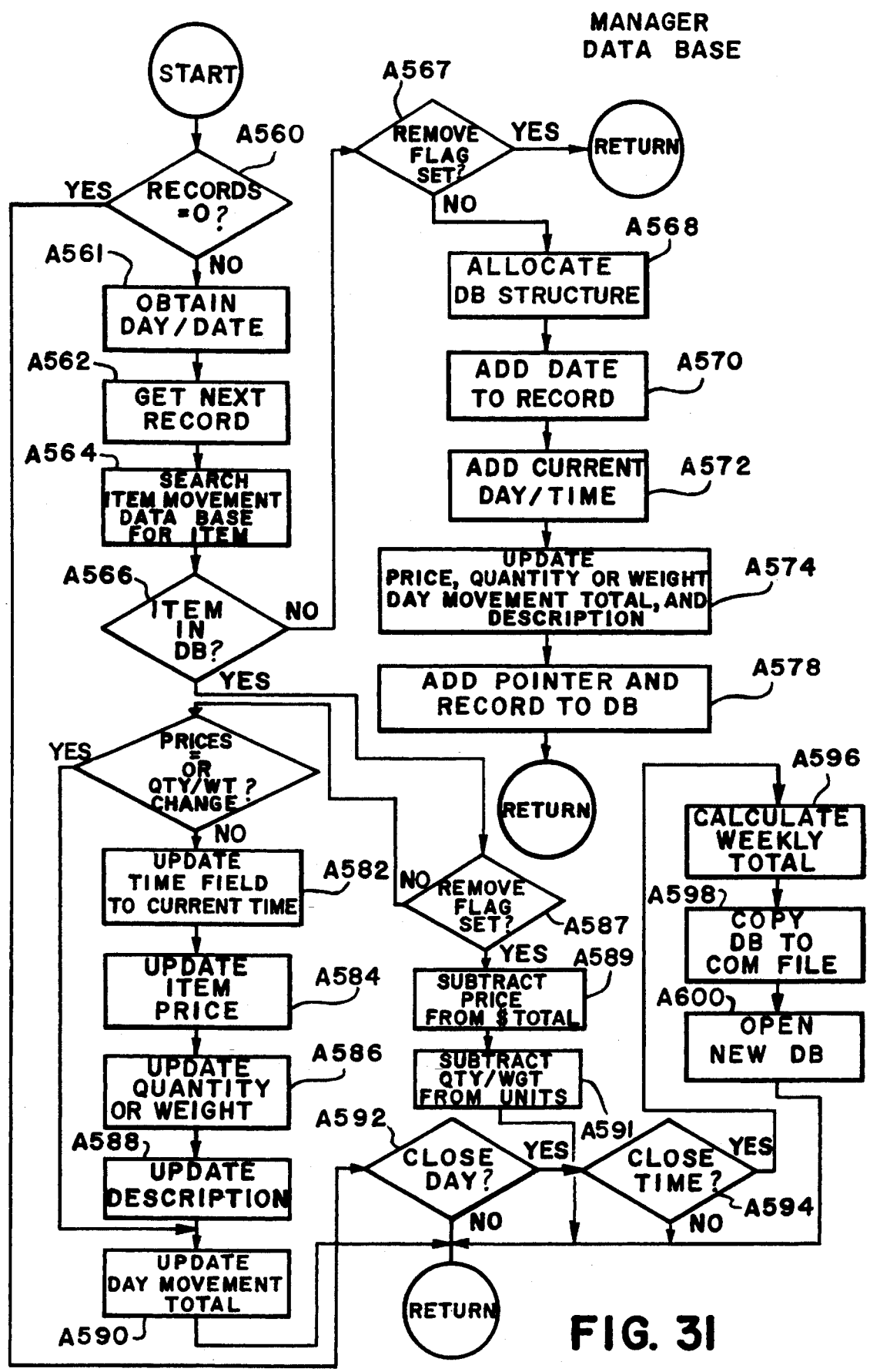
FIG. 31 is a detailed flowchart of the data base manager routine, DBMANG, illustrated in FIG. 22B.

The data base manager routine is more fully disclosed in FIG. 31. The data base manager routine takes the item records that were assembled by the routine PROCITEM and updates the item data base store in the RAM file. The structure for each record of the data base stored in the RAM file is more fully disclosed in FIG. 28. Each item record starts with a 13 byte UPC/EAN code descriptor field identifying the item whose quantity and price movements the market researcher desires to study. The item code field is followed by a 22 byte description field of the item which indicates a particular brand, company, or other relevant information. A 4 byte price field follows the description field. The quantity or weight can be in a 2 byte field which follows thereafter. A time and date field of 4 bytes provides a means for determining that a status change has taken place, i.e., when the price changes, or the quantity or weight changes, such that the market researcher may determine buying behavior from these indications. Finally, a unit quantity field of 14 bytes is included for totals of sales each day 1–7 of a particular week. Each day of the field is 2 bytes in length. A 4 byte accumulative total field follows it.

The data base manager routine begins at Block A560 in FIG. 31 where the item record file shown in FIG. 27 is tested to determine whether or not there are any item records with which to update the item movement data base. If there are item records, then the negative branch from Block A560 continues the program at Block A561 where the day and date of the present item record is determined. Thereafter, the present record in the item record file is pointed to and a search of the item data base initiated in Block A564 to determine whether the particular item is in the present data base. The search is accomplished by using a pointer table more fully disclosed in FIG. 29 where a UPC code is associated with a record pointer, which is the address for the start of one of the data base records relating to that item. All the UPC codes are either numerically sorted, or linked, to form an easily searchable code file. If the item code is found in the pointer table, the record in the data base for that item is pointed to by the associated address structure.

The routine, subsequent to the data base search, determines whether the item code is in the item data base in Block A566. If the item is not in the data base, then in Block A568 the program allocates another data base record structure as described in FIG. 28. The current date and time are added to the structure in Blocks A570 and A572, respectively. Thereafter, from the item record the price, quantity or weight, daily movement total, and description are updated in Block A574. This new record is then added to the data base and a pointer which is associated with the new item code added to the pointer table in Block A578. The routine then returns to Block A560 to determine whether the record file contains further item records.

If the item is found corresponding to a record of the data base, as determined by an affirmative branch from Block A566, then the routine tests whether the price of the current item record is equal to the price for the item record in the data base in Block A580. If it is, then the only task that remains is to update the current daily movement total in Block A590 and then return to Block A560 to determine whether there are any more records. If the prices do not match in Block A580, then the time and date fields in the data base record are updated to the current items time and date field in Block A582, the price field updated to the item price in the current record in Block A584, the quantity or weight updated in Block A586, and the description updated in Block A588. Thereafter, the current daily movement total is updated as previously indicated and the program loops back to Block A560 to obtain the next record.

When all of the records have been cleared from the item record file, the routine will make an affirmative branch from Block A560 to Block A592. At that point, it is determined whether the present day is the day on which the file should be closed. If it is not closing day, then the routine immediately returns. If it is, the current time is compared with a closing time in Block A594 to determine whether the file is ready to be closed. Upon finding the closing time on the closing day, the routine then calculates the weekly total for each record in the data base in Block A596. After the weekly totals have been tabulated, a copy of the data base is copied to a communication file and the present data base is closed or redivide in Block A598. A new data base is opened in Block A600 to begin another week of item movement data. In this regard, the pointer table is reinitialized to the retail establishment's UPC or EAN record.

While a preferred embodiment of the invention has been disclosed, it will be obvious to those skilled in the art that various modifications, adaptions, and changes may be made thereto without departing from the spirit and scope of the invention which is defined in the appended claims. For example, each of the store communications networks is illustrated as a half duplex, serial loop. The invention is, however, applicable to all kinds of local area networks such as full duplex, parallel or serial bus, ring, or star configurations, etc. The connection to each type of local area network being established by a passive data tap for each individual network where all communications can be monitored while not interfering with them. Additionally, the specific market research data has been preferably illustrated in SDLC format. Such should not limit the invention and other communications formats can be used to advantage. When changing format, the identification of the market research information for parsing is embedded in the formatting and can be used for separation similarly to the method illustrated for the SDLC format. Still further, a particular protocol conversion from phase encoded data to digital has been shown. The invention is applicable to communications of a multiplicity of different protocols including all digital and analog formats. Protocol conversions similar to that illustrated can be made such that the market research data is easily processed.

APPENDIX A

| Field Name | Field Size | Field Description | Name HEADER |
|---|---|---|---|
| FUNCDE | 1 | Function code X'1E' | |
| OPERID | 4 | Operator number | |
| TRNNBR | 2 | Transaction number | |
| UPFLGS | 1 | General purpose flags field Bit 0 - VAT transaction 1 - Default loaded 2 - Send transaction 3–7 - Reserved | |
| TRNTYP | 1 | Type of transaction; the values are: 0 through 9 and A | |

| Field Name | Field Size | Field Description | Name TERMINAL LOOKUP |
|---|---|---|---|
| FUNCDE | 1 | Message function code X'0A' | |
| ITMCDE | 8 | Item code flag in 1st byte | |
| UPFL01 | 1 | Update flag 1 | |
| TAXA | | X'80' = Tax A applies | |
| TAXB | | X'40' = Tab B applies | |
| TAXC | | X'20' = Tax C applies | |
| FSTAMP | | X'10' = Food-stampable | |
| TSTAMP | | X'08' = Trading-stampable | |
| TAXNOT | | X'04' = Tax / no tax key hit | |
| FOODST | | X'02' = Food stamp key hit | |
| WEIGHT | | X'01' = Weight key hit (weight entered) | |
| QTYWGT | 2 | Quantity or weight (Quantity of 1 in msg as 0) | |
| UPFL02 | 1 | Update flag 2 | |
| IMSALE | | X'00' = Normal sale item | |
| CANCEL | | X'80' = Item sale cancel | |
| REFUND | | X'40' = Normal item sale | |
| MFRCPN | | X'20' = Manufacturers coupon | |
| STRCPN | | X'10' = Store coupon | |
| STPCPN | | X'08' = Stamp coupon | |
| DEPOST | | X'04' = Deposit | |
| DPTRTN | | X'02' = Deposit return | |
| DISCNT | | X'01' = Discount | |
| ENTPRC | 3 | Entered price | |
| OVRDNM | 2 | Override number | |
| DEPTNO | 3 | DEPTNO from terminal lookup | |
| MINDX | 3 | I.M. index from terminal lookup | |

| Field Name | Field Size | Field Description | Name ITEM LOOKUP |
|---|---|---|---|
| FUNCDE | 1 | Function code X'1B' | |
| ITMCDE | 8 | Item code to be looked up; the first four bits of the item code can have the following meaning: Value X'0' - Plain item code '1' - Nonzero department in item code '2' - Nonzero class in item code '3' - Nonzero department and | |

APPENDIX A

| Field Name | Field Size | Field Description |
|---|---|---|
| | | class in item code |
| | | '4' - Nonzero stock in item code |
| | | '5' - Nonzero stock and department in item code |
| | | '6' - Nonzero stock and class in item code |
| | | '7' - Nonzero stock, class, and department in item code |
| | | '8' - Item code entered via department motor key |
| QTYWGT | 2 | Quantity in whole units or weight in 100ths (quantity of 0 = quantity of 1 if FRCQTY = 0; weight of 0 is not allowed) |

| Field Name | Field Size | Field Description | Name FASTPATH |
|---|---|---|---|
| FUNCDE | 1 | Function code X'0C' | |
| Item Code | 8 | 0 | |

| Field Name | Field Size | Field Description | Name UNIQUE FASTPATH |
|---|---|---|---|
| FUNCDE | 1 | Function code X'0F' | |
| FMDATA | 8 | Message data Bytes 0-2 - Price (always positive) Byte 3 - Flags (multiple bits may be set) X'80' - Tax A applies X'40' - Tax B applies X'20' - Tax C applies X'10" - Food-stampable X'08' - Trading-stampable Byte 4 - Update flag X'00' - Normal item sale Bytes 5-7 - Department number | |

| Field Name | Field Size | Field Description | Name POSITIVE ACKNOWLEDGMENT |
|---|---|---|---|
| FUNCDE | 1 | Function Code X'44' | |
| EXTPRC | 3 | Extended Price | |
| UPFLGS | 2 | Flags to control the updating of totals for the item: Bit 0 - Tax A applies 1 - Tax B applies 2 - Tax C applies 3 - Food stamps applicable 4 - Trading stamps applicable 5 - Tax key pressed 6 - Food stamp key pressed 7 - Weight entered Bit 0 - Item sale cancel 1 - Refund 2 - Manufacturer's coupon 3 - Store coupon 4 - Stamp coupon 5 - Deposit 6 - Deposit return 7 - Unused | |
| DEPTNP | 3 | Department number from the item record | |
| SALQTY | 1 | Quantity from the item record | |
| UPRICE | 3 | Unit price from the item record | |
| DESCPT | 0-18 | Descriptor from the item record - length defined by Extended Function 42 | |
| LNKREC | 8 | Linked item code from the item record or | |
| IMINDX | 3 | Item Movement flags and Index with X'10' defined, if on, the item is not eligible for inclusion into the Terminal Item Lookup dynamic table area. Note: Only messages with the item movement index included and with the not eligible bit off are subject to inclusion in the terminal item record dynamic area. | |

| Field Name | Field Size | Field Description | Name NEGATIVE ACKNOWLEDGMENT |
|---|---|---|---|
| FUNCDE | 1 | Function code X'46' | |
| REASON | 2 | Reason for the negative response, as follows: Code Description 01 Coupon key is invalid for item 17 Extended price is too large or pricing method quantity limit of 3 exceeded 18 Weight not allowed 19 Weight or price required 23 Quantity not allowed 24 Price required 26 Item not on file 27 Item not authorized for sale 28 Too many concurrent multipricing deals 29 Quantity required 31 Linked item code chain limit exceeded 40 Disk read error 43 Coupon cannot be refunded 4D Disk record contains invalid data | |
| DESCPT | 18 | Item code or descriptor. Byte 18 is X'FF' if the item code issued. | |

| Field Name | Field Size | Field Description | Name ITEM REJECT |
|---|---|---|---|
| FUNCDE | 1 | Function code X'15' | |
| ITMCDE | 8 | Item code to be looked up. The first four bits of the item code have the following meaning: Value X'0' - Plain item code '1' - Nonzero department in item code '2' - Nonzero class in item code '3' - Nonzero department and class in item code '4' - Nonzero stock in item code '5' - Nonzero stock and department in item code '6' - Nonzero stock and class in item code '7' - Nonzero stock, class and department in item code '8' - Item code entered by . . . department motor key '9' - Department motor key and department in item code 'A' - Item movement on D/C entry 'B' - Transaction discount (item code = 0) 'F' - Reject item was linked to Bit 4-7 - Unused Bytes 1-7 - Reserved | |
| KEYFLG | 1 | Key flags to define which function keys were pressed for the item Bit 0 - Cancel or void 1 - Refund or return 2 - Manufacturer's coupon 3 - Store coupon 4 - Stamp coupon 5 - Tax or No Tax key pressed 6 - Food Stamp key pressed 7 - Weight X'00' - Normal item code | |

APPENDIX A
-continued

| Field Name | Field Size | Field Description |
|---|---|---|
| QTYWGT | 2 | Quantity in whole units or weight in 100ths (quantity of 0 = quantity of 1 if FRCQTY = 0) (weight of 0 is not allowed) |
| MLTQTY | 1 | Multipricing quantity entered for the item (zero if no multipricing quantity has been entered) |
| ENTPRC | 3 | Price entered for the item (zero if no price was entered) |
| OVRNBR | 2 | Override number entered by the operator for the item (zero if there is no override) |
| FRCQTY | 2 | Fractional quantity entered; the first byte contains the numerator and the second byte the denominator (zero if not entered) |
| OPDATA | 28 | Optional wand input data from the item (sent by the programmable terminal if there is no input) |

| Field Name | Field Size | Field Description |
|---|---|---|
| | | Name END OF TRANSACTION |
| FUNCDE | 1 | Function code X'16' |
| RFEDT | 1 | Reason for the EDT; the bits are: 0 - Normal 1 - End of checkout 2 - Void 3 - No-sale 4 - Reserved 5 - Reserved 6 - Totals retention (battery protected totals) battery low 7 - Totals retention (battery protected totals) check error |
| TRNNBR | 2 | Transaction number |
| OVRNBR | 2 | Override number for void transaction |
| TSOTME | 2 | Total of signed-on time |
| RNGTME | 2 | Ring time |
| TNDTME | 2 | Tender time |
| ORTHTME | 2 | Other time |
| SPCTME | 2 | Special signed-off time |
| NBRITS | 2 | Number of items sold |
| NBRITC | 2 | Number of item sale cancels |
| NBRCHK | 2 | Number of checks |
| NBRCUS | 2 | Number of customers |
| NBRSTP | 2 | Number of trading stamps issued |
| VOIAMT | 4 | Void transaction amount |
| CSHAMT | 4 | Cash tender amount |
| CHKAMT | 4 | Check tender amount |
| MISAMT | 4 | Miscellaneous tender amount |
| FSAMT | 4 | Food stamp tender amount |
| ITSAMT | 4 | Item sale amount |
| ITCAMT | 4 | Item sale cancel amount |
| REFAMT | 4 | Refund amount |
| MFRAMT | 4 | Manufacturer's coupon amount |
| STRAMT | 4 | Store coupon amount |
| STPAMT | 4 | Stamp coupon amount |
| DEPAMT | 4 | Deposit amount |
| DPRAMT | 4 | Deposit return amount |
| TXAAMT | 4 | Taxable A amount |
| TXAPAI | 4 | Tax A paid amount |
| TXBAMT | 4 | Taxable B amount |
| TXBPAI | 4 | Tax B paid amount |
| TXCAMT | 4 | Taxable C amount |
| TXCPAI | 4 | Tax C paid amount |
| CHFAMT | 4 | Check fee amount |
| DSCAMT | 4 | Discount amount |
| HDTPET | 4 | Positive entry amount for totals retention (battery-protected totals) |
| HDTNET | 4 | Negative entry amount for totals retention (battery-protected totals) |
| TXEAM | 4 | Tax exemption amount |

What is claimed is:

1. A non-obtrusive data collection apparatus for assembling selected data transactions representing the choices made by a panel of consumers from among a multiplicity of data transactions on a communications loop connecting a plurality of point-of-sale terminals to a store controller, said data transactions being communicated by a particular loop protocol and in a particular loop format of message units, said apparatus comprising:

coupling means for passively coupling to said communications loop at a location where all data transactions of the loop can be monitored and in such a manner as to not interfere with said data transactions;

converting means, connected to said coupling means, for converting said data transactions from said loop protocol into a standard digital protocol of data characters;

a transaction processor; and means, connected to said converting means, for communicating said converted data transactions to said transaction processor;

said transaction processor including:

means for assembling characters of said data transactions into said message units;

means for selectively sorting said message units into consumer transactions;

means for selectively sorting said consumer transactions into panelist transactions involving choices made by said panel;

means for storing said panelist transactions; and means, in response to an inquiry from an external device, for communicating said stored panelist transactions to said external device.

2. A data collection method for the market research of a plurality of individual stores for the purchases of predetermined consumers forming a buying panel, wherein each store has a plurality of point-of-sale terminals which communicate data transactions in an SDLC format over a network loop to a central store computer, said method comprising:

(a) passively monitoring data transactions on said network;

(b) assembling from said monitored data transactions data frames corresponding to respective data transactions;

(c) selecting from all of said data frames, data frames of at least one particular type;

(d) sorting said selected frames based upon an information field which contains information indicating the beginning and the end of a respective purchasing transaction;

(e) temporarily storing said selected data frames corresponding to a respective purchasing transaction;

(f) searching said temporarily stored selected data frames for panelist identification; and (g) storing said searched selected data frames corresponding to a respective purchasing transaction when any of them include said panelist identification.

3. A data collection method as set forth in claim 2 which further includes:

repeating steps (a)–(g) of claim 2 for each store, and each network loop of each store; and communicating said selected data frames pertaining to panelist transactions to a central processing point.

4. A data collection method as set forth in claim 2 wherein:

said steps (a)–(g) of claim 2 are performed on a real time basis.

5. A data collection method as set forth in claim 4 wherein said step of assembling frames includes:

receiving and storing each character of a data frame on an interrupt basis as it is monitored on said network loop; and transferring a completed frame to a frame buffer upon the detection of an end of frame character.

6. A data collection method as set forth in claim 5 wherein said step of selecting frames includes:

determining the number of frames in said frame buffer;

sorting the frames stored in said frame buffer until all stored frames have been sorted when the number is in excess of a predetermined value.

7. A data collection method as set forth in claim 6 wherein said step of selecting frames further includes:

sorting all information frames into frame blocks having the same point of sale terminal address.

8. A data collection method as set forth in claim 7 wherein said step of sorting said selected frames includes sorting said frame blocks into respective purchasing transactions.

9. A data collection method as set forth in claim 8 wherein said steps of searching and storing include:

searching purchasing transactions for panelist identification; and storing purchasing transactions which contain said panelist identification.

10. A data collection method as set forth in claim 9 which includes the further step of:

inserting panelist identification in said data transactions.

11. A data collection method as set forth in claim 10 wherein said step of inserting includes:

inserting said panelist identification as a universal product code which is not assigned a product.

12. In a system for market research wherein data are gathered at a central station from a plurality of individual stores in respect to transactions made by respective selected shoppers, said selected shoppers having respective identification indicia, and each of said stores having a data processing controller connected by a communications network to a plurality of transaction terminals at which input transaction data in respect to transactions with respective shoppers are entered, including transaction data corresponding to universal product codes for respective items bought and the respective identification indicia, such input transaction data being communicated to the respective controller over said communications network, and controller data from said respective controller being communicated to the respective terminals over said communications system, said controller data including controller transaction data related to the same transactions as respective input transaction data: a data acquisition and transfer system comprising means for passively coupling to a respective said communications network in a respective store to receive respective input and controller transaction data without introducing any signals into said communications network, storage means, means responsive to received transaction data corresponding to said identification indicia for storing in said storage means said received input and controller transaction data and instructions relating to each transaction made by a selected shopper to the exclusion of transaction data and instructions relating to transactions made by shoppers other than selected shoppers, means for reading out said stored transaction data from said storage means, and means for transferring said read out stored transaction data to said central station.

13. A method for electronically collecting market research information from a plurality of sales locations wherein the information is collected from each of the sales locations and transmitted to a host processor for subsequent evaluation, and wherein each of said sales locations has at least one automatic checkout system including a plurality of point-of-sale terminals communicating with a store controller over a communications network, said method comprising:

passively monitoring communications between the store controller and each of said point-of-sale terminals;

separating relevant market research data from said communications;

forming market research file structures compatible with the host processor;

storing said market research file structures in nonvolatile memory; and periodically transferring said market research file structures to the host processor.

14. A method for electronically collecting market research information from a plurality of sales locations wherein the information is collected from each of the sales locations and transmitted to a host processor for subsequent evaluation, wherein each of said sales locations has at least one automatic checkout system including a plurality of point-of-sale terminals communicating with a store controller over a communications network, and wherein the communications protocol of the automatic checkout system is phase encoded, said method comprising:

passively monitoring communications between the store controller and each of said point-of-sale terminals, said step of passively monitoring including converting the phase encoded protocol into a standard binary protocol;

separating relevant market research data from said communications;

forming market research file structures compatible with the host processor;

storing said market research file structures in nonvolatile memory; and periodically transferring said market research file structures to the host processor.

15. A method for electronically collecting market research information from a plurality of sales locations wherein the information is collected from each of the sales locations and transmitted to a host processor for subsequent evaluation, wherein each of said sales locations has at least one automatic checkout system including a plurality of point-of-sale terminals communicating with a store controller over a communications network, and wherein communications on the network are configured for two wire half duplex operation in a loop, said method comprising:

passively monitoring communications between the store controller and each of said point-of-sale terminals, said step of passively monitoring including connecting a receive data tap in parallel between the receive port of the store controller and the last point-of-sale terminal on the loop;

separating relevant market research data from said communications;

forming market research file structures compatible with the host processor;

storing said market research file structures in nonvolatile memory; and periodically transferring said market research file structures to the host processor.

16. A method for electronically collecting market research information from a plurality of sales locations wherein the information is collected from each of the sales locations and transmitted to a host processor for subsequent evaluation, wherein each of said sales locations has at least one automatic checkout system including a plurality of point-of-sale terminals communicating with a store controller over a communications network, and wherein communications on the network are carried on in SDLC format, said method comprising:

passively monitoring communications between the store controller and each of said point-of-sale terminals;

separating relevant market research data from said communications, said step of separating relevant market research data including the steps of separating the communications on the network into SDLC frames and other communication frames thereby separating information in the SDLC frames from the totality of communications; separating said SDLC frames into information format frames and other SDLC frames, thereby separating information contained in the information format frames from the totality of SDLC frames; and separating said information format frames into market research frames and other information format frames thereby separating the market research information from the totality of information contained in the information format frames;

forming market research file structures compatible with the host processor;

storing said market research file structures in nonvolatile memory; and periodically transferring said market research file structures to the host processor.

17. A method as set forth in claim 16 wherein said step of forming market research file structures includes the step of:

parsing information contained in said market research frames into said market research file structures.

18. A method as set forth in claim 17 wherein said step of parsing further includes the step of:

parsing each transaction file by separate market research file structures.

19. Passive data collection apparatus for assembling selected data transactions corresponding to purchases made by respective customers from among a multiplicity of data transactions on a communications network connecting a plurality of point-of-sale terminals in a store to a store controller in a store, said data transactions being communicated by a predetermined network protocol and in a predetermined network format of message units, said apparatus comprising:

coupling means for passively coupling to said communications network to receive all data transactions on the network between said store controller and said terminals in such a manner as not to add message units to said network or delete or otherwise modify message units on said network or control or modify the operation of the network, store controller or terminals;

converting means connected to said coupling means for converting said received data transactions from said network protocol into a digital protocol of data characters;

a transaction processor;

communications means connected to said converting means for communicating said converted data transactions to said transaction processor;

said transaction processor including:

means for assembling characters of said converted data transactions into message units;

sorting means for selectively sorting said assembled message units according to predetermined market research criteria;

storing means for storing data corresponding to said sorted message units; and means for communicating said stored data to an external device remote from the store.

20. Apparatus according to claim 19 wherein:

said data transactions on said communications network include identification of respective selected customers, said sorting means includes means for sorting said assembled message units into customer transactions, and means for selectively sorting said customer transactions according to selected customers identified by respective said identification, said storing means stores said selectively sorted customer transactions, and said means for communicating to said external device provides identification of the selected customers involved in respective customer transactions.

21. Apparatus according to claim 19 wherein:

said sorting means includes means for sorting said assembled message units according to products purchased at respective prices, and said transaction processor further includes means responsive to said sorted message units for counting the number of respective products bought at respective prices.

22. Apparatus according to claim 20 wherein:

said sorting means includes means for sorting said assembled message units according to products purchased at respective prices, and said transaction processor further includes means responsive to said sorted message units for counting the number of respective products bought at respective prices.

23. A data collection method for market research in respect to each of a plurality of individual stores for the purchases of selected customers forming a buying panel, each of said selected customers having a respective panelist identification, wherein each store has a plurality of point-of-sale terminals which communicate data transactions including respective panelist identification over a communications network to a central store controller said method comprising:

(a) passively monitoring data transactions on a respective said network;

(b) assembling from said monitored data transactions data frames corresponding to respective data transactions;

(c) selecting from all of said data frames, data frames of at least one particular type;

(d) sorting said selected frames based upon an information field which contains information indicating the beginning and the end of a respective purchasing transaction;

(e) temporarily storing said selected data frames corresponding to a respective purchasing transaction;

(f) searching said temporarily stored selected data frames for a said panelist identification; and (g) storing said searched selected data frames corresponding to a respective purchasing transaction when any of them include said panelist identification;

searching all purchase transactions of said frame blocks for a panelist identification; and storing those purchasing transactions of said frame blocks if they contain said panelist identifications.

24. A data collection method as set forth in claim 23 which further includes:

communicating said selected data frames pertaining to panelist transactions from each of said stores to a central processing point.

25. A data collection method as set forth in claim 23 wherein:

said steps (a)–(g) are performed on a real time basis.

26. A data collection method as set forth in claim 25 wherein said step of assembling frames includes:

receiving and storing each character of a data frame on an interrupt basis as it is monitored on said network; and transferring a completed frame to a frame buffer upon the detection of an end of frame character.

27. A data collection method as set forth in claim 26 wherein said step of selecting frames includes:

determining the number of frames in said frame buffer;

sorting the frames stored in said frame buffer until all stored frames have been sorted when the number is in excess of a predetermined value.

28. A data collection method as set forth in claim 27 wherein said step of selecting frames further includes:

sorting all information frames into frame blocks having the same point-of-sale terminal address.

29. A data collection method as set forth in claim 28 wherein said steps of sorting temporarily storing selected frames include:

sorting said frame blocks into purchase transactions.

30. A data collection method as set forth in claim 29 wherein said steps of searching and storing include:

searching all purchase transactions of said frame blocks for a panelist identification; and storing those purchasing transactions of said frame blocks if they contain said panelist identifications.

31. Data collection apparatus for market research in respect to each of a plurality of individual stores for the purchases of selected customers forming a buying panel, each of said selected customers having a respective panelist identification, wherein each store has a plurality of point-of-sale terminals which communicate data transactions including respective panelist identification over a communications network to a central store controller said apparatus comprising:

(a) means for passively monitoring data transactions on a respective said network;

(b) means for assembling from said monitored data transactions data frames corresponding to respective data transactions;

(c) means for selecting from all of said data frames, data frames of at least one particular type;

(d) means for sorting said selected frames based upon an information field which contains information indicating the beginning and the end of a respective purchasing transaction;

(e) means for temporarily storing said selected data frames corresponding to a respective purchasing transaction;

(f) means for searching said temporarily stored selected data frames for a said panelist identification; and (g) means for storing said selected data frames corresponding to a respective purchasing transaction when any of them include said panelist identification.

32. In a system for market research wherein data are gathered at a central station from a plurality of individual stores in respect to transactions made by respective selected shoppers, said selected shoppers having respective identification indicia: a market research data monitor including a buffer;

nonvolatile storage means for storing purchase transaction records;

programmed means for executing a communications program at a particular time of day to transfer stored purchase transaction records from said nonvolatile storage means to a central station;

programmed means for executing a real time monitor program on an interrupt basis to store in said buffer purchase transaction records of all purchases made by selected shoppers as they occur; and programmed means for executing a data storage program when said communications program is not executing to transfer the nonvolatile storage of said purchase transaction records on a periodic basis from said buffer to said nonvolatile storage means.

* * * * *